(12) United States Patent
Thomas

(10) Patent No.: US 10,666,662 B2
(45) Date of Patent: *May 26, 2020

(54) SYSTEMS AND METHODS FOR CONNECTING A PUBLIC DEVICE TO A PRIVATE DEVICE WITHOUT PRE-INSTALLED CONTENT MANAGEMENT APPLICATIONS

(71) Applicant: Rovi Guides, Inc., San Jose, CA (US)

(72) Inventor: William L. Thomas, Evergreen, CO (US)

(73) Assignee: Rovi Guides, Inc., San Jose, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/976,362

(22) Filed: May 10, 2018

(65) Prior Publication Data

US 2019/0349379 A1    Nov. 14, 2019

(51) Int. Cl.
| | | |
|---|---|---|
| *H04L 29/06* | (2006.01) | |
| *H04N 21/6334* | (2011.01) | |
| *H04N 21/239* | (2011.01) | |
| *H04N 21/84* | (2011.01) | |
| *H04N 21/858* | (2011.01) | |
| *H04N 21/437* | (2011.01) | |

(52) U.S. Cl.
CPC .......... *H04L 63/102* (2013.01); *H04L 63/062* (2013.01); *H04L 63/083* (2013.01); *H04L 63/108* (2013.01); *H04N 21/2393* (2013.01); *H04N 21/437* (2013.01); *H04N 21/6334* (2013.01); *H04N 21/84* (2013.01); *H04N 21/8586* (2013.01)

(58) Field of Classification Search
None
See application file for complete search history.

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,026,805 B1 | 9/2011 | Rowe |
| 8,046,801 B2 | 10/2011 | Ellis et al. |

(Continued)

OTHER PUBLICATIONS

International Search Report and Written Opinion of PCT/US2019/030622 dated Sep. 11, 2019.

(Continued)

*Primary Examiner* — Andrew J Steinle

(74) *Attorney, Agent, or Firm* — Haley Guiliano LLP

(57) ABSTRACT

Systems and methods for providing access to media content by connecting, to a public device, a private device that does not have an installed application associated with the media content. A media guidance application may receive a communication from a private device requesting to access content using the public device. In response, the media guidance application may retrieve, at the public device, a public interface application and private interface application from a content provider of the content. The private interface application, which may be configured to control a graphical user interface of the public interface application, may then be transmitted to the private device. Accordingly, the user may be able to access content via the public device when the private device is within a predetermined proximity to the public device.

22 Claims, 27 Drawing Sheets

(56) References Cited

U.S. PATENT DOCUMENTS

| | | |
|---|---|---|
| 9,112,849 B1 | 8/2015 | Ahlin et al. |
| 2002/0174430 A1 | 11/2002 | Ellis et al. |
| 2005/0251827 A1 | 11/2005 | Ellis et al. |
| 2010/0136952 A1 | 6/2010 | Rofougaran |
| 2013/0143651 A1* | 6/2013 | Harrison ............... H04L 63/107 463/31 |
| 2013/0304817 A1 | 11/2013 | Hu et al. |
| 2014/0053182 A1 | 2/2014 | Jääger et al. |
| 2014/0364056 A1 | 12/2014 | Belk et al. |
| 2016/0149891 A1* | 5/2016 | Kuper ................... H04L 63/083 726/9 |

OTHER PUBLICATIONS

International Search Report and Written Opinion of PCT/US2019/029886 dated Jul. 10, 2019.

* cited by examiner

SYSTEMS AND METHODS FOR CONNECTING A PUBLIC DEVICE TO A PRIVATE DEVICE WITHOUT PRE-INSTALLED CONTENT MANAGEMENT APPLICATIONS

BACKGROUND

There are many media devices available to users, each capable of providing media content, as well as other content such as social network content, messaging, etc. However, a user may not wish to access content using the media device he/she possesses. This may be due to technical deficiencies of the media device (e.g., low processing power, short battery life, etc.) or the user's preferences (e.g., the user may wish to access content on a larger display or a higher resolution display). In cases such as these, the user may wish to connect to a second media device that is capable of accessing the content. However, the connection process between the user's media device and the second media device may not be seamless, immediate, or satisfying.

SUMMARY

The advancement of digital transmission of media content has increased the amount of data that can be transmitted and the accessibility of media content for users. Accordingly, users are motivated to share and access media content in a variety of ways. In one approach, users may connect their devices (e.g., smartphones) to secondary devices (e.g., displays) to access the media content. However, while computer processors may receive/transmit connection requests and generate media content, for display, that may be useable by a human user (e.g., output media content on a display screen in a human recognizable format), these systems still fail to solve the aforementioned problem when implemented in computer systems because the connection processes still fail to account for the issues created when a user is attempting to connect to a public device, namely: (i) the device the user is attempting to connect to is incompatible with the user's media device; (ii) the device may not be detectable to the user's media device; (iii) the connection process may require an amount of processing that the user's media device cannot perform; (iv) the device the user is attempting to connect to does not have the proper applications to access the media content because it is not previously configured by the user; and (v) the quality of the connection is poor. Conventional solutions to these problems rely on the use of dongles inserted into the secondary device or require the secondary device to have particular hardware, or pre-installed software, compatible with hardware or software of a user's device. Thus, these conventional solutions require the user to have access to the secondary device (e.g., to insert a dongle) and/or are limited to secondary devices with a particular hardware and/or software configuration.

Accordingly, to overcome the problems in computer systems when connecting a private device to a public device, systems and methods are described herein for a media guidance application that identifies public devices, bridges the communication between the private device of the user and the public device, and seamlessly connects the respective devices without requiring the user to have access to the secondary device (e.g., to insert a dongle) and/or requiring the secondary devices to have a particular hardware and/or software configuration.

These solutions are provided for through the use of specialized authorization keys. For example, a user may wish to access videos on a public display in a mall. A media guidance application, installed on the user's smartphone or on an external server, may communicate with the public display, requesting to connect the public display with the user's smartphone. In response to receiving the request to connect and authenticating the user's credentials (e.g., needed to retrieve information/content from a content provider of the videos), the public display may retrieve the appropriate applications needed to display the videos. Specifically, the media guidance application may ensure that the retrieved applications are compatible with the respective devices in terms of processing capabilities and operating system requirements. The public display may additionally transmit one of the applications to the smartphone, which allows the user to send commands (e.g., execute trick play functions such as play/pause/rewind) to the public display via the smartphone. Furthermore, the media guidance application may bridge the communication between two applications that are incompatible, by translating commands and encrypting sensitive information—thus preventing an external source from monitoring the user's information at the public device.

In some aspects, the media guidance application may receive a communication from a private device indicating that a user wishes to access content using a public device. The private device may be any electronic device that the user has access to and/or owns, and that is capable of communicating with other devices. The public device may be any electronic device that is available for access by several users and is capable of communicating with other devices. Examples of private and public devices include, but are not limited to, displays, smartphones, smartwatches, smart speakers, computers, biometric devices, video game consoles, etc. The communication received from the private device may be in the form of a communication protocol data unit (e.g., a packet, a frame, a cell, etc.) in which the destination of the data unit is the communication address of the public device. In some embodiments, the communication comprises a 128-bit number used to identify the private device through low energy proximity sensing. The low energy proximity sensing may involve exchanging identifiers (e.g., the 128-bit number) between the private device and a public device in response to the media guidance application determining that the respective devices are in close proximity (e.g., within a threshold proximity). The exchanged identifiers may also be a range of alphanumeric values.

For example, the private device may be the user's smartphone, on which the media guidance application is installed. The media guidance application may display information about all public devices available for access in the vicinity of the user (e.g., to ensure that the user's device detects the public device). For example, the media guidance application may provide a map/list of the public devices and may allow the user to select a public device in order to send a request to connect. It should be noted that the media guidance application may be installed on a remote server, instead of the user's device. Accordingly, the remote server may communicate with the private device in order to provide the list/map of accessible public devices in the user's vicinity. For example, the public device may be a large touchscreen display located in a mall. The public device may receive the user's request to connect from the private device. The request to connect may also indicate that the user wishes to access content on the public device. The communication between the private device and the public device may be implemented over various communication infrastructures including, but not limited to, Wi-Fi, Bluetooth, cellular networks, wired connections (e.g., Ethernet), etc. Various servers, routers, switches, hubs, etc., may serve as intermediate devices configured to pass data between the public device and the private device.

The media guidance application may request, from the private device, both user authorization information and an identifier for a content provider of the content. In response to the user making a selection of the public device, the media guidance application may create a temporary connection between the private device and the public device. The temporary connection may allow the private device and the public device to communicate without providing access to the functionality of either device (e.g., the ability to access and display the content). Accordingly, the private device may receive, either from the public device or a remote server with the media guidance application, a request for user authorization information and an identifier of the content provider. The user authorization information may comprise data required to verify the user's identity with the content provider. For example, the user authorization information may list the subscriptions the user possesses and the respective login keys (e.g., username, password, security questions, PIN codes, etc.) to access the subscriptions. In some embodiments, the user authorization information may be stored on a server. The public device may scan the user's face and/or fingerprint and run facial/fingerprint recognition analysis using a facial/fingerprint database that may be stored on the server. In response to identifying a match, the media guidance application may retrieve the user authorization information associated with the match. The identifier of the content provider may be any descriptive attribute of the content provider including, but not limited to, the name, logo, social media handle, etc., of the content provider. For example, the identifier of the content provider may be the name of the content provider (e.g., Netflix™). The media guidance application may extract Netflix™ login information from the user authorization information.

In some embodiments, the media guidance application may first receive the user authorization information, and generate for display, on the private device and/or public device, identifiers of content providers (e.g., logos) that the user has access to and can select. For example, the user authorization information may indicate that the user is subscribed to an OTT media provider (e.g., Netflix™), a shopping service (e.g., Amazon™ Shopping), and a video game provider (e.g., Steam™). Thus, the user may wish to view a movie on the public device using Netflix™, view shopping items on the public device using Amazon™ Prime, or play a video game on the public device using Steam™. The media guidance application may display the identifiers on the private device for selection by the user and a search bar to allow the user to search for other content providers. For example, the user may select Netflix™.

The media guidance application may then transmit to the content provider, at a location based on the identifier, a request for both a public interface application and a private interface application corresponding to the content (e.g., to ensure that the respective devices receive the proper applications to access media content, as neither device may be configured by the user beforehand). In some embodiments, the identifier may include a Uniform Resource Locator (URL) for the server, or a file location on the private device, and wherein the server or file location stores content of the content provider. For example, the location of the content provider may be at a server (e.g., accessible via a website) or a storage device (e.g., hard disk, flash drive) that provides access to a public interface application that is compatible with the public device and a private interface application that is compatible with the private device. In some embodiments, the content provider may be a third-party source (e.g., Google™ Play Store, App Store). The public interface application may allow a user to access content that is available to the public (e.g., movies, shows, video games, etc.). The private interface application may allow a user to access private information associated with the user (e.g., user preferences, login information, viewing history, etc.). The private interface application and/or the public interface application may be browser-based (e.g., implemented in HTML5).

In some embodiments, the public interface application is configured as a thick client for performing data processing operations to facilitate communications with the content provider and display of the media asset, and the private interface application is configured as a thin client for presenting processed data provided by the public interface application (e.g., to ensure that the amount of processing the user's device performs is not extraneous). Thus, the private device is not required to perform heavy processing and users can easily access content. The private interface application is also therefore dependent on the public interface application for performing bandwidth-intensive operations (e.g., communicating with the content provider, retrieving content, etc.).

The media guidance application may then receive, at the public device, the public interface application, wherein the public interface application includes an interface for communicating with the content provider and a graphical user interface for display to the user on the public device. For example, the public interface application may be able to provide accessible content on the graphical user interface. In response to receiving a user selection, the public interface application may be able to send requests for specific content to the content provider and receive the requested content.

The media guidance application may receive, at the public device, the private interface application, wherein the private interface application is configured to control the graphical user interface on the public device while the private device is within a predetermined proximity to the public device. For example, the private interface application may be able to receive user commands (e.g., to select content, to alter user preferences, to configure the graphical user interface on the public interface application, etc.) via a touchscreen, command buttons, gestures, biometric impulses, and/or audio input. The private interface application may further verify whether the private device is within a predetermined proximity to the public device. The predetermined proximity may be a physical distance/displacement that represents the farthest point the private device can be from the public device in a particular direction. For simplicity, the predetermined proximity may be interpreted as a connection "sphere" of a certain radius (e.g., five meters). Accordingly, the private device may be up to five meters from the public device in any direction in order for the private interface application to communicate with the public interface application. Due to the presence of obstacles (e.g., walls, objects, etc.), the predetermined proximity may not be the same in all directions. For example, the predetermined proximity perpendicular to the display of the public device and parallel to the floor may be five meters. However, the predetermined proximity perpendicular to the floor and the display of the public device (e.g., pointing upwards) may be three meters due to the presence of a ceiling.

It should be noted that the media guidance application may serve as a central application that governs (e.g., monitors, communicates with, provides commands to, etc.) the public interface application and the private interface application. Thus, in some embodiments, user commands and device communications are received by the media guidance application, which then may forward the commands to the private interface application and the public interface application for execution. This provides an additional layer of security to all communications. For example, the media guidance application may ensure that harmful communications (e.g., viruses, malware, security breach agents) are not transferred from a private device to a public device and vice versa. Additionally, this provides an additional layer of compatibility. For example, the public device may be running on a specific operating system (e.g., Windows™) and the private device may be running on a different operating system (e.g., iOS™). Accordingly, the public interface application may be Windows™-based and the private interface application may be iOS™-based. In some cases, the two respective interface applications may be unable to communicate due to their differences in programming. As a result, the media guidance application may determine that the private interface application is of a first operating system type and the public interface application is of a second operating system type. The media guidance application may determine that the first operating system type is incompatible with the second operating system type. In response to receiving a first message (e.g., command, request, data packet) that is encoded using the first operating system type by the private interface application and is to be sent to the public interface application, the media guidance application may translate the content of the first message and generate a second message encoded using the second operating system type that includes the content of the first message. The media guidance application may then record the first message in a log and may transmit the second message to the public interface application.

The media guidance application may then transmit, from the public device, the private interface application to the private device. Transmitting the private interface application to the private device allows for the private device to consume less processing power (e.g., the private device does not have to receive the private interface application separately). Furthermore, in the case that the private device is unable to communicate directly with the content provider (e.g., the private device does not have Internet access), the private device can simply receive the private interface application over the connection with the public device. In this case, the connection between the private device and the public device does not necessarily need to be an Internet connection.

The media guidance application may activate the public interface application on the public device and may generate for display, on the public device, the graphical user interface. Activating the public interface application may involve loading the various processes, components and plug-ins required for the initialization of the public interface application. It should be noted that not all public devices may have displays (e.g., smart speakers, augmented reality devices, hologram generators, etc.). For those particular public devices, the graphical user interface may be substituted with an appropriate user interface that is compatible with the public device and allows user interaction via the private interface application. Based on the examples listed above, these substitute user interfaces may be an audio user interface (e.g., where the menu is read aloud to the user), augmented reality user interface (e.g., allows the user to see an augmented reality screen via the private device), or a holographic projection user interface (e.g., where the menu is projected).

In some embodiments, the media guidance application may retrieve network connection credentials from the private device in response to activating the public interface application on the public device. The network connection credentials may be a form of the connection parameters that are associated with the authorization key. The media guidance application may thus connect to a network based on the network connection credentials. For example, the network connection credentials may detail a Bluetooth connection. Therefore, the media guidance application may establish a Bluetooth connection to allow the public interface application to communicate with the private interface application.

The media guidance application may provide, via the public interface application, the user authorization information to a server of the content provider. As noted before, the user authorization information may comprise data required to verify the user's identity with various content providers (e.g., usernames and passwords). Thus, the media guidance application may communicate with the content provider and transfer the user authorization information to gain access to the content offered by the content provider. In order to ensure the security of the user authorization information, the public interface application may create a token that comprises the data needed to verify the user's identity with the particular content provider (e.g., the username and password associated with the content provider). Furthermore, the public interface application may encrypt the token such that only the content provider may decrypt the token and retrieve the information (e.g., to keep the communication secure). In some embodiments, the tokenization and encryption process mentioned above is carried out by the media guidance application. Thus, the user authorization information cannot be compromised when being transferred from the private device to the public device. It should be noted that the server of the content provider represents any location that collects user information for verification and provides authorization to access content. For example, the server may simply be a website that collects usernames and passwords for login purposes. In some embodiments, if the content provider is the user (e.g., the user wishes to access, via the public device, content locally stored on the private device), the user authorization information may simply be transferred back to the private device. In this case, the private interface application may verify whether the received user authorization information matches the user authorization information sent to the public device.

In some embodiments, the user authorization information is a universally unique identifier (UUID) or globally unique identifier (GUID) generated by the private interface application in response to verifying a login name and password entered into the private interface application, and wherein the user authorization information is valid for a predetermined time after verifying the login name and password. For example, the user authorization may be an identifier that represents the user's login name and password. Accordingly, the actual values of the login name and password are not exposed to the public device. Instead, the media guidance application assigns a UUID or a GUID associated with the user in response to verifying the user's login name/username and password. For example, the predetermined time may be one hour. Thus, the UUID and GUID may become invalid after one hour. The media guidance application may then re-verify the user's login name and password.

The media guidance application may then receive a user request, issued from the private interface application, for a media asset from the content provider. For example, the public interface application may generate for display, on the graphical user interface, a grid/list of identifiers of media assets (e.g., movie posters, album art, etc.) offered by the content provider. The user may use the private interface application to navigate the public interface application's graphical user interface. For example, the private interface application may have a graphical user interface that resembles a remote. The user may be able to select "up," "down," "left," and "right" on the private interface application to command the movement of a selector that highlights the identifiers on the public interface application. Once the user has made a selection of a media asset, the private interface application may transmit the user request for the media asset to the public interface application. In some embodiments, the user may enter an identifier of the media asset (e.g., the title of the media asset) in the public interface application (e.g., via a search bar). In response to receiving the selection, the public interface application may search for the identifier of the media asset in a media guidance data source that is associated with the content provider. For example, the user may enter "harry potter" into a search bar on the private interface application. In response, the media guidance application may transfer the user selection to the public interface application, which may run a search for "harry potter" and provide relevant media assets (e.g., video files of "Harry Potter and the Chamber of Secrets" and "Harry Potter and the Prisoner of Azkaban").

The media guidance application may then request, at the public device, the media asset from the content provider. For example, in response to determining the selected media asset in the user request, the media guidance application may instruct the public interface application to communicate with the content provider to request the media asset. The public interface application may then transmit the request for the media asset to a server of the content provider with the media asset.

The media guidance application may receive, at the public device, the media asset from the content provider. For example, the content provider may determine, based on the user authorization information previously received, that the user is authorized to access the media asset. In response, the content provider may transmit the entire media asset to the public device (e.g., allow the public device to download the media asset) or may stream the media asset to the public device. In some embodiments, the public interface application may determine that the media asset is requested by a plurality of users in a period of time. For example, the public device may keep track of the access history of various users (e.g., identifiers of the media assets accessed) and additional details (e.g., the commands issued at the public device, the type of content accessed, the identifier of the private device, etc.). In order to keep the user's identity private, the access history may be anonymous. In response to determining that the number of users of the plurality of users (e.g., 50) that requested the media asset is greater than a threshold (e.g., 30), the public interface application may store a cached copy of the media asset for use by future users.

The media guidance application may then generate, for consumption (e.g., access using a display, audio feedback, augmented reality controls, VR headset, etc.), the media asset in response to the user request. For example, the public interface application may display the media asset and allow the user to control trick play functions (e.g., play, pause, rewind, etc.) through the private interface application (e.g., the private interface application may present a graphical user interface resembling a remote) or through the public interface application (e.g., via touchscreen or buttons on the public device). It should be noted that based on the type of media asset being accessed (e.g., movie, video game, shopping item, etc.), the private interface application may adjust its graphical user interface. For example, if the user is accessing a shopping item via a content provider such as Amazon™, the functions on the private interface application may become "Add to Cart," "Search Deals," and navigation functions (e.g., up arrow, down arrow, etc.).

In some embodiments, in response to receiving, at the public device, both the user authorization information and the identifier for the content provider, the media guidance application may generate, at the public device, an authorization key unique to the private device based on (i) the user authorization information, (ii) the identifier and (iii) connection parameters (e.g., to keep the connection secure and to maintain the quality of the connection). For example, the identifier for the content provider may be the retailer "Amazon™." The user authorization information may thus comprise a username and password to the user's Amazon™ shopping account. The connection parameters represent conditions that must be met in order to maintain the connection between the public device and the private device. For example, the connection parameters may comprise the predetermined proximity to the public device, within which the private device must remain in order for the authorization key to remain valid. Additionally, the connection parameters may comprise restrictions on inaccessible media assets that the user may request. For example, the user may request a video game that requires heavy processing and features high-end graphics. For example, the public device may be unable to generate for display the video game because the requirements of the video game exceed the public device's technical capabilities. In the absence of connection parameters, the public device may get damaged while trying to generate for display the video game (e.g., may cause corrupted files and/or overheating at the motherboard), thus degrading the quality of the connection. Accordingly, the media guidance application may take the public device's technical capabilities into consideration and limit the user to access media assets that the public device can display. This information is thus included in the connection parameters. Similarly, the connection parameters may include information such as the connection type (e.g., Wi-fi, cellular data, etc.) established between the private device and public device, the location of the respective devices, time limits for accessing the public device, etc. The authorization key may serve as an encryption key that comprises user authorization information, the identifier of the content provider, and the connection parameters, and may be unique for each private device. This provides security and prevents other devices from sending commands on the behalf of the private device.

The media guidance application may then transmit, to the private device, the authorization key and in response to transmitting the authorization key, the media guidance application may initiate a session, at the public device, with the private device. The session may be a formal connection between the public device and the private device in which the commands can be exchanged between the respective devices. It should be noted that the authorization key is required to cause the public device to execute commands received from the private device during the session. For example, the private interface application may transmit the authorization key alongside the command that the public device must execute. In response to receiving the authorization key and the command, the public interface application may decrypt and parse the authorization key to determine whether the command should be executed. If the public interface application determines that the connection parameters of the authorization key are not satisfied, or that the authorization key is corrupt/faulty/missing, the public interface application may not execute the command.

In some embodiments, the public interface application may be configured to automatically remove the user authorization information from memory on the public device upon deactivation (e.g., ending the session) of the public interface application on the public device. Additionally, the private interface application may be configured to retain the user authorization information in memory on the private device upon deactivation of the private interface application on the private device. For example, the media guidance application may remove the user authorization information from the public device to prevent other users from accessing the user's content. As mentioned previously, the user authorization information may be in the form of a UUID or a GUID. Accordingly, the media guidance application may store the user authorization information on the public device. If the predetermined time in which the UUID/GUID is valid is five days, the media guidance application may seamlessly connect the public device and the private device without the need for verifying the user's login name and password for the content provider within the five days.

In some embodiments, the media guidance application may receive, at the public device, a received signal strength indicator (RSSI) from the private device. An RSSI represents the power of a received signal. The media guidance application may then approximate a distance between the public device and the private device. For example, the media guidance application may determine that the RSSI of the original transmitted signal is 0 and the RSSI received at the private device is −20. The media guidance application may determine, using a lookup table that returns distance as a function of RSSI, the distance between the private device and the public device. In some embodiments, the public device may include a depth camera that can approximate the distance between the user and the public device. When initiating the communication between the private device and the public device, the private device may send a device identifier (e.g., name of the private device, image of the private device, serial number, etc.) to the public device. The media guidance application may thus perform image processing to recognize the private device in a captured video from the depth camera. In response to identifying the private device, the media guidance application may determine the distance between the private device and the public device. In some embodiments, the distance between the public and private device may be determined using the difference of their respective GPS coordinates, using NFC technology.

The media guidance application may then compare the distance to a threshold distance, corresponding to the predetermined proximity, to determine whether the private device is within the predetermined proximity to the public device. For example, the media guidance application may determine that the private device is three meters away from the public device. In this example, the threshold distance may be four meters with respect to the direction in which the private device is situated (e.g., the threshold distance may be different depending on the plane the private device and the public device share). In response to determining that the distance is greater than the threshold distance, the media guidance application may transmit a timestamp for a playback position to the content provider and may deactivate (e.g., end the session) the public interface application on the public device. For example, the media guidance application may determine that the private device is no longer within the predetermined proximity. For example, the user may be accessing a movie from the content provider Netflix™. In response to determining that the private device is not within the predetermined proximity, the media guidance application may send the timestamp of the last playback position during which the private device was within the predetermined proximity, to Netflix™. Therefore, if the user chooses to access the movie at a later time at a different device, the user may continue from the playback position.

In some embodiments, the media guidance application may receive an additional user request, issued from the private interface application, for an additional application from the content provider. For example, the content provider may be Amazon™ and the public interface application may be a retail application that displays shopping items to the user. The user may request an additional application from Amazon™, such as the video streaming application Amazon™ Prime Video. Accordingly, the media guidance application may request, at the public device, the additional application from the content provider by sending a communication to the content provider. In response, the media guidance application may also receive, at the public device, the additional application from the content provider and activate the additional application. The media guidance application may thus run, at the public device, the additional application and the public interface application simultaneously.

In some embodiments, the media guidance application may receive an additional user request, issued from the private interface application, for an additional application from a different content provider. For example, the original content provider may be Amazon™ and the public interface application may be a retail application that displays shopping items to the user. The user may request an additional application from the video streaming content provider Netflix™. Accordingly, the media guidance application may request, at the public device, the additional application from the different content provider (e.g., Netflix™) by sending a communication to the content provider. In response, the media guidance application may also receive, at the public device, the additional application from the different content provider, and activate the additional application. The media guidance application may thus run, at the public device, the additional application and the public interface application simultaneously.

In some aspects, the media guidance application may receive a communication from a private device, implementing a private interface application, indicating that a user wishes to access content using a public device. As previously mentioned, the communication received from the private device may be in the form of a communication protocol data unit (e.g., a packet, a frame, a cell, etc.) in which the destination of the data unit is the communication address of the public device.

For example, the private device may be the user's smartphone, on which the media guidance application is installed. The media guidance application may display information about all public devices available for access in the vicinity of the user. For example, the media guidance application may provide a map/list of the public devices and may allow the user to select a public device in order to send a request to connect. For example, the public device may be a large touchscreen display located in a mall. The media guidance application may receive a user selection of the touchscreen display located in the mall to transmit a connection request and accordingly, the public device may receive the user's request to connect from the private device. The request to connect may also indicate that the user wishes to access content on the public device. The communication between the private device and the public device may be implemented over various communication infrastructures including, but not limited to, Wi-Fi, Bluetooth, cellular networks, wired connections (e.g., Ethernet), etc. Various servers, routers, switches, hubs, etc., may serve as intermediate devices configured to pass data between the public device and the private device.

The media guidance application may request, from the private device, both user authorization information and an identifier for the private interface application. In response to the user making a selection of the public device, the media guidance application may create a temporary connection between the private device and the public device. The temporary connection may allow the private device and the public device to communicate without providing access to the functionality of either device (e.g., the ability to access and display the content). Accordingly, the private device may receive, either from the public device or a remote server with the media guidance application, a request for user authorization information and an identifier of the private interface application. As previously established, the user authorization information may comprise data required to verify the user's identity with the content provider. For example, the user authorization information may list the subscriptions the user possesses and the respective login keys (e.g., username, password, security questions, PIN codes, etc.) to access the subscriptions. The identifier of the private interface application may be any descriptive attribute of the private interface application including, but not limited to, a name, a logo, a developer name, software details (e.g., build number, version, compatible operating system), a screenshot of the user interface, etc. It should be noted that the identifier may comprise a combination of descriptive attributes. For example, an identifier may include the name of the content provider (e.g., Netflix™), the version of the private interface application (e.g., version 5.6), and the compatible operating systems (e.g., iOS™, Android™).

The media guidance application may then transmit to the content provider, at a location based on the identifier, a request for a public interface application corresponding to the private interface application. In some embodiments, the identifier may include a Uniform Resource Locator (URL) for the server, or a file location on the private device, and wherein the server or file location stores content of the content provider. For example, the location of the content provider may be at a server (e.g., accessible via a website) or a storage device (e.g., hard disk, flash drive) that provides access to a public interface application that is compatible with the public device and can communicate with the specific private interface application that is on the private device. For example, the private interface application may specifically be an iOS™-based application that can only communicate with an iOS™-based public interface application. Therefore, the media guidance application may request a public interface application that is iOS™-based.

The media guidance application may then receive, at the public device, the public interface application, wherein the public interface application includes an interface for communicating with a content provider and a graphical user interface for display to the user on the public device, and wherein the private interface application is configured to control the graphical user interface on the public device while the private device is within a predetermined proximity to the public device. For example, the public interface application may be able to provide accessible content on the graphical user interface. In response to receiving a user selection, the public interface application may be able to send requests for specific content to the content provider and receive the requested content. Furthermore, the private interface application may be able to receive user commands (e.g., to select content, to alter user preferences, to configure the graphical user interface on the public interface application, etc.) via a touchscreen, command buttons, gestures, biometric impulses, and/or audio input. The private interface application may further verify whether the private device is within a predetermined proximity to the public device. The predetermined proximity may be a physical distance/displacement that represents the farthest point the private device can be from the public device in a particular direction in order to remain connected with the public device. For simplicity, the predetermined proximity may be interpreted as a connection "sphere" of a certain radius (e.g., five meters). Accordingly, the private device may be up to five meters from the public device in any direction with respect to the public device in order for the private interface application to communicate with the public interface application. Due to the presence of obstacles (e.g., walls, objects, etc.), the predetermined proximity may not be the same in all directions. For example, the predetermined proximity along one plane featuring the public device and private device may be three meters. However, the predetermined proximity along a different plane may be one meter due to the presence of signal interference (e.g., from external signals originating from other devices in the area) along the plane.

The media guidance application may then activate the public interface application on the public device and may generate for display, on the public device, the graphical user interface. Activating the public interface application may involve loading the various processes, components and plug-ins required for the initialization of the public interface application.

The media guidance application may provide, via the public interface application, the user authorization information to a server of the content provider. As discussed previously, in order to ensure the security of the user authorization information, the public interface application may create a token that comprises the data needed to verify the user's identity with the particular content provider (e.g., the username and password associated with the content provider). Furthermore, the public interface application may encrypt the token such that only the content provider may decrypt the token and retrieve the information.

The media guidance application may then receive a user request, issued from the private interface application, for a media asset from the content provider. For example, the public interface application may generate for display, on the graphical user interface, a grid/list of identifiers of media assets (e.g., movie posters, album art, etc.) offered by the content provider. The user may use the private interface application to navigate the public interface application's graphical user interface. For example, the private interface application may have a graphical user interface that resembles a remote. The user may be able to select "up," "down," "left," and "right" on the private interface application to command the movement of a selector that highlights the identifiers on the public interface application. Once the user has made a selection of a media asset, the private interface application may transmit the user request for the media asset to the public interface application.

The media guidance application may then request, at the public device, the media asset from the content provider. For example, in response to determining the selected media asset in the user request, the media guidance application may instruct the public interface application to communicate with the content provider to request the media asset. The public interface application may then transmit the request for the media asset to a server of the content provider with the media asset.

The media guidance application may receive, at the public device, the media asset from the content provider. For example, the content provider may determine, based on the user authorization information previously received, that the user is authorized to access the media asset. In response, the content provider may transmit the entire media asset to the public device (e.g., allow the public device to download the media asset) or may stream the media asset to the public device.

The media guidance application may then generate, for consumption, the media in response to the user request. In some embodiments, generating for consumption comprises generating for display the media asset in the graphical user interface. For example, the public interface application may display the media asset and allow the user to control trick play functions (e.g., play, pause, rewind, etc.) through the private interface application (e.g., the private interface application may present a graphical user interface resembling a remote) or through the public interface application (e.g., via touchscreen or buttons on the public device).

In some embodiments, in response to receiving, at the public device, both the user authorization information and the identifier for the private interface application, the media guidance application may generate, at the public device, an authorization key unique to the private device based on (i) the user authorization information, (ii) the identifier and (iii) connection parameters. For example, the identifier for the private interface application may be the retail application name "Amazon™." The user authorization information may thus comprise a username and password to the user's Amazon™ shopping account. The connection parameters represent conditions that must be met in order to maintain the connection between the public device and the private device. For example, the connection parameters may comprise the predetermined proximity to the public device, within which the private device must remain in order for the authorization key to remain valid.

The media guidance application may then transmit, to the private device, the authorization key and in response to transmitting the authorization key, the media guidance application may initiate a session, at the public device, with the private device. The session may be a formal connection between the public device and the private device in which the commands can be exchanged between the respective devices. In response to receiving the authorization key and the command, the public interface application may decrypt and parse the authorization key to determine whether the command should be executed. If the public interface application determines that the connection parameters of the authorization key are not satisfied (e.g., the private device is not within the predetermined proximity to the public device), or that the authorization key is corrupt/faulty/missing, the public interface application may not execute the command.

In some aspects, the media guidance application may receive a communication from a private device, implementing a private interface application, indicating that a user wishes to access content using a public device. As previously mentioned, the communication received from the private device may be in the form of a communication protocol data unit (e.g., a packet, a frame, a cell, etc.) in which the destination of the data unit is the communication address of the public device.

The media guidance application may then request, from the private device, a public interface application, wherein the public interface application includes (i) an interface for communicating with a content provider, (ii) user authorization information, and (iii) a graphical user interface for display to the user on the public device. In this case, the public interface application is configured to control the graphical user interface on the public device while the private device is within a predetermined proximity to the public device. For example, the user's private device may be a laptop computer. The laptop computer may have stored, in memory, the private interface application and the public interface application prior to the connection between the private device and the public device. The public interface application may be stored in the form of an installation package (e.g., executable file). If the public interface application is not already available at the private device when the media guidance application requests the public interface application, the private device may determine, via the media guidance application, the device type of the public device. The device type may specify details about the public device, such as the name, serial number, hardware classification and operating system (e.g., Windows™ computer, Android™ mobile device, iOS™ smart speaker, etc.) of the public device. In response to determining the device type, the media guidance application may retrieve, at the private device, the public interface application compatible with the device type from the content provider.

As previously established, the user authorization information may comprise data required to verify the user's identity with the content provider. In some embodiments, the user authorization information may be stored in the public interface application that has been requested. For example, the user may log in to the public interface application. In response to the user logging in, the media guidance application may transmit the public interface application from the private device to the public device. Accordingly, the media guidance application may receive, at the public device, the public interface application from the private device.

The media guidance application may then activate the public interface application on the public device, wherein initiating the public interface application includes establishing a communications path to a server of the content provider. As previously discussed, activating the public interface application may involve loading the various processes, components and plug-ins required for the initialization of the public interface application. Additionally, the received public interface application may include a script that connects the public device to the content provider by establishing a communications path between the two. The communications path may be set over the Internet or a local network (e.g., the content provider may be a server owned by the user in which the user stored content for access). The media guidance application may then generate for display, on the public device, the graphical user interface.

The media guidance application may provide, via the public interface application, the user authorization information to a server of the content provider. As discussed previously, in order to ensure the security of the user authorization information, the public interface application may create a token that comprises the data needed to verify the user's identity with the particular content provider (e.g., the username and password associated with the content provider). Furthermore, the public interface application may encrypt the token such that only the content provider may decrypt the token and retrieve the information.

The media guidance application may then receive a user request, issued from the private interface application, for a media asset from the content provider. For example, the public interface application may generate for display, on the graphical user interface, a grid/list of identifiers of media assets (e.g., movie posters, album art, etc.) offered by the content provider. The user may use the private interface application to navigate the public interface application's graphical user interface. In response to receiving a user selection of a media asset, the private interface application may transmit the user request for the media asset to the public interface application.

The media guidance application may then request, at the public device, the media asset from the content provider. For example, in response to determining the selected media asset in the user request, the media guidance application may instruct the public interface application to communicate with the content provider to request the media asset. The public interface application may then transmit the request for the media asset to a server of the content provider with the media asset.

The media guidance application may receive, at the public device, the media asset from the content provider. For example, the content provider may determine, based on the user authorization information previously received, that the user is authorized to access the media asset. In response, the content provider may transmit the entire media asset to the public device (e.g., allow the public device to download the media asset) or may stream the media asset to the public device.

The media guidance application may then generate, for consumption, the media asset in response to the user request. For example, the public interface application may display the media asset and allow the user to control trick play functions (e.g., play, pause, rewind, etc.) through the private interface application (e.g., the private interface application may present a graphical user interface resembling a remote) or through the public interface application (e.g., via touchscreen or buttons on the public device).

In some aspects, the media guidance application may receive a communication from a private device, implementing a private interface application, indicating that a user wishes to access content using a public device. As previously mentioned, the communication received from the private device may be in the form of a communication protocol data unit (e.g., a packet, a frame, a cell, etc.) in which the destination of the data unit is the communication address of the public device.

The media guidance application may then request, from the private device, a public interface application, wherein the public interface application includes an interface for communicating with a content provider, user authorization information, and a graphical user interface for display to the user on the public device. Furthermore, the public interface application may be configured to mirror the graphical user interface on the public device to the private device while the private device is within a predetermined proximity to the public device. It should be noted that the graphical user interface may comprise menus, logos, guides, etc. In addition, the graphical user interface may include the display of content (e.g., the frames of a video or image). Accordingly, mirroring the graphical user interface from the public device to the private device reduces the processing power required to access various types of content via the private device. For example, the public interface application may be a video game console (e.g., PlayStation™ 4) connected to a display and the private device may be a handheld touchscreen tablet (e.g., iPad). If the user wishes to access a video game that is not compatible with the user's iPad or requires processing power much greater than the technical capabilities of the iPad, the user may choose to connect to a public PS4™ device to access the content. In this case, the public interface application may be the video game that the user is trying to access, or the user's video game library. From the perspective of the private device, the public interface application is an application that may be activated on an external device other than the private device. Accordingly, the media guidance application may transmit the public interface application (e.g., PlayStation™ Now application) to the public device.

As previously established, the user authorization information may comprise data required to verify the user's identity with the content provider (e.g., the creator of the game). In some embodiments, the user authorization information may be stored in the public interface application that has been requested. For example, the user may log in to the public interface application. In response to the user logging in, the media guidance application may transmit the public interface application from the private device to the public device and thus the media guidance application may receive, at the public device, the public interface application from the private device.

The media guidance application may then activate the public interface application on the public device, wherein initiating the public interface application includes establishing a communications path to a server of the content provider. As previously discussed, activating the public interface application may involve loading the various processes, components and plug-ins required for the initialization of the public interface application. Additionally, the received public interface application may include a script that connects the public device to the content provider by establishing a communications path between the two. The communications path may be set over the Internet or a local network (e.g., the content provider may be a server owned by the user in which the user stored content for access). The media guidance application may then generate for display, on the public device, the graphical user interface.

The media guidance application may provide, via the public interface application, the user authorization information to a server of the content provider. As discussed previously, in order to ensure the security of the user authorization information, the public interface application may create a token that comprises the data needed to verify the user's identity with the particular content provider (e.g., the username and password associated with the content provider). Furthermore, the public interface application may encrypt the token such that only the content provider may decrypt the token and retrieve the information.

The media guidance application may then transmit, to the private device, a mirrored version of the graphical user interface, wherein the mirrored version of the graphical user interface is configured to (i) be displayed by a private interface application on the private device, (ii) receive a user request for a media asset from the content provider, and (iii) transmit the user request to the public interface application. Referring back to the example of video game content, the public interface application may be a video game or a video game library application. As established previously, the user may be using a tablet that cannot run the video games that the user wishes to access due to technical restrictions. However, mirroring the graphical user interface allows the user to access the video game content regardless of the technical restrictions. The private interface application may specifically be compatible with the private device and may receive a mirrored version of the graphical user interface to generate for display on the private device.

The media guidance application may then receive a user request, issued from the private interface application, for a media asset from the content provider. For example, the public interface application may generate for display, on the graphical user interface, a grid/list of identifiers of media assets (e.g., video games, etc.) offered by the content provider (e.g., the private device may be the content provider in this example). The private interface application may also generate for display the graphical user interface from the public interface application. In response to receiving a user selection of a media asset, the private interface application may transmit the user request for the media asset to the public interface application.

The media guidance application may then request, at the public device, the media asset from the content provider. For example, in response to determining the selected media asset in the user request, the media guidance application may instruct the public interface application to communicate with the content provider to request the media asset (e.g., request the private device for the media asset or the location of the media asset). The public interface application may then transmit the request for the media asset to a server of the content provider with the media asset. In this case, the location of the media asset may be at the server.

The media guidance application may receive, at the public device, the media asset from the content provider. For example, the content provider may determine, based on the user authorization information previously received, that the user is authorized to access the media asset. In response, the content provider may transmit the entire media asset to the public device (e.g., allow the public device to download the media asset) or may stream the media asset to the public device.

The media guidance application may then generate, for consumption, the media asset in response to the user request. For example, the public interface application may display the media asset at the public device and on the mirrored version of the graphical user interface on the private device. The user may thus be able to access a media asset (e.g., video game) that the private device alone cannot run.

In some embodiments, the media guidance application may receive an indication that the user has disconnected or wishes to disconnect the private device from the public device (e.g., a user command to disconnect the private device from the public device). In response to receiving the indication (e.g., user command), the media guidance application may transmit a timestamp for a playback position to the content provider and deactivate the public interface application on the public device.

It should be noted that the systems, methods, apparatuses, and/or aspects described above may be applied to, or used in accordance with, other systems, methods, apparatuses, and/or aspects described in this disclosure.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for a media guidance application that identifies public devices, bridges the communication between a private device of the user and a public device, and seamlessly connects the respective devices. For example, a user may wish to access videos on a public display in a mall. A media guidance application, installed on the user's smartphone or on an external server, may communicate with the public display, requesting to connect the public display with the user's smartphone. In response to receiving the request to connect and authenticating the user's credentials (e.g., needed to retrieve information/content from a content provider of the videos), the public display may retrieve the appropriate applications needed to display the videos. Specifically, the media guidance application may ensure that the retrieved applications are compatible with the respective devices in terms of processing capabilities and operating system requirements. The public display may additionally transmit one of the applications to the smartphone, which allows the user to send commands (e.g., execute trick play functions such as play/pause/rewind) to the public display via the smartphone. Furthermore, the media guidance application may bridge the communication between two applications that are incompatible, by translating commands and encrypting sensitive information—thus preventing an external source from monitoring the user's information at the public device.

Figure 1:
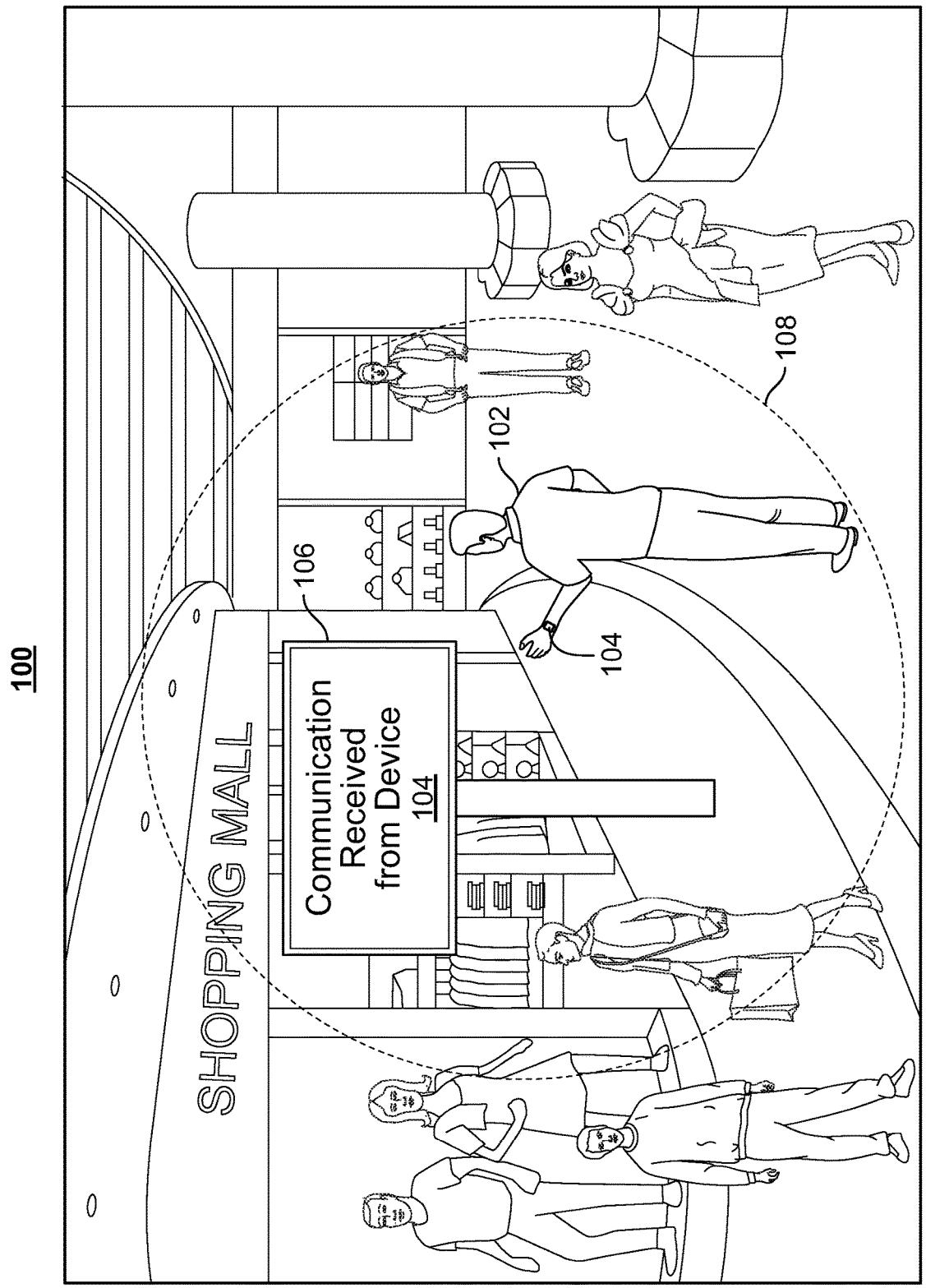
FIG. 1 shows an illustrative example of a scenario for connecting a private device to a public device, in accordance with some embodiments of the disclosure.

FIG. 1 shows an illustrative example of a scenario for connecting a private device to a public device, in accordance with some embodiments of the disclosure. Scenario 100 depicts user 102 with a private device 104 (e.g., a smartwatch, smartphone, tablet, etc.) in a mall. It should be noted that the private device may be wearable as well. User 102 may have initiated a communication between private device 104 and public device 106 (e.g., a display). Accordingly, public device 106 has generated for display a message stating "communication received from device 104." Public device 106 may then initiate a session with private device 104, allowing user 102 to access content via public device 106 and/or private device 104. Furthermore, public device 106 may determine a proximity 108 within which private device 104 must remain in order to maintain the session. As a result, if private device 104 is removed from within proximity 108, public device 106 may end the session and not accept commands from private device 104.

Figure 2:
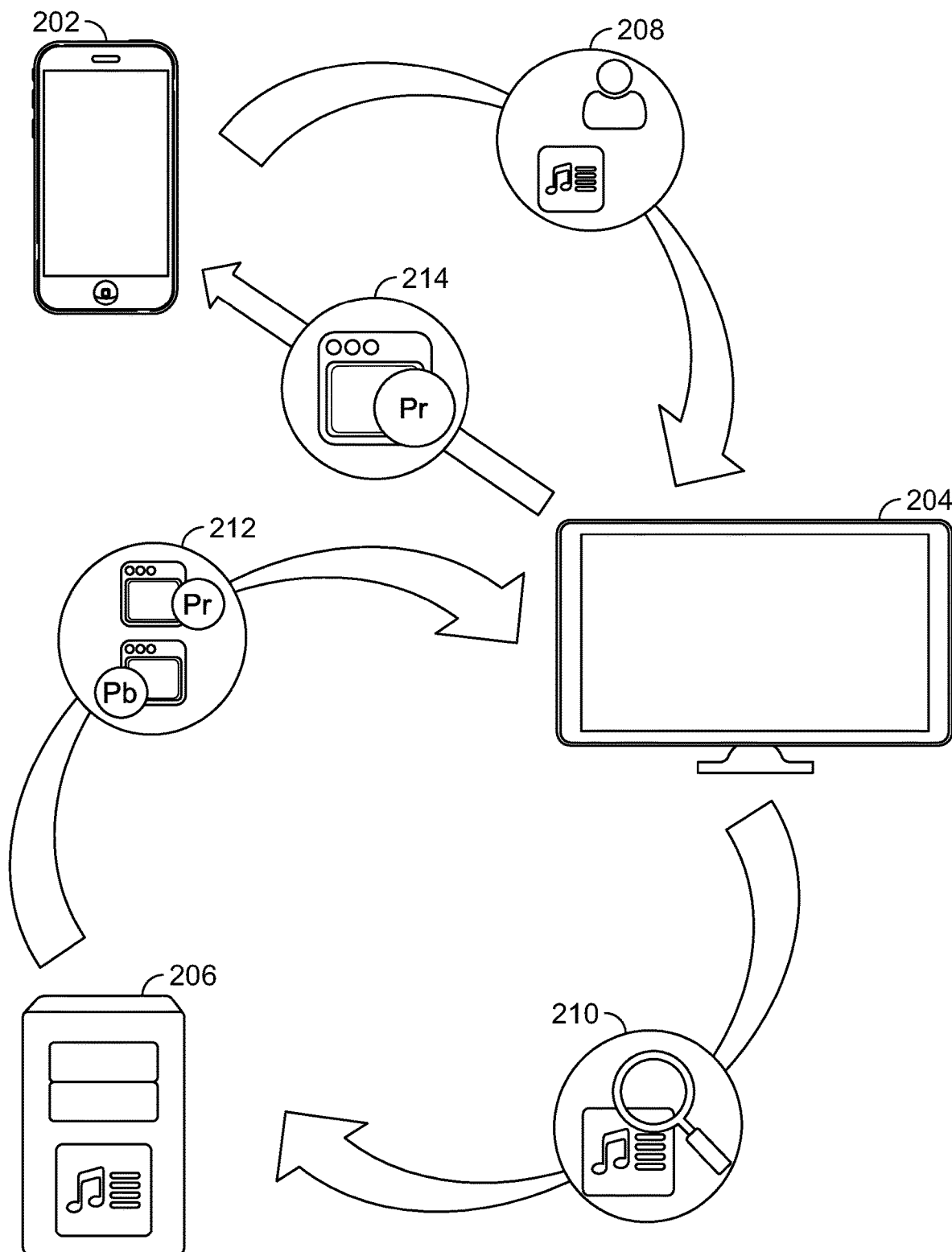
FIG. 2 shows a block diagram of a system that connects, to a public device, a private device that does not have an installed application associated with the media content, in accordance with some embodiments of the disclosure.

FIG. 2 shows block diagram 200 of a system that connects, to a public device, a private device that does not have an installed application associated with the media content, in accordance with some embodiments of the disclosure. The media guidance application may first receive a communication from private device 202 indicating that a user wishes to access content using public device 204. Private device 202 may be any electronic device that the user has access to and/or owns, and that is capable of communicating with other devices. Public device 204 may be any electronic device that is available for access by several users and is capable of communicating with other devices. Examples of private and public devices include, but are not limited to, displays, smartphones, smartwatches, smart speakers, computers, biometric devices, video game consoles, etc. The communication received from private device 202 may be in the form of a communication protocol data unit (e.g., a packet, a frame, a cell, etc.) in which the destination of the data unit is the communication address of public device 204. In some embodiments, the communication comprises a 128-bit number used to identify private device 202 through low energy proximity sensing. The low energy proximity sensing may involve exchanging identifiers (e.g., the 128-bit number) between private device 202 and a public device in response to the media guidance application determining that the respective devices are in close proximity (e.g., within a threshold proximity).

For example, private device 202 may be the user's smartphone, on which the media guidance application is installed. The media guidance application may display information about all public devices available for access in the vicinity of the user. For example, the media guidance application may provide a map/list of public devices and may allow the user to select a public device in order to send a request to connect. It should be noted that the media guidance application may be installed on a remote server, instead of the user's device. Accordingly, the remote server may communicate with private device 202 in order to provide the list/map of accessible public devices in the user's vicinity. For example, public device 204 may be a large touchscreen display located in a mall. Public device 204 may receive the user's request to connect from private device 202. The request to connect may also indicate that the user wishes to access content on public device 204. The communication between private device 202 and public device 204 may be implemented over various communication infrastructures including, but not limited to, Wi-Fi, Bluetooth, cellular networks, wired connections (e.g., Ethernet), etc. Various servers, routers, switches, hubs, etc., may serve as intermediate devices configured to pass data between public device 204 and private device 202.

The media guidance application may request, from private device 202, both user authorization information and an identifier for a content provider of the content. In response to the user making a selection of public device 204, the media guidance application may create a temporary connection between private device 202 and public device 204. The temporary connection may allow private device 202 and public device 204 to communicate without providing access to the functionality of either device (e.g., the ability to access and display the content). Accordingly, as depicted in transfer 208, private device 202 may receive, either from public device 204 or a remote server with the media guidance application, a request for user authorization information (e.g., user silhouette) and an identifier of content provider 206 (e.g., identification card featuring musical note). The user authorization information may comprise data required to verify the user's identity with content provider 206. For example, the user authorization information may list the subscriptions the user possesses and the respective login keys (e.g., username, password, security questions, PIN codes, etc.) to access the subscriptions. The identifier of content provider 206 may be any descriptive attribute of content provider 206 including, but not limited to, the name, logo, social media handle, etc., of content provider 206. For example, the identifier of content provider 206 may be the name of content provider 206 (e.g., Netflix™). The media guidance application may extract Netflix™ login information from the user authorization information.

In some embodiments, the media guidance application may first receive the user authorization information, and generate for display, on private device 202 and/or public device, identifiers of content providers (e.g., logos) that the user has access to and can select. For example, the user authorization information may indicate that the user is subscribed to an OTT media provider (e.g., Netflix™), a shopping service (e.g., Amazon™ Shopping), and a video game provider (e.g., Steam™). Thus, the user may wish to view a movie on public device 204 using Netflix™, view shopping items on public device 204 using Amazon™ Prime, or play a video game on public device 204 using Steam™. The media guidance application may display the identifiers on private device 202 for selection by the user and a search bar to allow the user to search for other content providers. For example, the user may select Netflix™.

The media guidance application may then, as depicted in transfer 210, transmit to content provider 206, at a location based on the identifier (e.g., determined by parsing the identifier of content provider 206), a request for both a public interface application and a private interface application corresponding to the content. In some embodiments, the identifier may include a Uniform Resource Locator (URL) for the server, or a file location on private device 202, and wherein the server or file location stores content of content provider 206. For example, the location of content provider 206 may be at a server (e.g., accessible via a website) or a storage device (e.g., hard disk, flash drive) that provides access to a public interface application that is compatible with public device 204 and a private interface application that is compatible with private device 202. The public interface application may allow a user to access content that is available to the public (e.g., movies, shows, video games, etc.). The private interface application may allow a user to access private information associated with the user (e.g., user preferences, login information, viewing history, etc.).

The media guidance application may then receive, at public device 204, the public interface application, wherein the public interface application includes an interface for communicating with content provider 206 and a graphical user interface for display to the user on public device 204. For example, the public interface application may be able to provide accessible content on the graphical user interface. In response to receiving a user selection, the public interface application may be able to send requests for specific content to content provider 206 and receive the requested content.

The media guidance application may receive, at public device 204, the private interface application, wherein the private interface application is configured to control the graphical user interface on public device 204 while private device 202 is within a predetermined proximity to public device 204. Transfer 212 depicts the private interface application (e.g., application labelled "Pr") and the public interface application (e.g., application labelled "Pb") being transmitted from content provider 206 to public device 204. For example, the private interface application may be able to receive user commands (e.g., to select content, to alter user preferences, to configure the graphical user interface on the public interface application, etc.) via a touchscreen, command buttons, gestures, biometric impulses, and/or audio input. The private interface application may further verify whether private device 202 is within a predetermined proximity to public device 204. The predetermined proximity may be a physical distance/displacement that represents the farthest point private device 202 can be from public device 204 in a particular direction. For simplicity, the predetermined proximity may be interpreted as a connection "sphere" of a certain radius (e.g., five meters). Accordingly, private device 202 may be up to five meters from public device 204 in any direction in order for the private interface application to communicate with the public interface application. Due to the presence of obstacles (e.g., walls, objects, etc.), the predetermined proximity may not be the same in all directions. For example, the predetermined proximity perpendicular to the display of public device 204 and parallel to the floor may be five meters. However, the predetermined proximity perpendicular to the floor and the display of public device 204 (e.g., pointing upwards) may be three meters due to the presence of a ceiling.

It should be noted that the media guidance application may serve as a central application that governs (e.g., monitors, communicates with, provides commands to, etc.) the public interface application and the private interface application. Thus, in some embodiments, user commands and device communications are received by the media guidance application, which then may forward the commands to the private interface application and the public interface application for execution. This provides an additional layer of security to all communications. For example, the media guidance application may ensure that harmful communications (e.g., viruses, malware, security breach agents) are not transferred from a private device to a public device and vice versa. Additionally, this provides an additional layer of compatibility. For example, public device 204 may be running on a specific operating system (e.g., iOS™) and private device 202 may be running on a different operating system (e.g., Windows™). Accordingly, the public interface application may be iOS™-based and the private interface application may be Windows™-based. In some cases, the two respective interface applications may be unable to communicate due to their differences in programming. As a result, the media guidance application may determine that the private interface application is of a first operating system type and the public interface application is of a second operating system type. The media guidance application may determine that the first operating system type is incompatible with the second operating system type. In response to receiving a first message (e.g., command, request, data packet) that is encoded using the first operating system type by the private interface application and is to be sent to the public interface application, the media guidance application may translate the content of the first message and generate a second message encoded using the second operating system type that includes the content of the first message. The media guidance application may then record the first message in a log and may transmit the second message to the public interface application.

The media guidance application may then, as depicted in transfer 214, transmit, from public device 204, the private interface application (e.g., application labelled "Pr") to private device 202. Transmitting the private interface application to private device 202 may allow for private device 202 to consume less processing power (e.g., private device 202 does not have to receive the private interface application separately). Furthermore, in the case that private device 202 is unable to communicate directly with content provider 206 (e.g., private device 202 does not have Internet access), private device 202 can simply receive the private interface application over the connection with public device 204. In this case, the connection between private device 202 and public device 204 does not necessarily need to be an Internet connection.

The media guidance application may activate the public interface application on public device 204 and may generate for display, on public device 204, the graphical user interface. Activating the public interface application may involve loading the various processes, components and plug-ins required for the initialization of the public interface application. It should be noted that not all public devices may have displays (e.g., smart speakers, augmented reality devices, hologram generators, etc.). For those particular public devices, the graphical user interface may be substituted with an appropriate user interface that is compatible with public device 204 and allows user interaction via the private interface application. Based on the examples listed above, these substitute user interfaces may be an audio user interface (e.g., where the menu is read aloud to the user), augmented reality user interface (e.g., allows the user to see an augmented reality screen via private device 202), or a holographic projection user interface (e.g., where the menu is projected).

The media guidance application may provide, via the public interface application, the user authorization information to a server of content provider 206. As noted before, the user authorization information may comprise data required to verify the user's identity with various content providers (e.g., usernames and passwords). Thus, the media guidance application may communicate with content provider 206 and transfer the user authorization information to gain access to the content offered by content provider 206. In order to ensure the security of the user authorization information, the public interface application may create a token that comprises the data needed to verify the user's identity with the particular content provider (e.g., the username and password associated with content provider 206). Furthermore, the public interface application may encrypt the token such that only content provider 206 may decrypt the token and retrieve the information. In some embodiments, the tokenization and encryption process mentioned above is carried out by the media guidance application. Thus, the user authorization information cannot be compromised when being transferred from private device 202 to public device 204. It should be noted that the server of content provider 206 represents any location that collects user information for verification and provides authorization to access content. For example, the server may simply be a website that collects usernames and passwords for login purposes. In some embodiments, if content provider 206 is the user (e.g., the user wishes to access, via public device 204, content locally stored on private device 202), the user authorization information may simply be transferred back to private device 202. In this case, the private interface application may verify whether the received user authorization information matches the user authorization information sent to public device 204.

Figure 3:
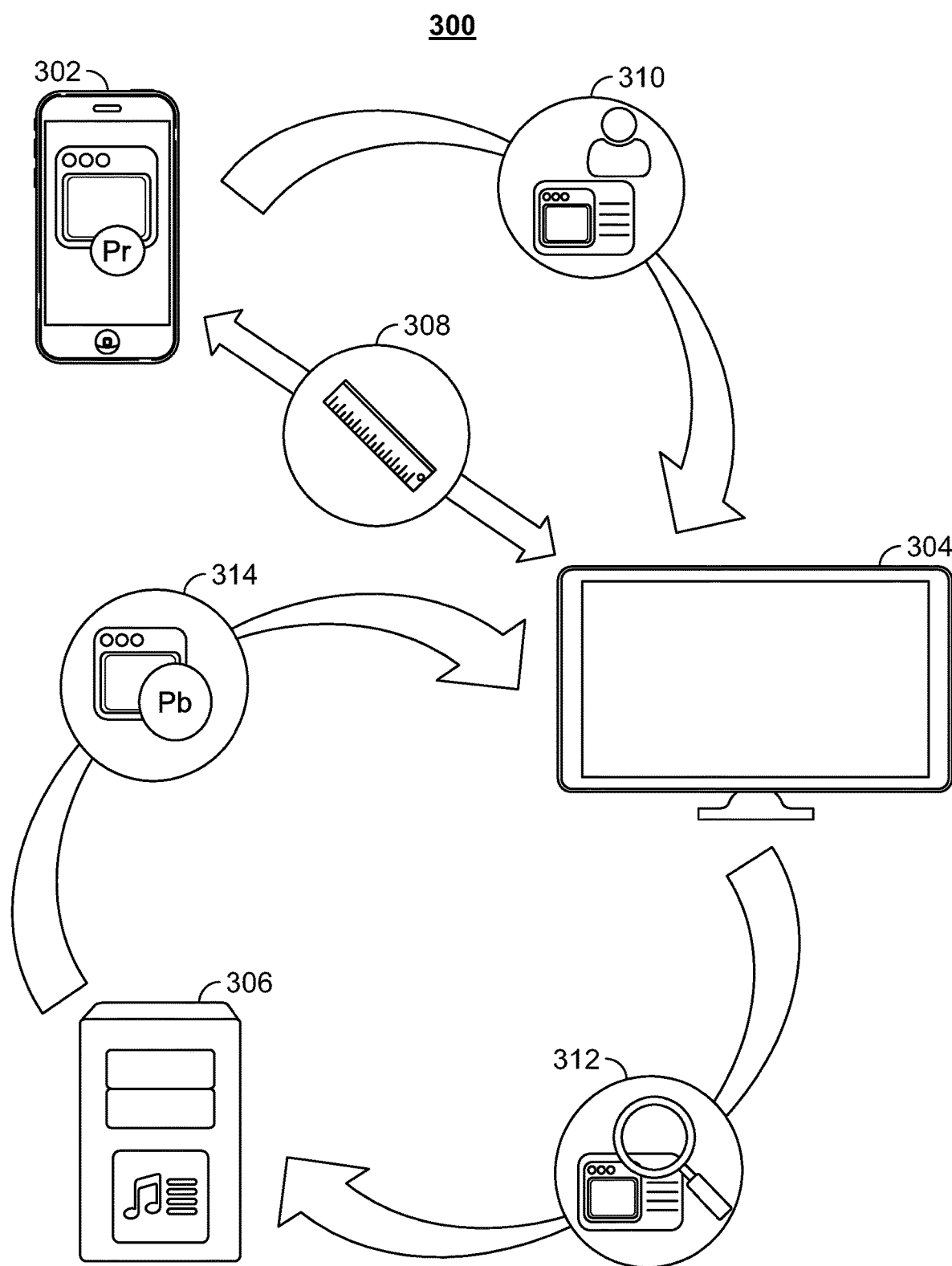
FIG. 3 shows a block diagram of a system that connects, to a public device, a private device that has an installed application associated with the media content, in accordance with some embodiments of the disclosure.

FIG. 3 shows block diagram 300 of a system that connects, to a public device, a private device that has an installed application associated with the media content, in accordance with some embodiments of the disclosure. The media guidance application may receive a communication from private device 302, implementing a private interface application (e.g., application labelled "Pr"), indicating that a user wishes to access content using public device 304. As previously mentioned, the communication received from private device 302 may be in the form of a communication protocol data unit (e.g., a packet, a frame, a cell, etc.) in which the destination of the data unit is the communication address of public device 304.

For example, private device 302 may be the user's smartphone, on which the media guidance application is installed. The media guidance application may display information about all public devices available for access in the vicinity of the user. For example, the media guidance application may provide a map/list of public devices and may allow the user to select public device 304 in order to send a request to connect. For example, public device 304 may be a large touchscreen display located in a mall. The media guidance application may receive a user selection of the touchscreen display located in the mall to transmit a connection request and accordingly, public device 304 may receive the user's request to connect from private device 302. The request to connect may also indicate that the user wishes to access content on public device 304. The communication between private device 302 and public device 304 may be implemented over various communication infrastructures including, but not limited to, Wi-Fi, Bluetooth, cellular networks, wired connections (e.g., Ethernet), etc. Various servers, routers, switches, hubs, etc., may serve as intermediate devices configured to pass data between public device 304 and private device 302.

The media guidance application may request, from private device 302, both user authorization information and an identifier for the private interface application. In response to the user making a selection of public device 304, the media guidance application may create a temporary connection between private device 302 and public device 304. The temporary connection may allow private device 302 and public device 304 to communicate without providing access to the functionality of either device (e.g., the ability to access and display the content). Accordingly, private device 302 may receive, as depicted in transfer 310, either from public device 304 or a remote server with the media guidance application, a request for user authorization information (e.g., depicted as user silhouette) and an identifier of the private interface application (e.g., depicted as identification card of application). As previously established, the user authorization information may comprise data required to verify the user's identity with content provider 306. For example, the user authorization information may list the subscriptions the user possesses and the respective login keys (e.g., username, password, security questions, PIN codes, etc.) to access the subscriptions. The identifier of the private interface application may be any descriptive attribute of the private interface application including, but not limited to, a name, a logo, a developer name, software details (e.g., build number, version, compatible operating system), a screenshot of the user interface, etc. It should be noted that the identifier may comprise a combination of descriptive attributes. For example, an identifier may include the name of content provider 306 (e.g., Netflix™), the version of the private interface application (e.g., version 5.6), and the compatible operating systems (e.g., iOS™, Android™).

The media guidance application may then, as depicted in transfer 312, transmit to content provider 306, at a location based on the identifier (e.g., depicted as magnifying glass parsing the identification card of the application), a request for a public interface application corresponding to the private interface application. In some embodiments, the identifier may include a Uniform Resource Locator (URL) for the server, or a file location on private device 302, and wherein the server or file location stores content of content provider 306. For example, the location of content provider 306 may be at a server (e.g., accessible via a website) or a storage device (e.g., hard disk, flash drive) that provides access to a public interface application that is compatible with public device 304 and can communicate with the specific private interface application that is on private device 302. For example, the private interface application may specifically be an iOS™-based application that can only communicate with an iOS™-based public interface application. Therefore, the media guidance application may request a public interface application that is iOS™-based.

The media guidance application may then, as depicted in transfer 314, receive, at public device 304, the public interface application (e.g., depicted as application labelled "Pb"), wherein the public interface application includes an interface for communicating with content provider 306 and a graphical user interface for display to the user on public device 304, and wherein the private interface application is configured to control the graphical user interface on public device 304 while private device 302 is within a predetermined proximity to public device 304. For example, the public interface application may be able to provide accessible content on the graphical user interface. In response to receiving a user selection, the public interface application may be able to send requests for specific content to content provider 306 and receive the requested content. Furthermore, the private interface application may be able to receive user commands (e.g., to select content, to alter user preferences, to configure the graphical user interface on the public interface application, etc.) via a touchscreen, command buttons, gestures, biometric impulses, and/or audio input. The private interface application may further verify whether private device 302 is within a predetermined proximity to public device 304 (as depicted in verification 308 by a measuring stick). The predetermined proximity may be a physical distance/displacement that represents the farthest point private device 302 can be from public device 304 in a particular direction in order to remain connected with public device 304. For simplicity, the predetermined proximity may be interpreted as a connection "sphere" of a certain radius (e.g., five meters). Accordingly, private device 302 may be up to five meters from public device 304 in any direction with respect to public device 304 in order for the private interface application to communicate with the public interface application. Due to the presence of obstacles (e.g., walls, objects, etc.), the predetermined proximity may not be the same in all directions. For example, the predetermined proximity along one plane featuring public device 304 and private device may be three meters. However, the predetermined proximity along a different plane may be one meter due to the presence of signal interference (e.g., from external signals originating from other devices in the area) along the plane.

The media guidance application may then activate the public interface application on public device 304 and may generate for display, on public device 304, the graphical user interface. Activating the public interface application may involve loading the various processes, components and plug-ins required for the initialization of the public interface application.

The media guidance application may provide, via the public interface application, the user authorization information to a server of content provider 306. As discussed previously, in order to ensure the security of the user authorization information, the public interface application may create a token that comprises the data needed to verify the user's identity with the particular content provider (e.g., the username and password associated with content provider 306). Furthermore, the public interface application may encrypt the token such that only content provider 306 may decrypt the token and retrieve the information.

Figure 4:
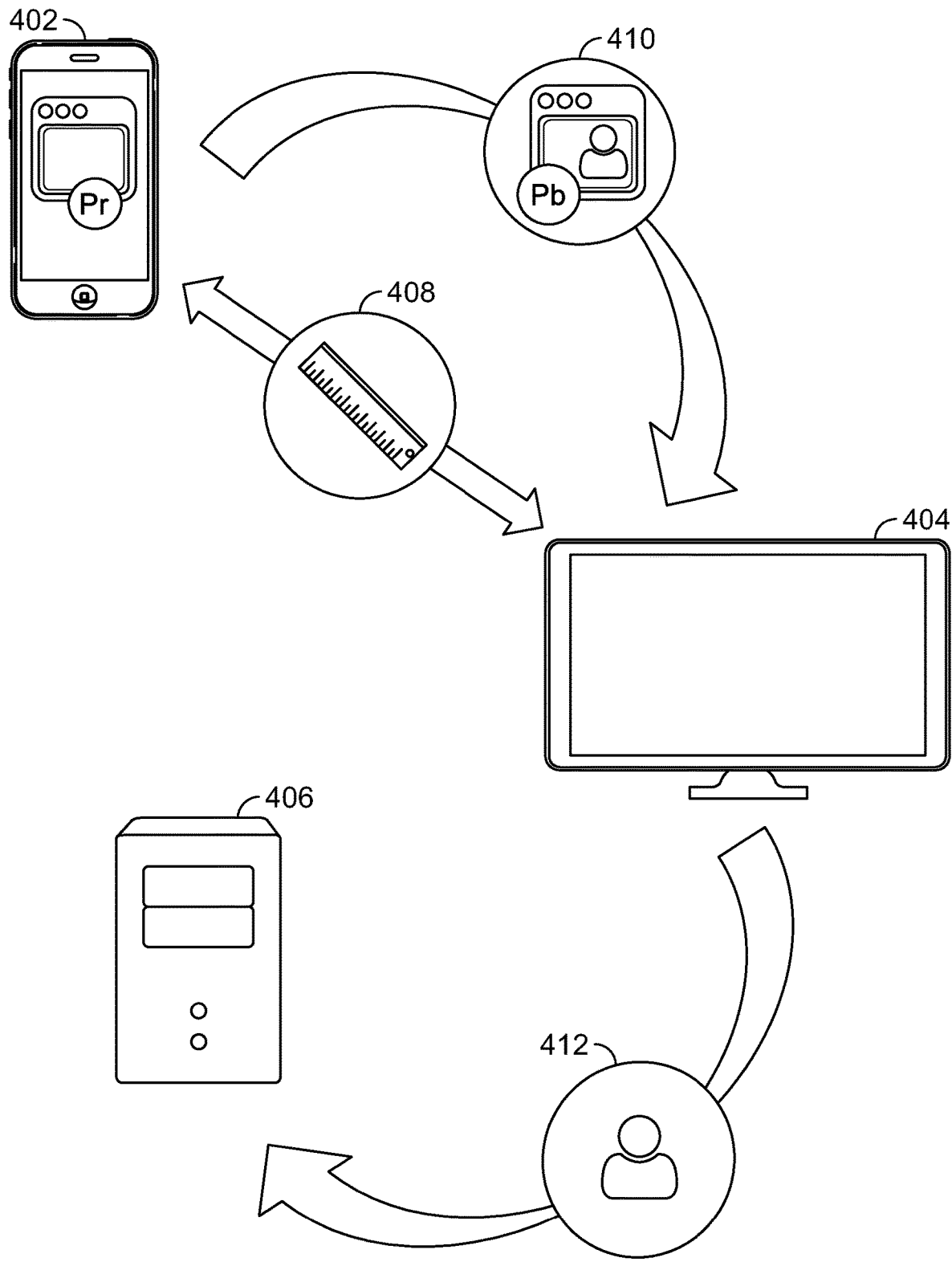
FIG. 4 shows a block diagram of a system that connects, to a private device, a public device that does not have an installed application associated with the media content, in accordance with some embodiments of the disclosure.

FIG. 4 shows block diagram 400 of a system that connects, to a private device, a public device that does not have an installed application associated with the media content, in accordance with some embodiments of the disclosure. The media guidance application may receive a communication from private device 402, implementing a private interface application, indicating that a user wishes to access content using public device 404. As previously mentioned, the communication received from private device 402 may be in the form of a communication protocol data unit (e.g., a packet, a frame, a cell, etc.) in which the destination of the data unit is the communication address of public device 404.

The media guidance application may then, as depicted in transfer 410, request, from private device 402, a public interface application (e.g., depicted as application with user silhouette and label "Pb"), wherein the public interface application includes (i) an interface for communicating with content provider 406, (ii) user authorization information (e.g., depicted as user silhouette), and (iii) a graphical user interface for display to the user on public device 404. In this case, the public interface application is configured to control the graphical user interface on public device 404 while private device 402 is within a predetermined proximity to public device 404. Verifying whether private device 402 is within the predetermined proximity is depicted as verification 408, which further depicts a measuring stick. The measuring stick specifically refers to measuring/approximating a physical distance between the respective devices. For example, the user's private device may be a smartphone. The smartphone may have stored, in memory, the private interface application and the public interface application prior to the connection between private device 402 and public device 404. The public interface application may be stored in the form of an installation package (e.g., executable file). If the public interface application is not already available at private device 402 when the media guidance application requests the public interface application, private device 402 may determine, via the media guidance application, the device type of public device 404. The device type may specify details about public device 404, such as the name, serial number, hardware classification and operating system (e.g., Windows™ computer, Android™ mobile device, iOS™ smart speaker, etc.) of public device 404. In response to determining the device type, the media guidance application may retrieve, at private device 402, the public interface application compatible with the device type from content provider 406.

As previously established, the user authorization information may comprise data required to verify the user's identity with content provider 406. In some embodiments, the user authorization information may be stored in the public interface application that has been requested. For example, the user may log in to the public interface application. In response to the user logging in, the media guidance application may transmit the public interface application from private device 402 to public device 404. Accordingly, the media guidance application may receive, at public device 404, the public interface application from private device 402.

The media guidance application may then activate the public interface application on public device 404, wherein initiating the public interface application includes establishing a communications path to a server of content provider 406. As previously discussed, activating the public interface application may involve loading the various processes, components and plug-ins required for the initialization of the public interface application. Additionally, the received public interface application may include a script that connects public device 404 to content provider 406 by establishing a communications path between the two. The communications path may be set over the Internet or a local network (e.g., content provider 406 may be a server owned by the user in which the user stored content for access). The media guidance application may then generate for display, on public device 404, the graphical user interface.

The media guidance application may, as depicted in transfer 412, provide, via the public interface application, the user authorization information (e.g., depicted as user silhouette) to a server of content provider 406. As discussed previously, in order to ensure the security of the user authorization information, the public interface application may create a token that comprises the data needed to verify the user's identity with the particular content provider (e.g., the username and password associated with content provider 406). Furthermore, the public interface application may encrypt the token such that only content provider 406 may decrypt the token and retrieve the information.

Figure 5:
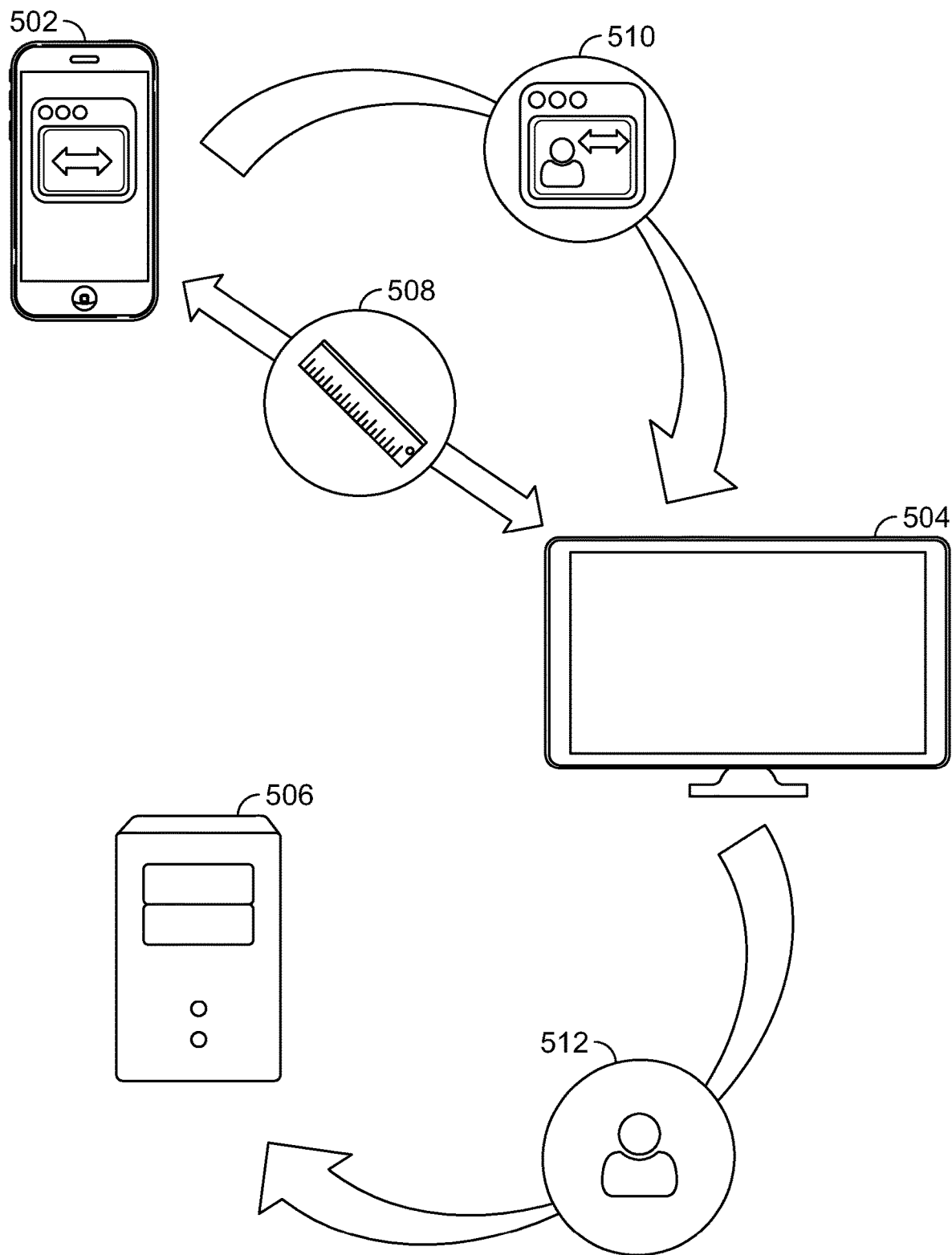
FIG. 5 shows a block diagram of a system that connects, to a public device, a private device that has installed a mirror-capable application associated with the media content, in accordance with some embodiments of the disclosure.

FIG. 5 shows block diagram 500 of a system that connects, to a public device, a private device that has installed a mirror-capable application associated with the media content, in accordance with some embodiments of the disclosure. The media guidance application may receive a communication from private device 502, implementing a private interface application (e.g., depicted as application featuring dual arrows), indicating that a user wishes to access content using public device 504. As previously mentioned, the communication received from private device 502 may be in the form of a communication protocol data unit (e.g., a packet, a frame, a cell, etc.) in which the destination of the data unit is the communication address of public device 504.

The media guidance application may then, as depicted in transfer 510, request, from private device 502, a public interface application (e.g., depicted as application with dual arrows and user silhouette), wherein the public interface application includes an interface for communicating with content provider 506, user authorization information, and a graphical user interface for display to the user on public device 504. Furthermore, the public interface application may be configured to mirror the graphical user interface on public device 504 to private device 502 while private device 502 is within a predetermined proximity to public device 504 (e.g., depicted via symbol of dual arrows). Determining whether private device 502 is within the predetermined proximity to public device 504 is visually depicted as verification 508, which features the symbol of a measuring stick. It should be noted that the graphical user interface may comprise menus, logos, guides, etc. In addition, the graphical user interface may include the display of content (e.g., the frames of a video or image). Accordingly, mirroring the graphical user interface from public device 504 to private device 502 reduces the processing power required to access various types of content via private device 502. For example, the public interface application may be a video game console (e.g., PlayStation™ 4) connected to a display and private device 502 is a handheld touchscreen tablet (e.g., iPad). If the user wishes to access a video game that is not compatible with the user's iPad or requires processing power much greater than the technical capabilities of the iPad, the user may choose to connect to a public PS4™ device to access the content. In this case, the public interface application may be the video game that the user is trying to access, or the user's video game library. From the perspective of private device 502, the public interface application is an application that may be activated on an external device other than private device 502. Accordingly, the media guidance application may transmit the public interface application (e.g., PlayStation™ Now application) to public device 504.

As previously established, the user authorization information may comprise data required to verify the user's identity with content provider 506 (e.g., the creator of the game). In some embodiments, the user authorization information may be stored in the public interface application that has been requested. For example, the user may log in to the public interface application. In response to the user logging in, the media guidance application may transmit the public interface application from private device 502 to public device 504 and thus the media guidance application may receive, at public device 504, the public interface application from private device 502.

The media guidance application may then activate the public interface application on public device 504, wherein initiating the public interface application includes establishing a communications path to a server of content provider 506. As previously discussed, activating the public interface application may involve loading the various processes, components and plug-ins required for the initialization of the public interface application. Additionally, the received public interface application may include a script that connects public device 504 to content provider 506 by establishing a communications path between the two. The communications path may be set over the Internet or a local network (e.g., content provider 506 may be a server owned by the user in which the user stored content for access). The media guidance application may then generate for display, on public device 504, the graphical user interface.

The media guidance application may, as depicted in transfer 512, provide, via the public interface application, the user authorization information (e.g., depicted as a user silhouette) to a server of content provider 506. As discussed previously, in order to ensure the security of the user authorization information, the public interface application may create a token that comprises the data needed to verify the user's identity with the particular content provider (e.g., the username and password associated with content provider 506). Furthermore, the public interface application may encrypt the token such that only content provider 506 may decrypt the token and retrieve the information.

The media guidance application may then transmit, to private device 502, a mirrored version of the graphical user interface, wherein the mirrored version of the graphical user interface is configured to (i) be displayed by a private interface application on private device 502, (ii) receive a user request for a media asset from content provider 506, and (iii) transmit the user request to the public interface application. Referring back to the example of video game content, the public interface application may be a video game or a video game library application. As established previously, the user may be using a tablet that cannot run the video game that the user wishes to access due to technical restrictions. However, mirroring the graphical user interface allows the user to access the video game content regardless of the technical restrictions. The private interface application may specifically be compatible with private device 502 and may receive a mirrored version of the graphical user interface to generate for display on private device 502. In some embodiments, the private interface application shows modifications of the graphical user interface, as displayed on the public device and at the same time, on the private device.

Figure 6:
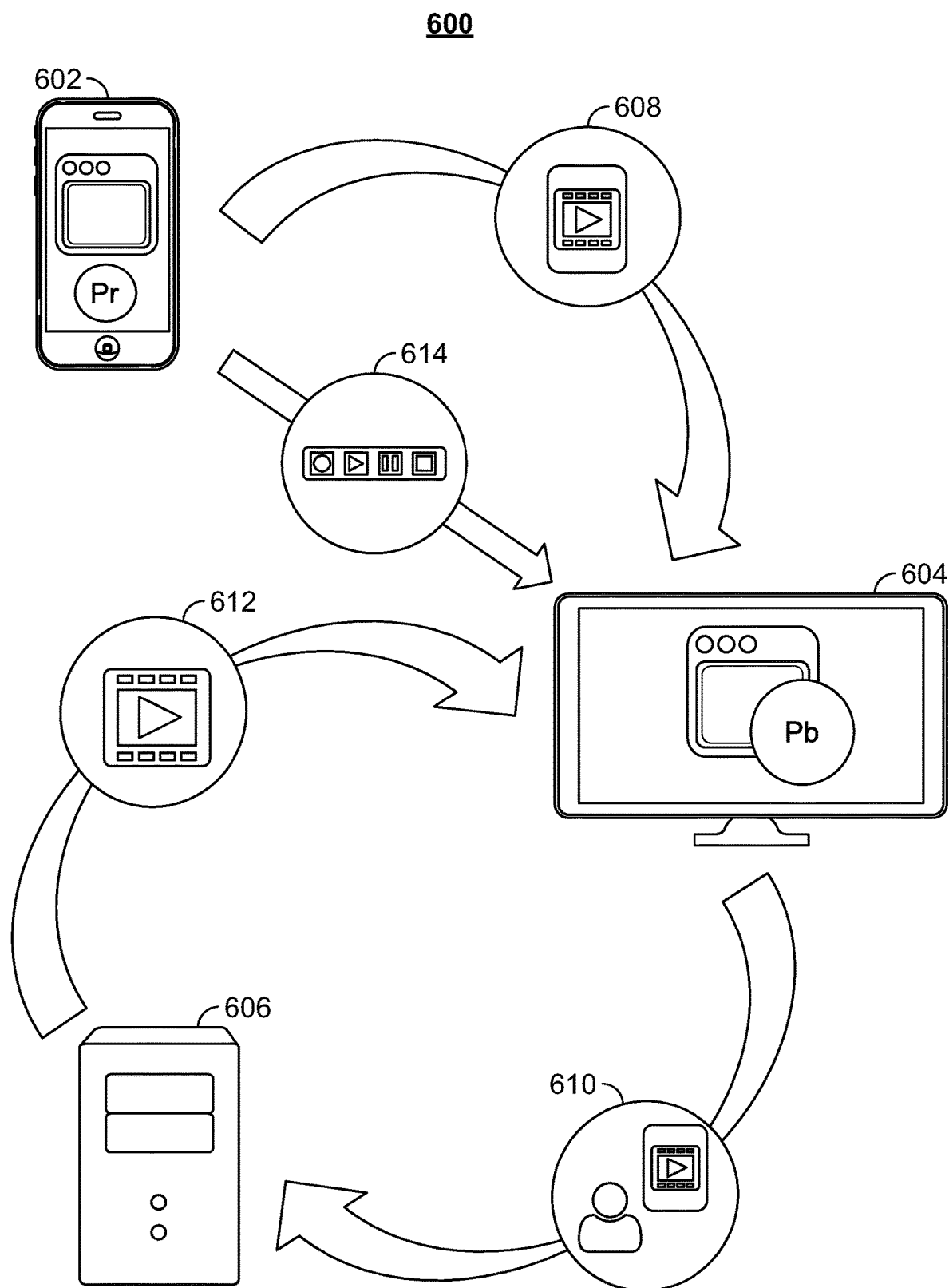
FIG. 6 shows a block diagram of a system that provides access to media content in response to determining a connection between the public device and the private device, in accordance with some embodiments of the disclosure.

FIG. 6 shows block diagram 600 of a system that provides access to media content in response to determining a connection between the public device and the private device, in accordance with some embodiments of the disclosure. The media guidance application may receive, as depicted in transfer 608, a user request, issued from the private interface application, for a media asset (e.g., depicted as movie reel) from content provider 606. For example, the public interface application may generate for display, on the graphical user interface, a grid/list of identifiers of media assets (e.g., movie posters, album art, etc.) offered by content provider 606. The user may use the private interface application to navigate the public interface application's graphical user interface. For example, the private interface application may have a graphical user interface that resembles a remote. The user may be able to select "up," "down," "left," and "right" on the private interface application to command the movement of a selector that highlights the identifiers on the public interface application. Once the user has made a selection of a media asset, the private interface application may transmit the user request for the media asset to the public interface application. In some embodiments, the user may enter an identifier of the media asset (e.g., the title of the media asset) in the public interface application (e.g., via a search bar). In response to receiving the selection, the public interface application may search for the identifier of the media asset in a media guidance data source that is associated with content provider 606. For example, the user may enter "harry potter" into a search bar on the private interface application. In response, the media guidance application may transfer the user selection to the public interface application, which may run a search for "harry potter" and provide relevant media assets (e.g., video files of "Harry Potter and the Chamber of Secrets" and "Harry Potter and the Prisoner of Azkaban").

The media guidance application may then, as depicted in transfer 610, request, at public device 604, the media asset from content provider 606. It should be noted that the public interface application (e.g., depicted as an application labelled "Pb") is on public device 604. For example, in response to determining the selected media asset in the user request, the media guidance application may instruct the public interface application to communicate with content provider 606 to request the media asset. The public interface application may then transmit the request for the media asset to a server of content provider 606 with the media asset. In some embodiments, transfer 610 may include user authorization information (e.g., depicted as a user silhouette).

The media guidance application may, as depicted in transfer 612, receive, at public device 604, the media asset (e.g., depicted as a movie reel) from content provider 606. For example, content provider 606 may determine, based on the user authorization information previously received, that the user is authorized to access the media asset. In response, content provider 606 may transmit the entire media asset to public device 604 (e.g., allow public device 604 to download the media asset) or may stream the media asset to public device 604. In some embodiments, the public interface application may determine that the media asset is requested by a plurality of users in a period of time. For example, public device 604 may keep track of the access history of various users (e.g., identifiers of the media assets accessed) and additional details (e.g., the commands issued at public device 604, the type of content accessed, the identifier of private device 602, etc.). In order to keep the user's identity private, the access history may be anonymous. In response to determining that the number of users of the plurality of users (e.g., 50) that requested the media asset is greater than a threshold (e.g., 30), the public interface application may store a cached copy of the media asset for use by future users.

The media guidance application may then generate, for consumption, the media asset in response to the user request. For example, the public interface application may display the media asset and allow the user to control trick play functions (e.g., play, pause, rewind, etc.) through the private interface application (e.g., the private interface application may present a graphical user interface resembling a remote) or through the public interface application (e.g., via touchscreen or buttons on public device 604). This is depicted in commands 614, which depicts trick-play functions. It should be noted that based on the type of media asset being accessed (e.g., movie, video game, shopping item, etc.), the private interface application may adjust its graphical user interface. For example, if the user is accessing a shopping item via content provider 606 such as Amazon™, the functions on the private interface application may become "Add to Cart," "Search Deals," and navigation functions (e.g., up arrow, down arrow, etc.).

Figure 7:
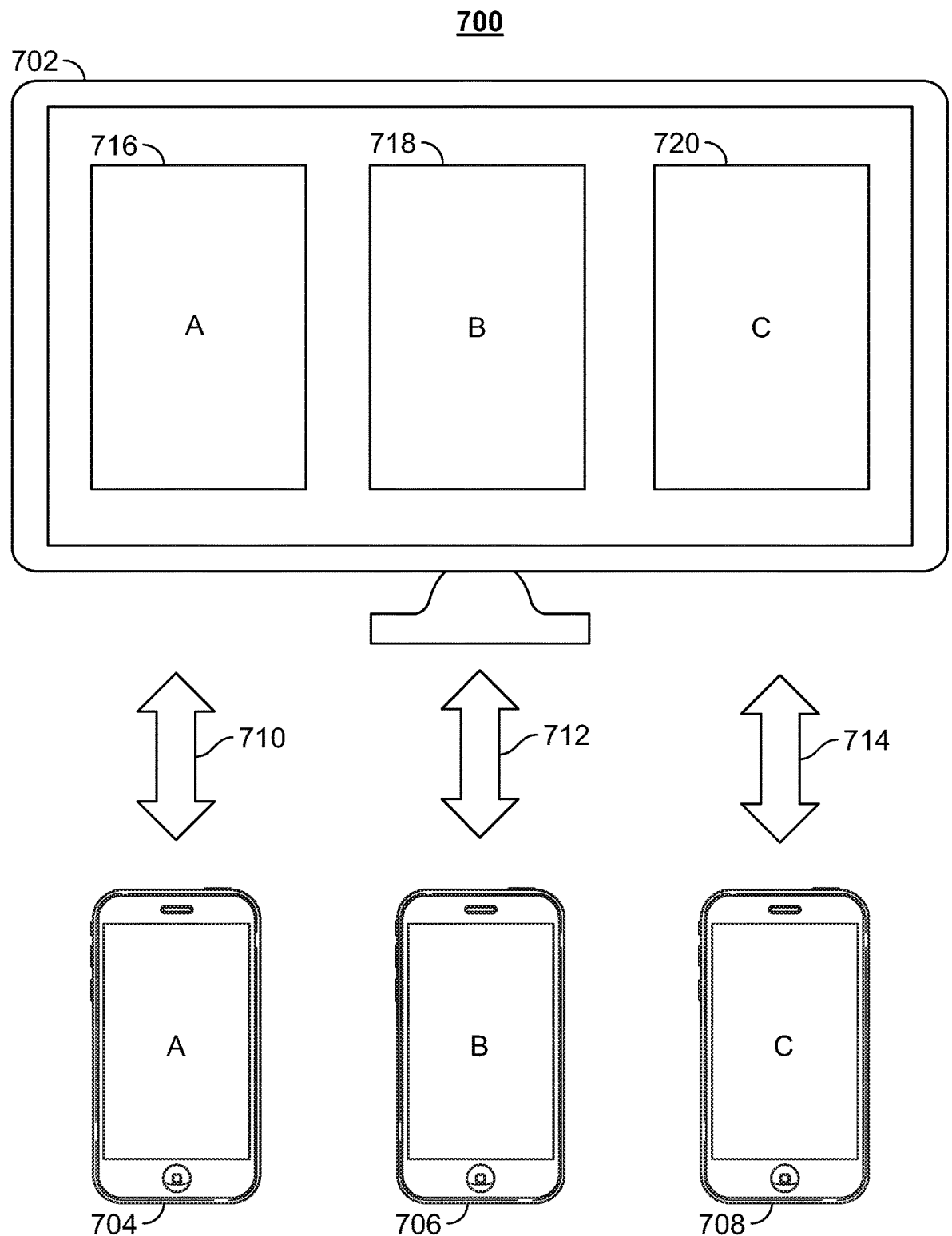
FIG. 7 shows an illustrative example of multiple private devices connecting to a public device, in accordance with some embodiments of the disclosure.

FIG. 7 shows illustrative example 700 of multiple private devices connecting to a public device, in accordance with some embodiments of the disclosure. Private device 704, private device 706, and private device 708 may individually and independently send respective communications requesting to connect and access content using public device 702. In response, the media guidance application may implement one of the aspects mentioned above for each device. It should be noted that the media guidance application may utilize a different aspect for each device, depending on various factors. These factors include determining whether the private device is running a private interface application associated with the content the respective user wishes to access, determining whether the private device has stored the public interface application for transfer to the private device, and whether the user desires to mirror the graphical user interface of the public interface application on the private interface application.

For example, private device 704 may be running a private interface application "A," private device 706 is running a private interface application "B," and private device 708 is running a private interface application "C." The devices may generate communications path 710, communications path 712, communications path 714 with public device 702, respectively. Each communications path represents a session between the private device and the public device. Thus, public device 702 may exchange communication data units (e.g., packets, frames cells, etc.) on the respective paths depending on the connection type with the private device (e.g., Internet, cellular, Bluetooth, etc.). As an example, each path may be used for transfer 208, 214, 310, 410, 510 and/or 608. Similarly, each path may be used for verification 308, 408, and/or 508, and commands 614.

For example, public device 702 may be a display. In response to initiating a connection session with multiple private devices, the media guidance application on public device 702 may allocate various portions of the display to a respective public interface application associated with a private interface application of each private device. In some embodiments, the allocation may be symmetrical (e.g., display gets split in three equivalent portions of equal resolution when three private devices are connected to the public device). In some embodiments, the allocation of resolution and screen size of each private interface application (e.g., depicted as application 716 "A," application 718 "B," and application 720 "C") may be based on the importance/type of the content displayed. For example, if application 720 is simply a music player and the content is an audio file, the media guidance application may determine that application 720 may allocate a smaller screen size and/or resolution for application 720. In another example, if application 718 is displaying breaking news or content tagged with importance by a content provider/authority (e.g., an emergency evacuation message tagged as "important" by a government), and the other applications on public device 702 are displaying content not tagged as important, the media guidance application may increase the resolution and/or screen size of application 718 and decrease the resolution and/or screen size of application 716 and application 720, accordingly. In some embodiments, private interface application "C" on private device 708 may mirror the graphical user interface of application 720. In some embodiments, private interface application "C" on private device 708 may control the graphical user interface of application 720.

In some embodiments, multiple users may be accessing videos on a single public device. In order to prevent the audio from all videos being accessed from being mixed, the audio of each respective application may be outputted on the associated private device. The public device may split a video media asset, received from the content provider, into a visual and audio media asset, respectively. The public device may forward the audio media asset to the private device. The public device may also identify an audio I/O device associated with the user, such as headphones or speakers, and forward the audio media asset to the audio I/O device.

Suppose that public device 702 is a smart speaker. Due to the absence of a display, the commands received from each of the private devices may be queued and executed in the order in which they were received. In some embodiments, the importance of a command is determined by the media guidance application. Accordingly, a command with a higher importance is executed first and a command with a lower importance is executed subsequently. In some embodiments, the commands are executed simultaneously. For example, a first command from a first private device (e.g. private device 704) may be a verbal input asking the public device to turn on the lights. A second command from a second private device (e.g., private device 706) may be a textual input asking the public device to lower the thermostat temperature. In response to receiving both commands, the public device may execute both commands simultaneously by turning on the lights of the environment and lowering the thermostat temperature at the same time.

Figure 8:
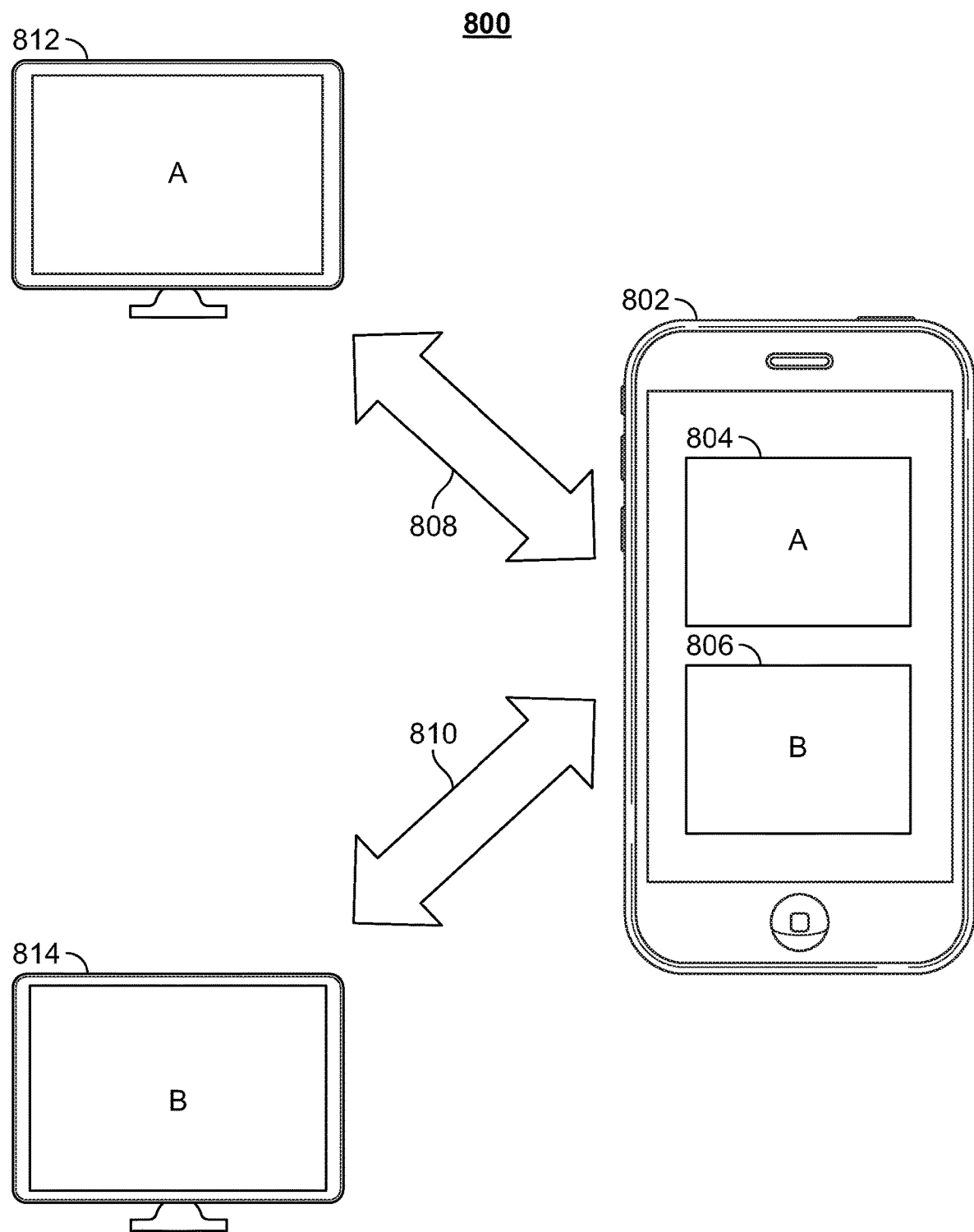
FIG. 8 shows an illustrative example of a private device connecting to multiple public devices, in accordance with some embodiments of the disclosure.

FIG. 8 shows illustrative example 800 of a private device connecting to multiple public devices, in accordance with some embodiments of the disclosure. In this example, private device 802 may communicate with public device 812 and public device 814 in order to access content. In response to receiving a request from private device 802, public device 812 and public device 814 may each utilize one of the aspects of establishing a connection mentioned previously. More specifically, the media guidance application may create communications paths 808 and 810 between public device 812 and private device 802, and public device 814 and private device 802, respectively. Private device 802 may request to access different types of content on each public device. For example, private interface application 804 "A" may be a video streaming application such as YouTube and private interface application 806 "B" may be a music streaming application such as Spotify. The media guidance application may retrieve the public interface application associated with YouTube on public device 812 from the content provider YouTube. Likewise, the media guidance application may retrieve the public interface application associated with Spotify on public device 814 from the content provider Spotify. Private device 802 may simultaneously run private interface application 804 and private interface application 806. In some embodiments, private device 802 may run one private interface application and connect to multiple public devices (e.g., public device 812 and 814). The respective public devices may retrieve and run the same public interface application. Private device 802 may select the same media asset to be generated for display on each public device (e.g., each playing simultaneously at the same/different play positions), or different media assets.

Figure 9:
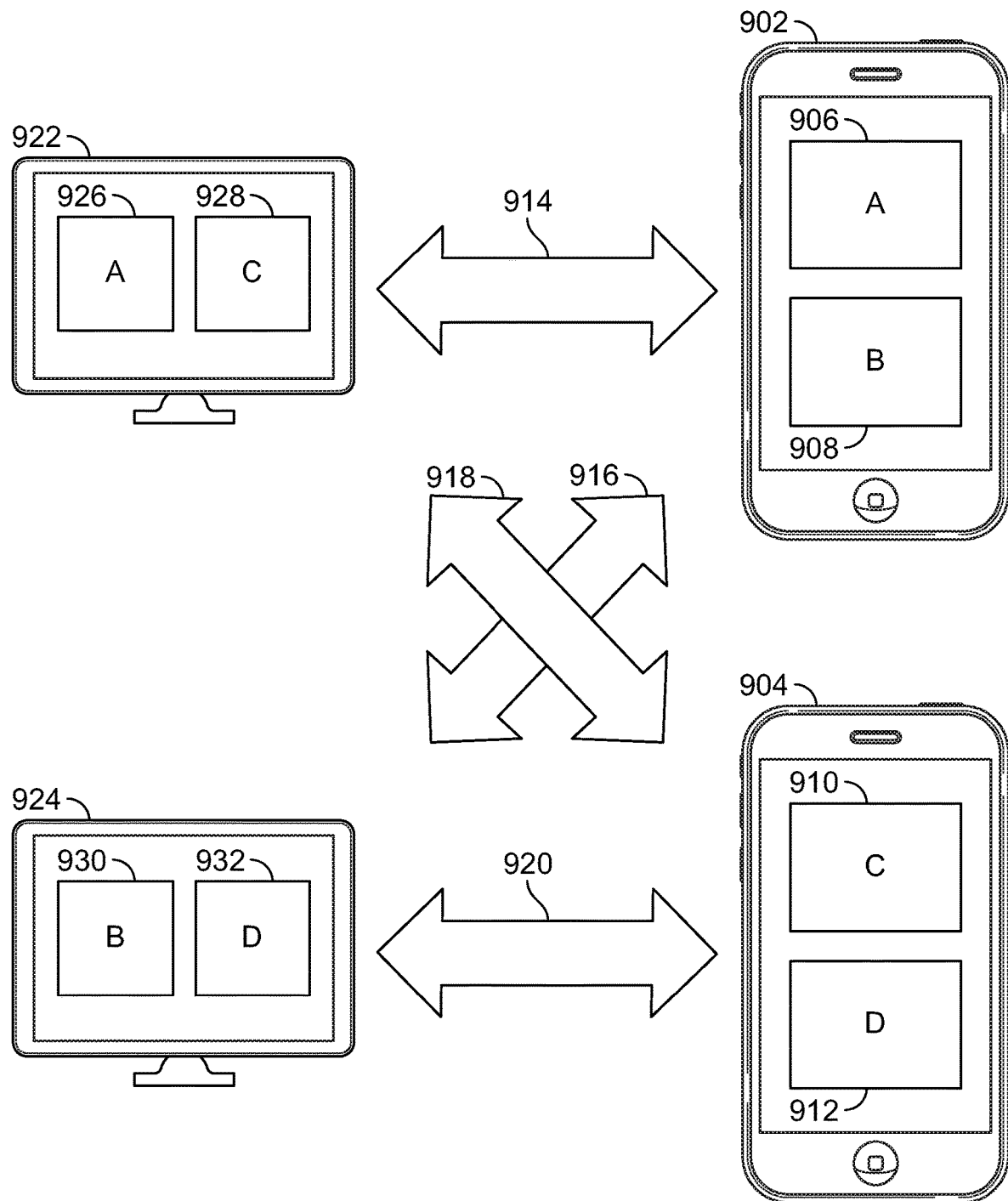
FIG. 9 shows an illustrative example of multiple private devices connecting to multiple public devices, in accordance with some embodiments of the disclosure.

FIG. 9 shows illustrative example 900 of multiple private devices connecting to multiple public devices, in accordance with some embodiments of the disclosure. FIG. 9 combines the concepts disclosed in FIG. 7 and FIG. 8. In example 900, two private devices, private device 902 and private device 904, are connected to two public devices, public device 922 and public device 924. The media guidance application for each respective public device may initiate sessions with each of the private devices in response to receiving communications requesting to connect from the private devices.

Starting with private device 902, which may be running two private devices, private interface application 906 "A" and private interface application 908 "B," the media guidance application may form communications path 914 with public device 922, and communications path 916 with public device 924. Public device 922 may thus retrieve, from either the content provider, an external server, or private device 902, public interface application 926 that is associated with private interface application 906. Similarly, public device 924 may retrieve public interface application 930 that is associated with private interface application 908.

Continuing with private device 904, which may be running two private devices, private interface application 910 "C" and private interface application 912 "D," the media guidance application may form communications path 918 with public device 922, and communications path 920 with public device 924. Public device 922 may thus retrieve, from either the content provider, an external server, or private device 902, public interface application 928 that is associated with private interface application 910. Similarly, public device 924 may retrieve public interface application 932 that is associated with private interface application 912.

Private device 902 and/or private device 904 may be running several (e.g., five) private interface applications simultaneously. The private device may wish to access content associated with three of the private interface applications on public device 922, and two of the private interface applications on public device 924. In other words, the private device is not limited to running a single application on each device.

Figure 10:
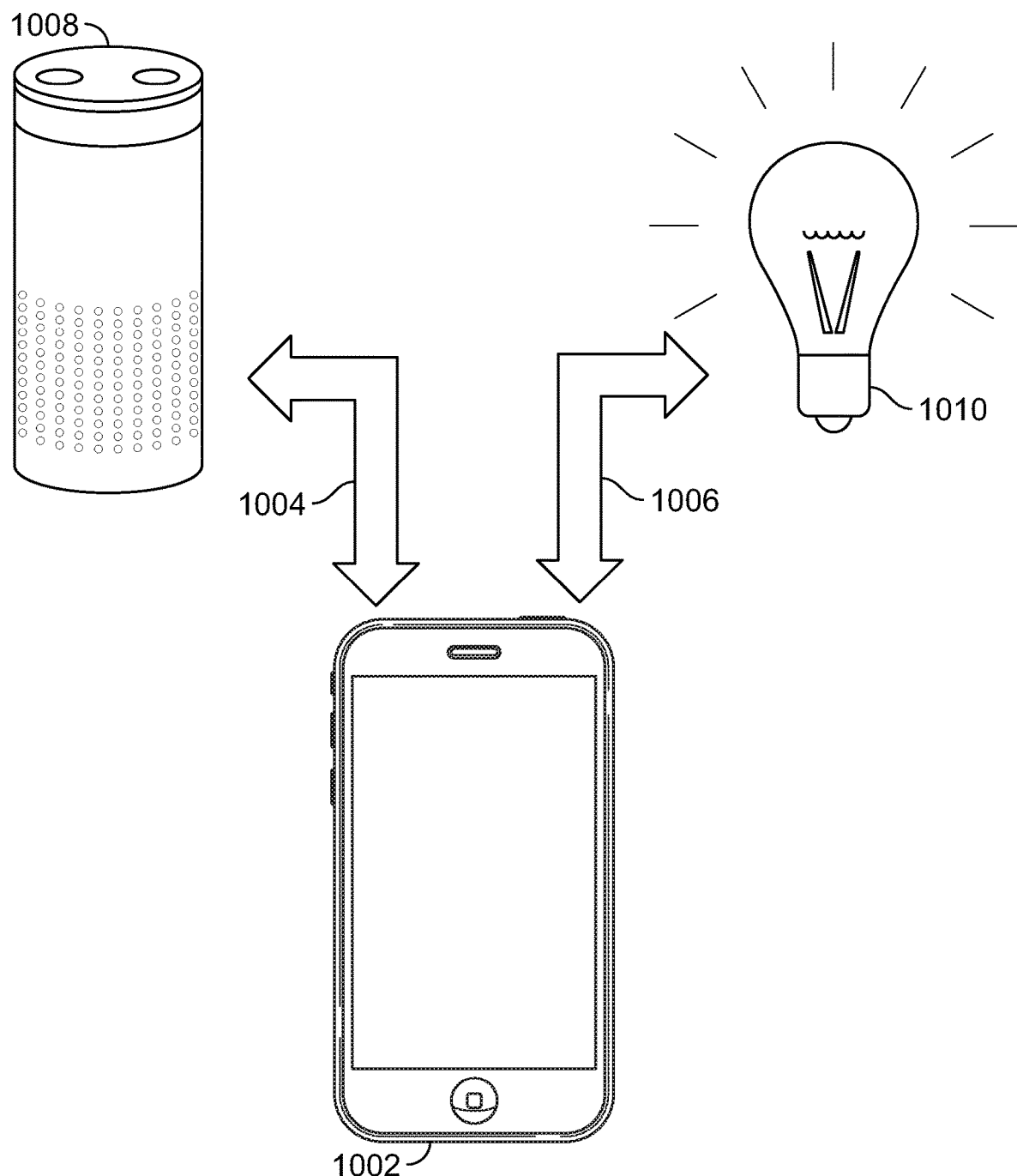
FIG. 10 shows an illustrative example of a private device connecting to multiple public devices without displays, in accordance with some embodiments of the disclosure.

FIG. 10 shows illustrative example 1000 of a private device connecting to multiple public devices without displays, in accordance with some embodiments of the disclosure. As shown, private device 1002 may be a smartphone/tablet, public device 1008 may be a smart speaker (e.g. Amazon™ Echo), and public device 1010 may be a smart bulb. In response to receiving, at public device 1008 and public device 1010, requests to connect from private device 1002, the media guidance application may create communications path 1004 and communications path 1006, respectively. Accordingly, private device 1002 may send commands such as "turn off" to public device 1010 and commands such as "tell me the weather" to public device 1008.

In some embodiments, the public interface application is configured as a thick client for performing data processing operations to facilitate communications with the content provider and display of the media asset, and the private interface application is configured as a thin client for presenting processed data provided by the public interface application. Thus, the private device is not required to perform heavy processing and users can easily access content. The private interface application is also therefore dependent on the public interface application for performing bandwidth-intensive operations (e.g., communicating with the content provider, retrieving content, etc.).

In some embodiments, the media guidance application may retrieve network connection credentials from the private device in response to activating the public interface application on the public device. The network connection credentials may be a form of the connection parameters that are associated with the authorization key. The media guidance application may thus connect to a network based on the network connection credentials. For example, the network connection credentials may detail a Bluetooth connection. Therefore, the media guidance application may establish a Bluetooth connection to allow the public interface application to communicate with the private interface application.

In some embodiments, the user authorization information is a universally unique identifier (UUID) or globally unique identifier (GUID) generated by the private interface application in response to verifying a login name and password entered into the private interface application, and wherein the user authorization information is valid for a predetermined time after verifying the login name and password. For example, the user authorization may be an identifier that represents the user's login name and password. Accordingly, the actual values of the login name and password are not exposed to the public device. Instead, the media guidance application assigns a UUID or a GUID associated with the user in response to verifying the user's login name/username and password. For example, the predetermined time may be one hour. Thus, the UUID and GUID may become invalid after one hour. The media guidance application may then re-verify the user's login name and password.

In some embodiments, in response to receiving, at the public device, either (1) both the user authorization information and the identifier for the content provider, (2) the public interface application from the private device, or (3) both the user authorization information and the identifier for the private interface application, the media guidance application may generate, at the public device, an authorization key unique to the private device based on (i) the user authorization information, (ii) the identifier and (iii) connection parameters. For example, the identifier for the content provider may be the retailer "Amazon™." The user authorization information may thus comprise a username and password to the user's Amazon™ shopping account. The connection parameters represent conditions that must be met in order to maintain the connection between the public device and the private device. For example, the connection parameters may comprise the predetermined proximity to the public device, within which the private device must remain in order for the authorization key to remain valid. Additionally, the connection parameters may comprise restrictions on inaccessible media assets that the user may request. For example, the user may request a video game that requires heavy processing and features high-end graphics. In this example, the public device cannot generate for display the video game because the requirements of the video game exceed the public device's technical capabilities. For example, the public device may have limitations in CPU processing power, memory, graphics (e.g., resolution), or connectivity (e.g., network bandwidth). In the absence of connection parameters, the public device may get damaged while trying to generate for display the video game (e.g., may cause corrupted files and/or overheating at the motherboard). Accordingly, the media guidance application may take the public device's technical capabilities into consideration and limit the user to access media assets that the public device can display. This information is thus included in the connection parameters. Similarly, the connection parameters may include information such as the connection type (e.g., Wi-fi, cellular data, etc.) established between the private device and public device, the location of the respective devices, time limits for accessing the public device, etc. The authorization key may serve as an encryption key that comprises user authorization information, the identifier of the content provider, and the connection parameters, and may be unique for each private device. This provides security and prevents other devices from sending commands on the behalf of the private device.

The media guidance application may then transmit, to the private device, the authorization key and in response to transmitting the authorization key, the media guidance application may initiate a session, at the public device, with the private device. The session may be a formal connection between the public device and the private device in which the commands can be exchanged between the respective devices. It should be noted that the authorization key is required to cause the public device to execute commands received from the private device during the session. For example, the private interface application may transmit the authorization key alongside the command that the public device must execute. In response to receiving the authorization key and the command, the public interface application may decrypt and parse the authorization key to determine whether the command should be executed. If the public interface application determines that the connection parameters of the authorization key are not satisfied, or that the authorization key is corrupt/faulty/missing, the public interface application may not execute the command.

In some embodiments, the public interface application may be configured to automatically remove the user authorization information from memory on the public device upon deactivation (e.g., ending the session) of the public interface application on the public device. Additionally, the private interface application may be configured to retain the user authorization information in memory on the private device upon deactivation of the private interface application on the private device. For example, the media guidance application may remove the user authorization information from the public device to prevent other users from accessing the user's content. As mentioned previously, the user authorization information may be in the form of a UUID or a GUID. Accordingly, the media guidance application may store the user authorization information on the public device. If the predetermined time in which the UUID/GUID is valid is five days, the media guidance application may seamlessly connect the public device and the private device without the need for verifying the user's login name and password for the content provider within the five days.

In some embodiments, the media guidance application may receive, at the public device, a received signal strength indicator (RSSI) from the private device. An RSSI represents the power of a received signal. The media guidance application may then approximate a distance between the public device and the private device. For example, the media guidance application may determine that the RSSI of the original transmitted signal is 0 and the RSSI received at the private device is −20. The media guidance application may determine, using a lookup table that returns distance as a function of RSSI, the distance between the private device and the public device. In some embodiments, the public device may include a depth camera that can approximate the distance between the user and the public device. When initiating the communication between the private device and the public device, the private device may send a device identifier (e.g., name of the private device, image of the private device, serial number, etc.) to the public device. The media guidance application may thus perform image processing to recognize the private device in a captured video from the depth camera. In response to identifying the private device, the media guidance application may determine the distance between the private device and the public device.

The media guidance application may then compare the distance to a threshold distance, corresponding to the predetermined proximity, to determine whether the private device is within the predetermined proximity to the public device. For example, the media guidance application may determine that the private device is three meters away from the public device. For example, the threshold distance may be four meters with respect to the direction in which the private device is situated (e.g., the threshold distance may be different depending on the plane the private device and the public device share). In response to determining that the distance is greater than the threshold distance, the media guidance application may transmit a timestamp for a playback position to the content provider and may deactivate (e.g., end the session) the public interface application on the public device. For example, the media guidance application may determine that the private device is no longer within the predetermined proximity. In this example, the user may be accessing a movie from the content provider Netflix™. In response to determining that the private device is not within the predetermined proximity, the media guidance application may send the timestamp of the last playback position during which the private device was within the predetermined proximity, to Netflix™. Therefore, if the user chooses to access the movie at a later time at a different device, the user may continue from the playback position.

In some embodiments, the media guidance application may receive an additional user request, issued from the private interface application, for an additional application from the content provider. For example, the content provider may be Amazon™ and the public interface application is a retail application that displays shopping items to the user. The user may request an additional application from Amazon™, such as the video streaming application Amazon™ Prime Video. Accordingly, the media guidance application may request, at the public device, the additional application from the content provider by sending a communication to the content provider. In response, the media guidance application may also receive, at the public device, the additional application from the content provider and activate the additional application. The media guidance application may thus run, at the public device, the additional application and the public interface application simultaneously.

In some embodiments, the media guidance application may receive an additional user request, issued from the private interface application, for an additional application from a different content provider. For example, the original content provider may be Amazon™ and the public interface application is a retail application that displays shopping items to the user. The user may request an additional application from the video streaming content provider Netflix™. Accordingly, the media guidance application may request, at the public device, the additional application from the different content provider (e.g., Netflix™) by sending a communication to the content provider. In response, the media guidance application may also receive, at the public device, the additional application from the different content provider, and activate the additional application. The media guidance application may thus run, at the public device, the additional application and the public interface application simultaneously.

It should be noted that the embodiments discussed above are also applicable when multiple private devices are connected to multiple public devices, or when private devices are connecting to public devices that do not have displays. For example, the media guidance application may generate an authorization key for each private device and may determine whether each private device is within the predetermined proximities to the public devices that the private device is connected to. Therefore, any of the aspects and embodiments mentioned above could be used to implement the examples in FIGS. 7-10.

Users in a content delivery system desire a form of media guidance through an interface that allows users to connect to devices, efficiently navigate content selections, and give executable commands. An application that provides such guidance is referred to herein as an interactive media guidance application or, sometimes, a media guidance application or a guidance application.

Interactive media guidance applications may take various forms depending on the content for which they provide guidance. For instance, a media guidance application may run in the background of a user equipment device and monitor a user's activity. In response to receiving a user command at the user equipment device (e.g., directed towards the media guidance application and/or any alternate application), the media guidance application may execute various processes that the media guidance application is configured to implement. A media guidance application may also be stored on a remote server and may monitor several user equipment devices in real-time through the use of a wireless/wired connection. The media guidance application may execute processes at any of the respective user equipment devices depending on the user commands received at the respective user equipment devices.

Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 11:
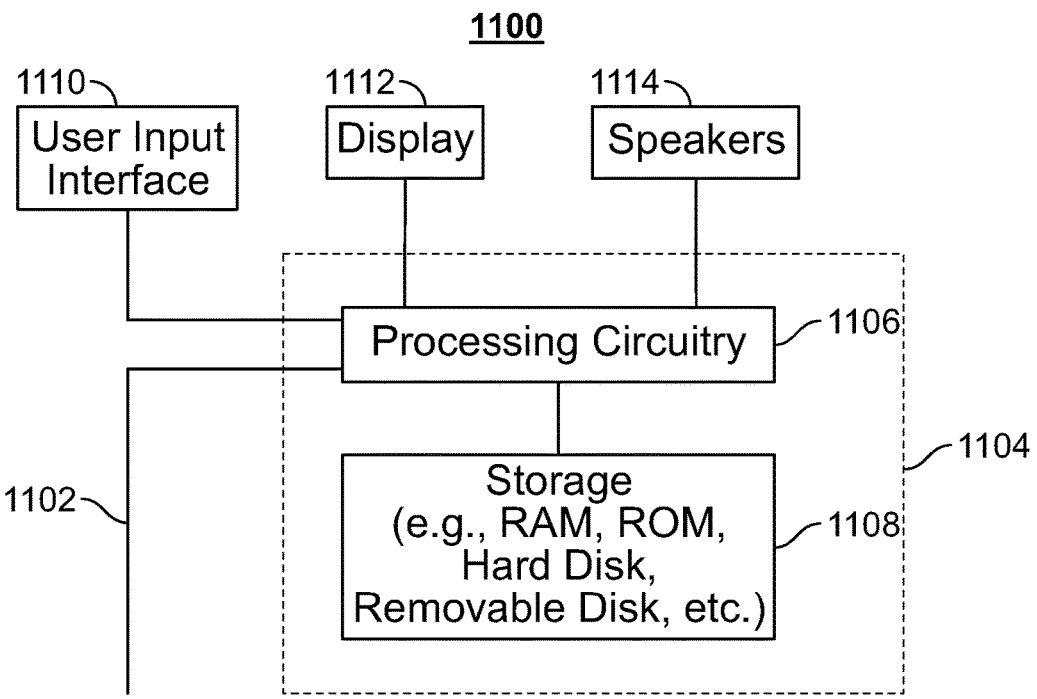
FIG. 11 is a block diagram of an illustrative user equipment device in accordance with some embodiments of the disclosure.

Users may access content and the media guidance application (and its display screens described above and below) from one or more of their user equipment devices. FIG. 11 shows a generalized embodiment of illustrative user equipment device 1100. More specific implementations of user equipment devices are discussed below in connection with FIG. 12. User equipment device 1100 may receive content and data via input/output (hereinafter "I/O") path 1102. I/O path 1102 may provide content (e.g., broadcast programming, on-demand programming, Internet content, content available over a local area network (LAN) or wide area network (WAN), and/or other content) and data to control circuitry 1104, which includes processing circuitry 1106 and storage 1108. Control circuitry 1104 may be used to send and receive commands, requests, and other suitable data using I/O path 1102. I/O path 1102 may connect control circuitry 1104 (and specifically processing circuitry 1106) to one or more communications paths (described below). I/O functions may be provided by one or more of these communications paths, but are shown as a single path in FIG. 11 to avoid overcomplicating the drawing.

Control circuitry 1104 may be based on any suitable processing circuitry such as processing circuitry 1106. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1104 executes instructions for a media guidance application stored in memory (i.e., storage 1108). Specifically, control circuitry 1104 may be instructed by the media guidance application to perform the functions discussed above and below. For example, the media guidance application may provide instructions to control circuitry 1104 to generate the media guidance displays. In some implementations, any action performed by control circuitry 1104 may be based on instructions received from the media guidance application.

In client-server based embodiments, control circuitry 1104 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 12). In addition, communications circuitry may include circuitry that enables peer-to-peer communication of user equipment devices, or communication of user equipment devices in locations remote from each other (described in more detail below).

Memory may be an electronic storage device provided as storage 1108 that is part of control circuitry 1104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1108 may be used to store various types of content described herein as well as media guidance data described above. Nonvolatile memory may also be used (e.g., to launch a boot-up routine and other instructions). Cloud-based storage, described in relation to FIG. 12, may be used to supplement storage 1108 or instead of storage 1108.

Control circuitry 1104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1104 may also include scaler circuitry for upconverting and downconverting content into the preferred output format of the user equipment 1100. Circuitry 1104 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1108 is provided as a separate device from user equipment 1100, the tuning and encoding circuitry (including multiple tuners) may be associated with storage 1108.

A user may send instructions to control circuitry 1104 using user input interface 1110. User input interface 1110 may be any suitable user interface, such as a remote control, mouse, trackball, keypad, keyboard, touch screen, touchpad, stylus input, joystick, voice recognition interface, or other user input interfaces. Display 1112 may be provided as a stand-alone device or integrated with other elements of user equipment device 1100. For example, display 1112 may be a touchscreen or touch-sensitive display. In such circumstances, user input interface 1110 may be integrated with or combined with display 1112. Display 1112 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1112 may be HDTV-capable. In some embodiments, display 1112 may be a 3D display, and the interactive media guidance application and any suitable content may be displayed in 3D. A video card or graphics card may generate the output to the display 1112. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1104. The video card may be integrated with the control circuitry 1104. Speakers 1114 may be provided as integrated with other elements of user equipment device 1100 or may be stand-alone units. The audio component of videos and other content displayed on display 1112 may be played through speakers 1114. In some embodiments, the audio may be distributed to a receiver (not shown), which processes and outputs the audio via speakers 1114.

The guidance application may be implemented using any suitable architecture. For example, it may be a stand-alone application wholly-implemented on user equipment device 1100. In such an approach, instructions of the application are stored locally (e.g., in storage 1108), and data for use by the application is downloaded on a periodic basis (e.g., from an out-of-band feed, from an Internet resource, or using another suitable approach). Control circuitry 1104 may retrieve instructions of the application from storage 1108 and process the instructions to generate any of the displays discussed herein. Based on the processed instructions, control circuitry 1104 may determine what action to perform when input is received from input interface 1110. For example, movement of a cursor on a display up/down may be indicated by the processed instructions when input interface 1110 indicates that an up/down button was selected.

In some embodiments, the media guidance application is a client-server based application. Data for use by a thick or thin client implemented on user equipment device 1100 is retrieved on-demand by issuing requests to a server remote to the user equipment device 1100. In one example of a client-server based guidance application, control circuitry 1104 runs a web browser that interprets web pages provided by a remote server. For example, the remote server may store the instructions for the application in a storage device. The remote server may process the stored instructions using circuitry (e.g., control circuitry 1104) and generate the displays discussed above and below. The client device may receive the displays generated by the remote server and may display the content of the displays locally on equipment device 1100. This way, the processing of the instructions is performed remotely by the server while the resulting displays are provided locally on equipment device 1100. Equipment device 1100 may receive inputs from the user via input interface 1110 and transmit those inputs to the remote server for processing and generating the corresponding displays. For example, equipment device 1100 may transmit a communication to the remote server indicating that an up/down button was selected via input interface 1110. The remote server may process instructions in accordance with that input and generate a display of the application corresponding to the input (e.g., a display that moves a cursor up/down). The generated display is then transmitted to equipment device 1100 for presentation to the user.

In some embodiments, the media guidance application is downloaded and interpreted or otherwise run by an interpreter or virtual machine (run by control circuitry 1104). In some embodiments, the guidance application may be encoded in the ETV Binary Interchange Format (EBIF), received by control circuitry 1104 as part of a suitable feed, and interpreted by a user agent running on control circuitry 1104. For example, the guidance application may be an EBIF application. In some embodiments, the guidance application may be defined by a series of JAVA-based files that are received and run by a local virtual machine or other suitable middleware executed by control circuitry 1104. In some of such embodiments (e.g., those employing MPEG-2 or other digital media encoding schemes), the guidance application may be, for example, encoded and transmitted in an MPEG-2 object carousel with the MPEG audio and video packets of a program.

Figure 12:
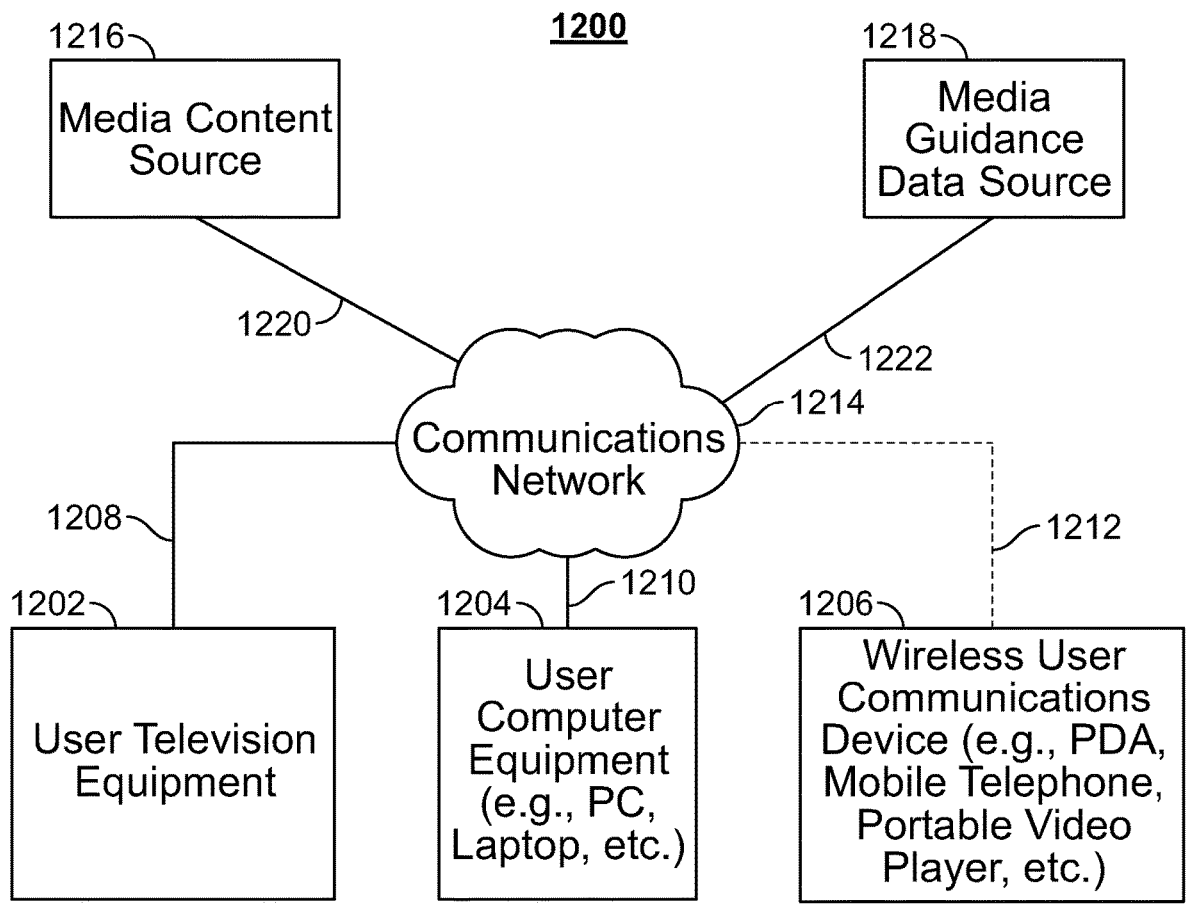
FIG. 12 is a block diagram of an illustrative media system in accordance with some embodiments of the disclosure.

User equipment device 1100 of FIG. 11 can be implemented in system 1200 of FIG. 12 as user television equipment 1202, user computer equipment 1204, wireless user communications device 1206, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 11 may not be classified solely as user television equipment 1202, user computer equipment 1204, or a wireless user communications device 1206. For example, user television equipment 1202 may, like some user computer equipment 1204, be Internet-enabled allowing for access to Internet content, while user computer equipment 1204 may, like some television equipment 1202, include a tuner allowing for access to television programming. The media guidance application may have the same layout on various different types of user equipment or may be tailored to the display capabilities of the user equipment. For example, on user computer equipment 1204, the guidance application may be provided as a web site accessed by a web browser. In another example, the guidance application may be scaled down for wireless user communications devices 1206.

In system 1200, there is typically more than one of each type of user equipment device but only one of each is shown in FIG. 12 to avoid overcomplicating the drawing. In addition, each user may utilize more than one type of user equipment device and also more than one of each type of user equipment device.

In some embodiments, a user equipment device (e.g., user television equipment 1202, user computer equipment 1204, wireless user communications device 1206) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1214. Namely, user television equipment 1202, user computer equipment 1204, and wireless user communications device 1206 are coupled to communications network 1214 via communications paths 1208, 1210, and 1212, respectively. Communications network 1214 may be one or more networks including the Internet, a mobile phone network, mobile voice or data network (e.g., a 4G or LTE network), cable network, public switched telephone network, or other types of communications network or combinations of communications networks. Paths 1208, 1210, and 1212 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1212 is drawn with dotted lines to indicate that in the exemplary embodiment shown in FIG. 12 it is a wireless path and paths 1208 and 1210 are drawn as solid lines to indicate they are wired paths (although these paths may be wireless paths, if desired). Communications with the user equipment devices may be provided by one or more of these communications paths, but are shown as a single path in FIG. 12 to avoid overcomplicating the drawing.

Although communications paths are not drawn between user equipment devices, these devices may communicate directly with each other via communications paths, such as those described above in connection with paths 1208, 1210, and 1212, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1214.

System 1200 includes content source 1216 and media guidance data source 1218 coupled to communications network 1214 via communications paths 1220 and 1222, respectively. Paths 1220 and 1222 may include any of the communications paths described above in connection with paths 1208, 1210, and 1212. Communications with the content source 1216 and media guidance data source 1218 may be exchanged over one or more communications paths, but are shown as a single path in FIG. 12 to avoid overcomplicating the drawing. In addition, there may be more than one of each of content source 1216 and media guidance data source 1218, but only one of each is shown in FIG. 12 to avoid overcomplicating the drawing. (The different types of each of these sources are discussed below.) If desired, content source 1216 and media guidance data source 1218 may be integrated as one source device. Although communications between sources 1216 and 1218 with user equipment devices 1202, 1204, and 1206 are shown as through communications network 1214, in some embodiments, sources 1216 and 1218 may communicate directly with user equipment devices 1202, 1204, and 1206 via communications paths (not shown) such as those described above in connection with paths 1208, 1210, and 1212.

Content source 1216 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1216 may be the originator of content (e.g., a television broadcaster, a Webcast provider, etc.) or may not be the originator of content (e.g., an on-demand content provider, an Internet provider of content of broadcast programs for downloading, etc.). Content source 1216 may include cable sources, satellite providers, on-demand providers, Internet providers, over-the-top content providers, or other providers of content. Content source 1216 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1218 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1218 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1218 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1218 may provide user equipment devices 1202, 1204, and 1206 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 1108, and executed by control circuitry 1104 of a user equipment device 1100. In some embodiments, media guidance applications may be client-server applications where only a client application resides on the user equipment device, and server application resides on a remote server. For example, media guidance applications may be implemented partially as a client application on control circuitry 1104 of user equipment device 1100 and partially on a remote server as a server application (e.g., media guidance data source 1218) running on control circuitry of the remote server. When executed by control circuitry of the remote server (such as media guidance data source 1218), the media guidance application may instruct the control circuitry to generate the guidance application displays and transmit the generated displays to the user equipment devices. The server application may instruct the control circuitry of the media guidance data source 1218 to transmit data for storage on the user equipment. The client application may instruct control circuitry of the receiving user equipment to generate the guidance application displays.

Content and/or media guidance data delivered to user equipment devices 1202, 1204, and 1206 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX™, and HULU, which provide audio and video via IP packets. Youtube is a trademark owned by Google Inc., Netflix™ is a trademark owned by Netflix™ Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1200 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 12.

In one approach, user equipment devices may communicate with each other within a home network. User equipment devices can communicate with each other directly via short-range point-to-point communication schemes described above, via indirect paths through a hub or other similar device provided on a home network, or via communications network 1214. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1216 to access content. Specifically, within a home, users of user television equipment 1202 and user computer equipment 1204 may access the media guidance application to navigate among and locate desirable content. Users may also access the media guidance application outside of the home using wireless user communications devices 1206 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1214. These cloud resources may include one or more content sources 1216 and one or more media guidance data sources 1218. In addition or in the alternative, the remote computing sites may include other user equipment devices, such as user television equipment 1202, user computer equipment 1204, and wireless user communications device 1206. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1204 or wireless user communications device 1206 having content capture feature. Alternatively, the user can first transfer the content to a user equipment device, such as user computer equipment 1204. The user equipment device storing the content uploads the content to the cloud using a data transmission service on communications network 1214. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 11.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 13:
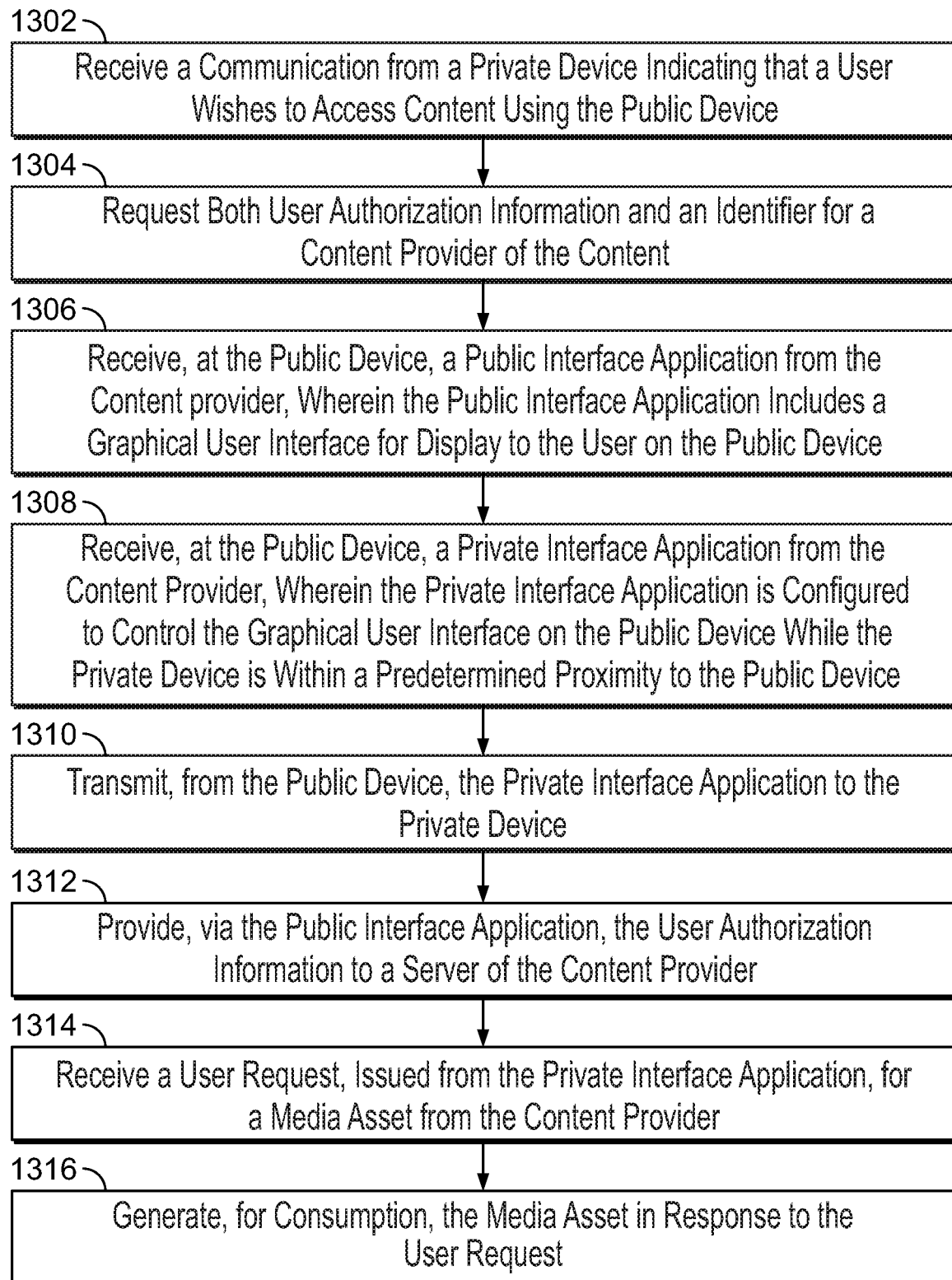
FIG. 13 is a flowchart of an illustrative process for providing access to media content by connecting, to a public device, a private device that does not have an installed application associated with the media content, in accordance with some embodiments of the disclosure.

FIG. 13 is a flowchart of an illustrative process for providing access to media content by connecting, to a public device, a private device that does not have an installed application associated with the media content, in accordance with some embodiments of the disclosure. It should be noted that process 1300 or any step thereof could be performed on, or provided by, any of the devices shown in FIGS. 11-12. For example, process 1300 may be executed by control circuitry 1104 (FIG. 11) as instructed by a media guidance application implemented on a user device (e.g., user equipment devices 1202, 1204, and/or 1206 (FIG. 12)). In addition, one or more steps of process 1300 may be incorporated into or combined with one or more steps of any other process or embodiment (e.g., as described in relation to FIGS. 1-10, and 14-24).

At 1302, control circuitry 1104 receives a communication from a private device indicating that a user wishes to access content using the public device. The communication may be sent from the private device (e.g., user television equipment 1202, user computer equipment 1204, wireless user communications device 1206) via I/O Path 1102 (e.g., communications path 1208, 1210, 1212, respectively). Communications network 1214 may be Internet-based, cellular network-based, Bluetooth-based, etc., and may send the communication to the public device (e.g., user television equipment 1202, user computer equipment 1204, wireless user communications device 1206). For example, the private device may be a wireless user communications device 1206 and the public device may be user television equipment 1202. Thus, the communication may be sent from communications path 1212, over communications network 1214, to communications path 1208, in order to arrive at user television equipment 1202.

At 1304, control circuitry 1104 requests both user authorization information and an identifier for a content provider of the content. The communication between the private device and the public device may be implemented over the same path described above. The user authorization information may originate from storage 1108 of the private device, or an external server that stores the user's information (e.g., media guidance data source 1218). At 1306, control circuitry 1104 receives, at the public device, a public interface application from the content provider, wherein the public interface application includes a graphical user interface for display to the user on the public device. The content provider is represented as two separate blocks in FIG. 12: media content source 1216 and media guidance data source 1218. In some embodiments, the media content source 1216 and the media guidance data source 1218 may be a combined source (e.g., for content and the metadata associated with the content).

At 1308, control circuitry 1104 receives, at the public device, a private interface application from the content provider, wherein the private interface application is configured to control the graphical user interface on the public device while the private device is within a predetermined proximity to the public device. The graphical user interface may be displayed on display 1112 of the public device. In this case, the user input interface 1110 of the private device may be configured to control the display 1112 and speakers 1114 of the public device by giving commands over communications network 1214. At 1310, control circuitry 1104 transmits, from the public device, the private interface application to the private device. At 1312, control circuitry 1104 provides, via the public interface application, the user authorization information to a server of the content provider. For example, the user authorization information may be extracted from storage 1108 of the private device or an external server (e.g., user television equipment 1202, user computer equipment 1204, wireless user communications device 1206) and may be sent to media content source 1216. At 1314, control circuitry 1104 receives a user request, issued from the private interface application (e.g., via user input interface 1110 of the private device) for a media asset from the content provider. At 1316, control circuitry 1104 generates, for consumption, the media asset in response to the user request. In some embodiments, generating for consumption the media asset may comprise displaying, the media asset in the graphical user interface (e.g., display 1112 of the public device).

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 13.

Figure 14:
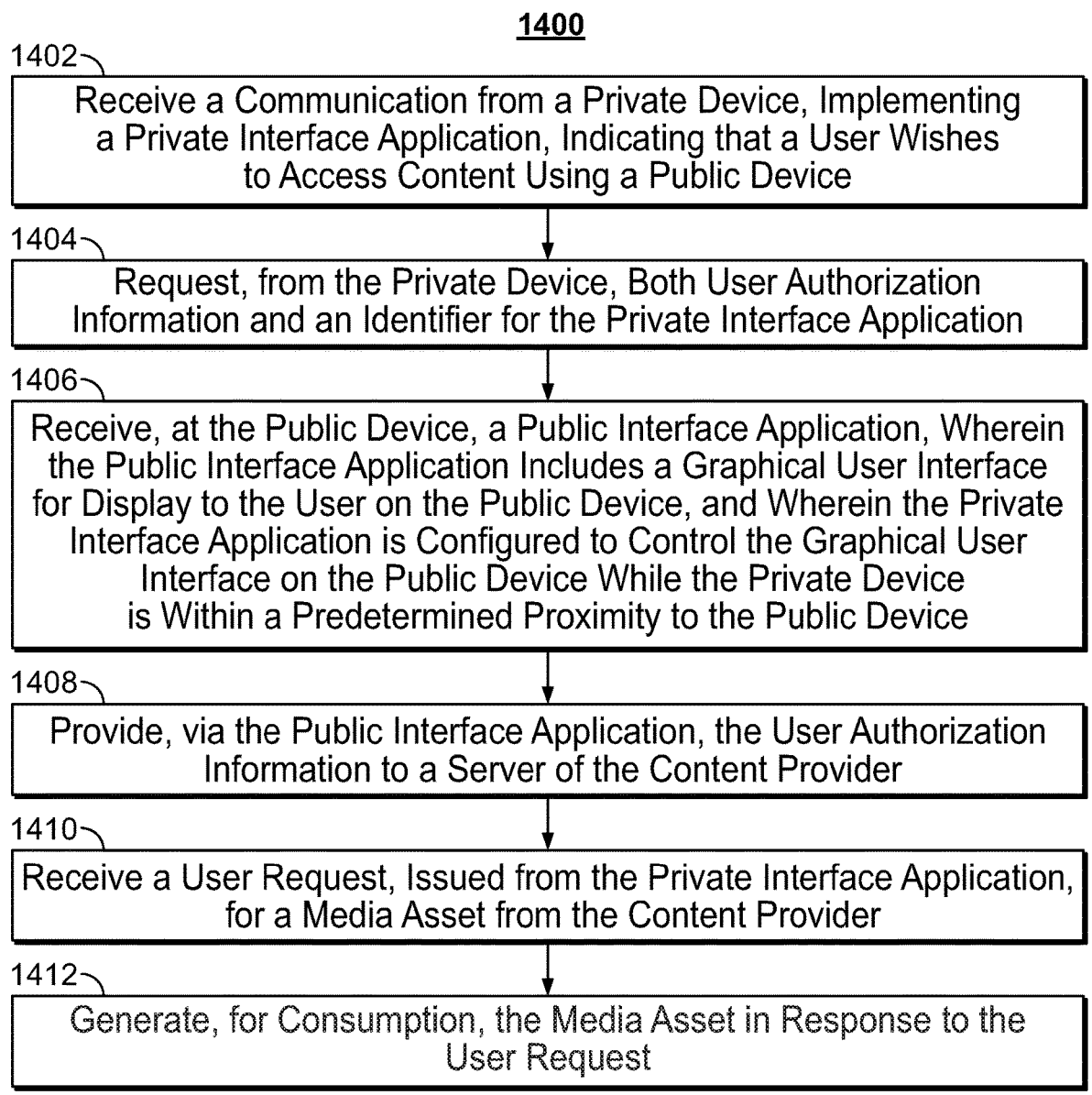
FIG. 14 is a flowchart of an illustrative process for providing access to media content by connecting, to a public device, a private device that has an installed application associated with the media content, in accordance with some embodiments of the disclosure.

FIG. 14 is a flowchart of an illustrative process for providing access to media content by connecting, to a public device, a private device that has an installed application associated with the media content, in accordance with some embodiments of the disclosure. It should be noted that process 1400 or any step thereof could be performed on, or provided by, any of the devices shown in FIGS. 11-12. For example, process 1400 may be executed by control circuitry 1104 (FIG. 11) as instructed by a media guidance application implemented on a user device (e.g., user equipment devices 1202, 1204, and/or 1206 (FIG. 12)). In addition, one or more steps of process 1400 may be incorporated into or combined with one or more steps of any other process or embodiment (e.g., as described in relation to FIGS. 1-10, 13, 15-24).

At 1402, control circuitry 1104 receives a communication from a private device, implementing a private interface application, indicating that a user wishes to access content using a public device. The communication may be sent from the private device (e.g., user television equipment 1202, user computer equipment 1204, wireless user communications device 1206) via I/O Path 1102 (e.g., communications path 1208, 1210, 1212, respectively). More specifically, the communication may originate from a user command on the private interface application (e.g., via user input interface 1110). Communications network 1214 may be Internet-based, cellular network-based, Bluetooth-based, etc., and may send the communication to the public device (e.g., user television equipment 1202, user computer equipment 1204, wireless user communications device 1206). For example, the private device may be a wireless user communications device 1206 and the public device may be user computer equipment 1204. Thus, the communication may be sent from communications path 1212, over communications network 1214, to communications path 1210, in order to arrive at user computer equipment 1202.

At 1404, control circuitry 1104 requests, from the private device, both user authorization information and an identifier for the private interface application. The user authorization information may be retrieved from storage 1108 of the private device. In some embodiments, the user authorization information may be retrieved from storage 1108 of an external server/device. For example, the private device may request a remote user equipment device (e.g., a computer at the user's home) for the user authorization information. At 1406, control circuitry 1104 receives, at the public device, a public interface application, wherein the public interface application includes a graphical user interface for display to the user on the public device, and wherein the private interface application is configured to control the graphical user interface on the public device while the private device is within a predetermined proximity to the public device. Processing circuitry 1106 of the public device may determine whether the private device is within the predetermined proximity. At 1408, control circuitry 1104 provides, via the public interface application, the user authorization information to a server of the content provider. For example, the public interface application may communicate with the content provider, via a server of the content provider, by sending the user authorization information over communications network 1214 to either communications path 1220 or communications path 1222, in order to reach the content provider. At 1410, control circuitry 1104 receives a user request, issued from the private interface application, for a media asset from the content provider. At 1412, control circuitry 1104 generates for consumption the media asset in response to the user request. In some embodiments, generating for consumption the media asset may comprise generating, for display, the media asset in the graphical user interface. For example, the public interface application may retrieve the media asset from the media content source 1216 via communications path 1220 of communications network 1214, and may display the media asset via display 1112 and/or speakers 1114 of the public device.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 14.

Figure 15:
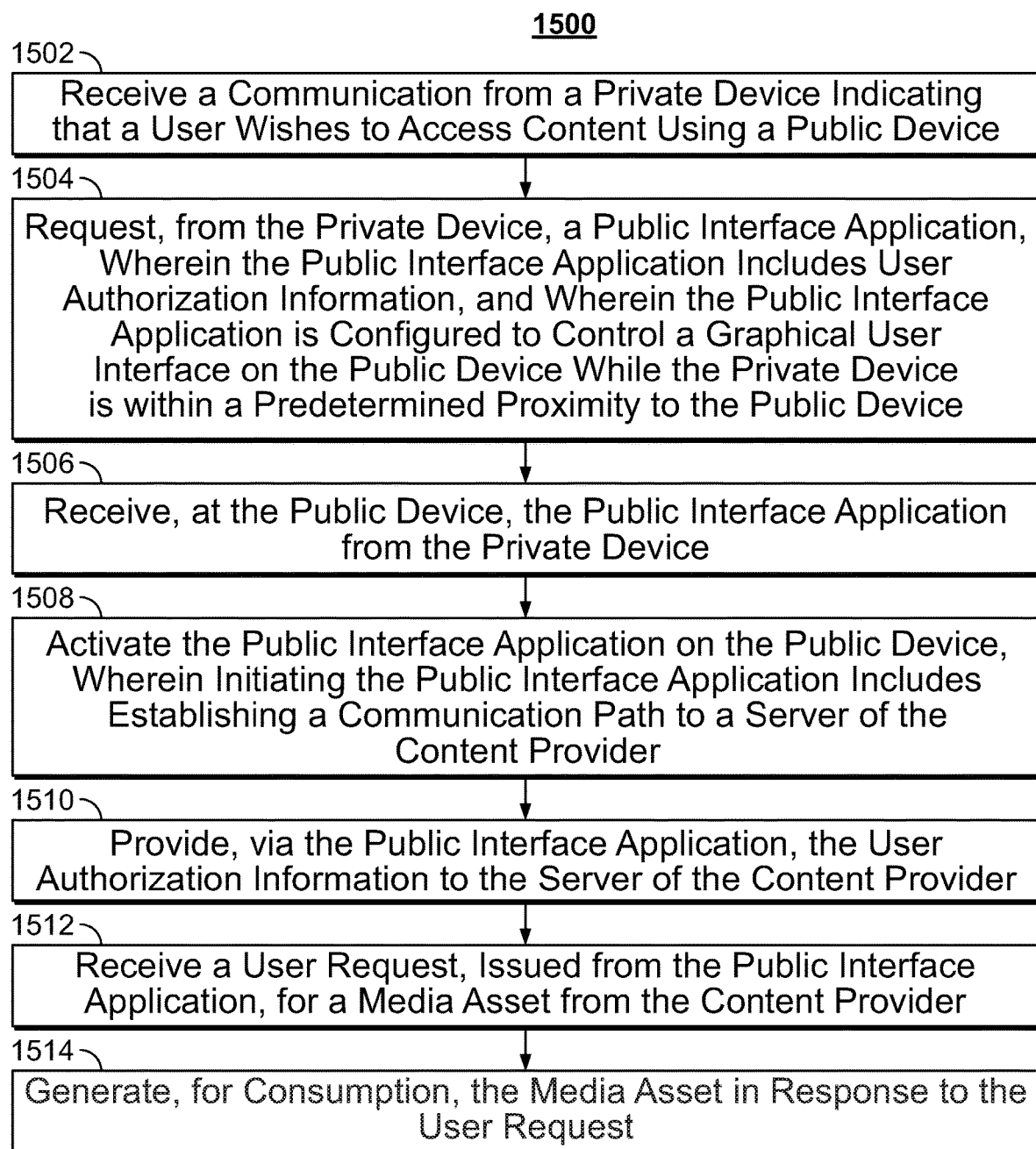
FIG. 15 is a flowchart of an illustrative process for providing access to media content by connecting, to a private device, a public device that does not have an installed application associated with the media content, in accordance with some embodiments of the disclosure.

FIG. 15 is a flowchart of an illustrative process for providing access to media content by connecting, to a private device, a public device that does not have an installed application associated with the media content, in accordance with some embodiments of the disclosure. It should be noted that process 1500 or any step thereof could be performed on, or provided by, any of the devices shown in FIGS. 11-12. For example, process 1500 may be executed by control circuitry 1104 (FIG. 11) as instructed by a media guidance application implemented on a user device (e.g., user equipment devices 1202, 1204, and/or 1206 (FIG. 12)). In addition, one or more steps of process 1500 may be incorporated into or combined with one or more steps of any other process or embodiment (e.g., as described in relation to FIGS. 1-10, 13-14, 16-24).

At 1502, control circuitry 1104 receives a communication from a private device indicating that a user wishes to access content using a public device. The communication may be sent from the private device (e.g., user television equipment 1202, user computer equipment 1204, wireless user communications device 1206) via I/O Path 1102 (e.g., communications path 1208, 1210, 1212, respectively). More specifically, the communication may originate from a user command on the private interface application (e.g., via user input interface 1110). Communications network 1214 may be Internet-based, cellular network-based, Bluetooth-based, etc., and may send the communication to the public device (e.g., user television equipment 1202, user computer equipment 1204, wireless user communications device 1206). For example, the private device may be a wireless user communications device 1206 and the public device may be user computer equipment 1204. Thus, the communication may be sent from communications path 1212, over communications network 1214, to communications path 1210, in order to arrive at user computer equipment 1202.

At 1504, control circuitry 1104 requests, from the private device, a public interface application, wherein the public interface application includes user authorization information, and wherein the public interface application is configured to control a graphical user interface on the public device while the private device is within a predetermined proximity to the public device. Processing circuitry 1106 of the public device may determine whether the private device is within the predetermined proximity. In some embodiments, processing circuitry 1106 of the private device may also determine whether the private device is within the predetermined proximity. The respective devices may then communicate their respective determinations. If both devices determine that the private device is not in the predetermined proximity, the private interface application may no longer be able to control the graphical user interface of the public interface application. If one of the two devices determines that the private device is no longer in the predetermined proximity, another determination of whether the private device is within the predetermined proximity may be performed by processing circuitry 1106 of the private device and the public device, respectively, in order to achieve a unanimous decision. In some embodiments, multiple devices may be attempting to connect with one another. For example, multiple private devices may be connected with the public device. Thus, rather than achieving a unanimous decision on whether one of the private devices is within the predetermined proximity, the public device may accept a majority decision (e.g., four of five devices determine that the private device in question is within the predetermined proximity) in order to determine whether the private interface application of the device should control the graphical user interface of the public interface application. For example, if a majority of the devices determine that the private device in question is not in the predetermined proximity, the public device may stop accepting commands to control the graphical user interface of the public device from the private interface application of the private device.

At 1506, control circuitry 1104 receives, at the public device, the public interface application from the private device. At 1508, control circuitry 1104 activates the public interface application on the public device, wherein initiating the public interface application includes establishing a communications path to a server of the content provider. As discussed previously, the content provider may have multiple servers (e.g., media content source 1216, media guidance data source 1218, etc.). The communications path may be from the public device to multiple servers (e.g., communications path 1220 and communications path 1222). If only one server is connected to the public device, the communications path may be either communications path 1220 or communication 1222, accordingly. At 1510, control circuitry 1104 provides, via the public interface application, the user authorization information to the server of the content provider. At 1516, control circuitry 1104 receives a user request, issued from the public interface application, for a media asset from the content provider. At 1518, control circuitry 1104 generates for consumption the media asset in response to the user request. In some embodiments, generating for consumption may comprise displaying the media asset in the graphical user interface in response to the user request. For example, the public interface application may retrieve the media asset from the media content source 1216 via communications path 1220 of communications network 1214, and may display the media asset via display 1112 and/or speakers 1114 of the public device.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 15.

Figure 16:
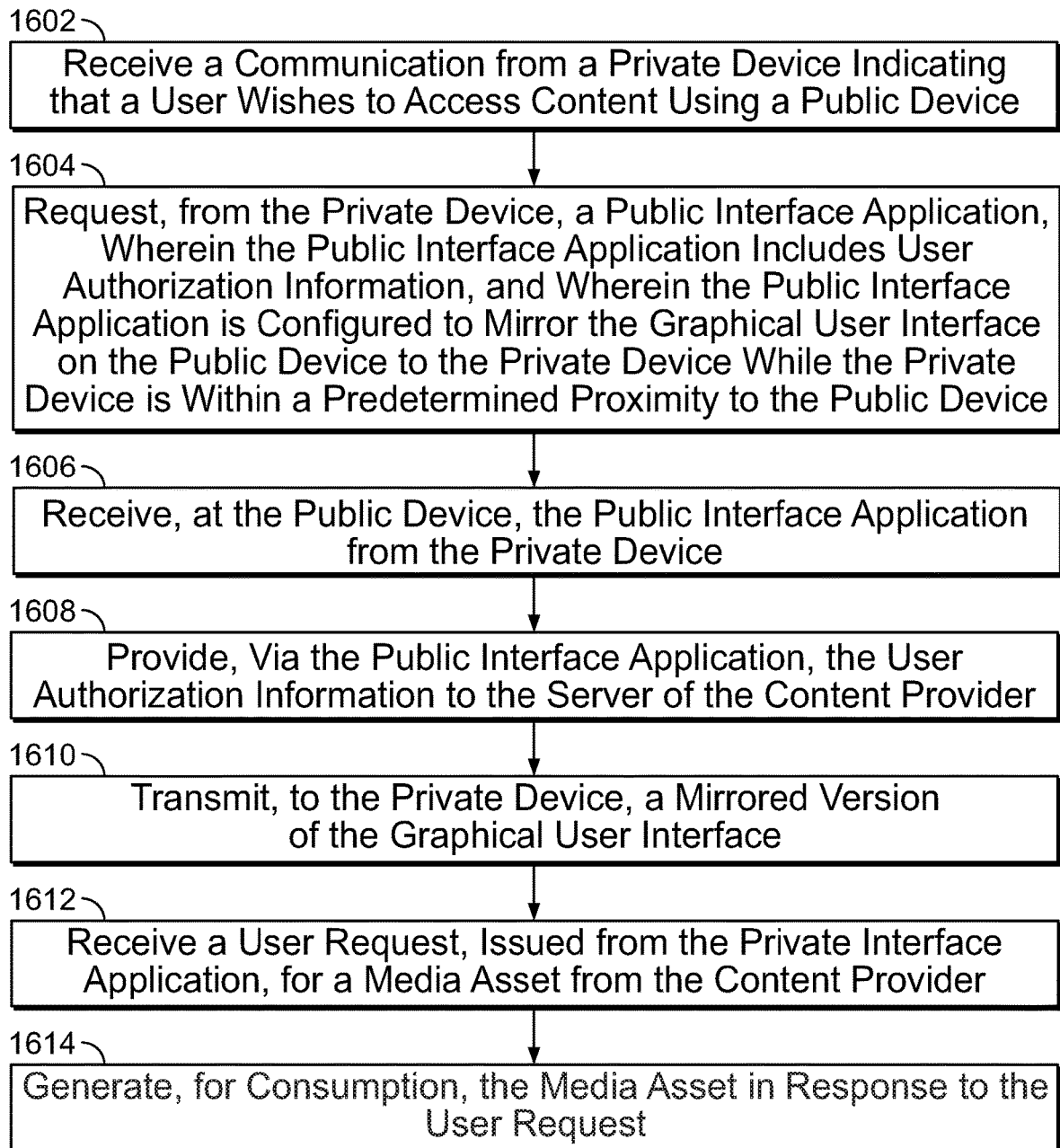
FIG. 16 is a flowchart of an illustrative process for providing access to media content by connecting, to a public device, a private device that has installed a mirror-capable application associated with the media content, in accordance with some embodiments of the disclosure.

FIG. 16 is a flowchart of an illustrative process for providing access to media content by connecting, to a public device, a private device that has installed a mirror-capable application associated with the media content, in accordance with some embodiments of the disclosure. It should be noted that process 1600 or any step thereof could be performed on, or provided by, any of the devices shown in FIGS. 11-12. For example, process 1600 may be executed by control circuitry 1104 (FIG. 11) as instructed by a media guidance application implemented on a user device (e.g., user equipment devices 1202, 1204, and/or 1206 (FIG. 12)). In addition, one or more steps of process 1600 may be incorporated into or combined with one or more steps of any other process or embodiment (e.g., as described in relation to FIGS. 1-10, 13-15, 17-24).

At 1602, control circuitry 1104 receives a communication from a private device indicating that a user wishes to access content using a public device. The communication may be sent from the private device (e.g., user television equipment 1202, user computer equipment 1204, wireless user communications device 1206) via I/O Path 1102 (e.g., communications path 1208, 1210, 1212, respectively). More specifically, the communication may originate from a user command on the private interface application (e.g., via user input interface 1110). Communications network 1214 may be Internet-based, cellular network-based, Bluetooth-based, etc., and may send the communication to the public device (e.g., user television equipment 1202, user computer equipment 1204, wireless user communications device 1206). For example, the private device may be a wireless user communications device 1206 and the public device may be user computer equipment 1204. Thus, the communication may be sent from communications path 1212, over communications network 1214, to communications path 1210, in order to arrive at user computer equipment 1202.

At 1604, control circuitry 1104 requests, from the private device, a public interface application, wherein the public interface application includes user authorization information, and wherein the public interface application is configured to mirror the graphical user interface on the public device to the private device while the private device is within a predetermined proximity to the public device. Thus, the user input interface 1110, display 1112, and/or speakers 1114 of the private interface application on the private device and the public interface application on the public device depict the same graphical user interface. All commands received from the user via I/O Path 1102 are implemented on both graphical user interfaces. At 1606, control circuitry 1104 receives, at the public device, the public interface application from the private device (e.g., over communications network 1214). At 1608, control circuitry 1104 provides, via the public interface application, the user authorization information to the server of the content provider. For example, the public interface application may communicate with the content provider, via a server of the content provider, by sending the user authorization information (e.g., from storage 1108 of the private device or public device) over communications network 1214 to either communications path 1220 or communications path 1222, in order to reach the content provider.

At 1610, control circuitry 1104 transmits, to the private device, a mirrored version of the graphical user interface. It should be noted that control circuitry 1104 similarly generates for display, the graphical user interface via display 1112 and/or speakers 1114 of the private device. At 1612, control circuitry 1104 receives a user request, issued from the private interface application, for a media asset from the content provider. At 1614, control circuitry 1104 generates for consumption the media asset in response to the user request. For example, the public interface application may retrieve the media asset from the media content source 1216 via communications path 1220 of communications network 1214, and may display the media asset via display 1112 and/or speakers 1114 of the public device.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 16.

Figure 17:
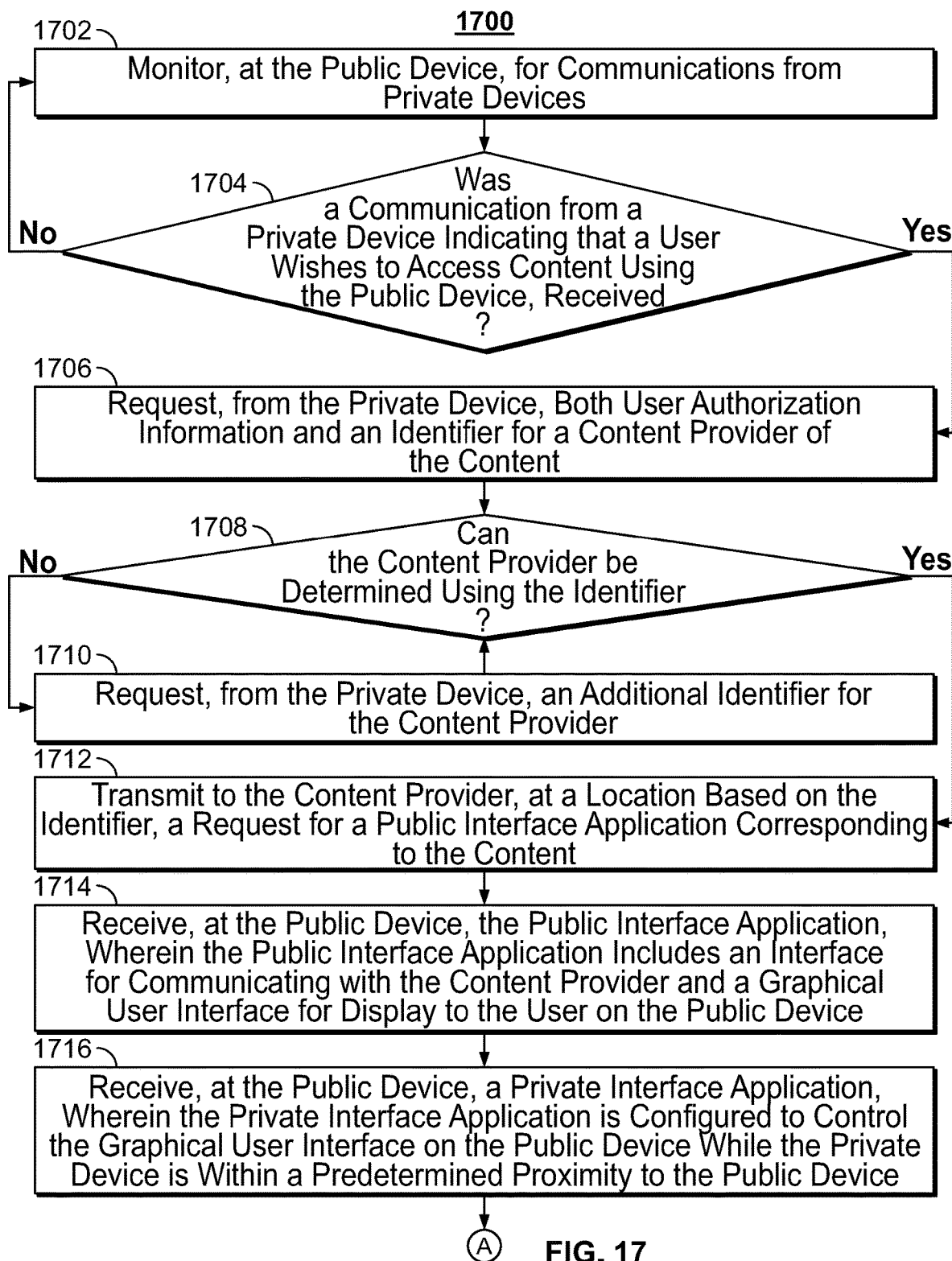
FIG. 17 is a flowchart of a detailed illustrative process for providing access to media content by connecting, to a public device, a private device that does not have an installed application associated with the media content, in accordance with some embodiments of the disclosure.
Figure 17:
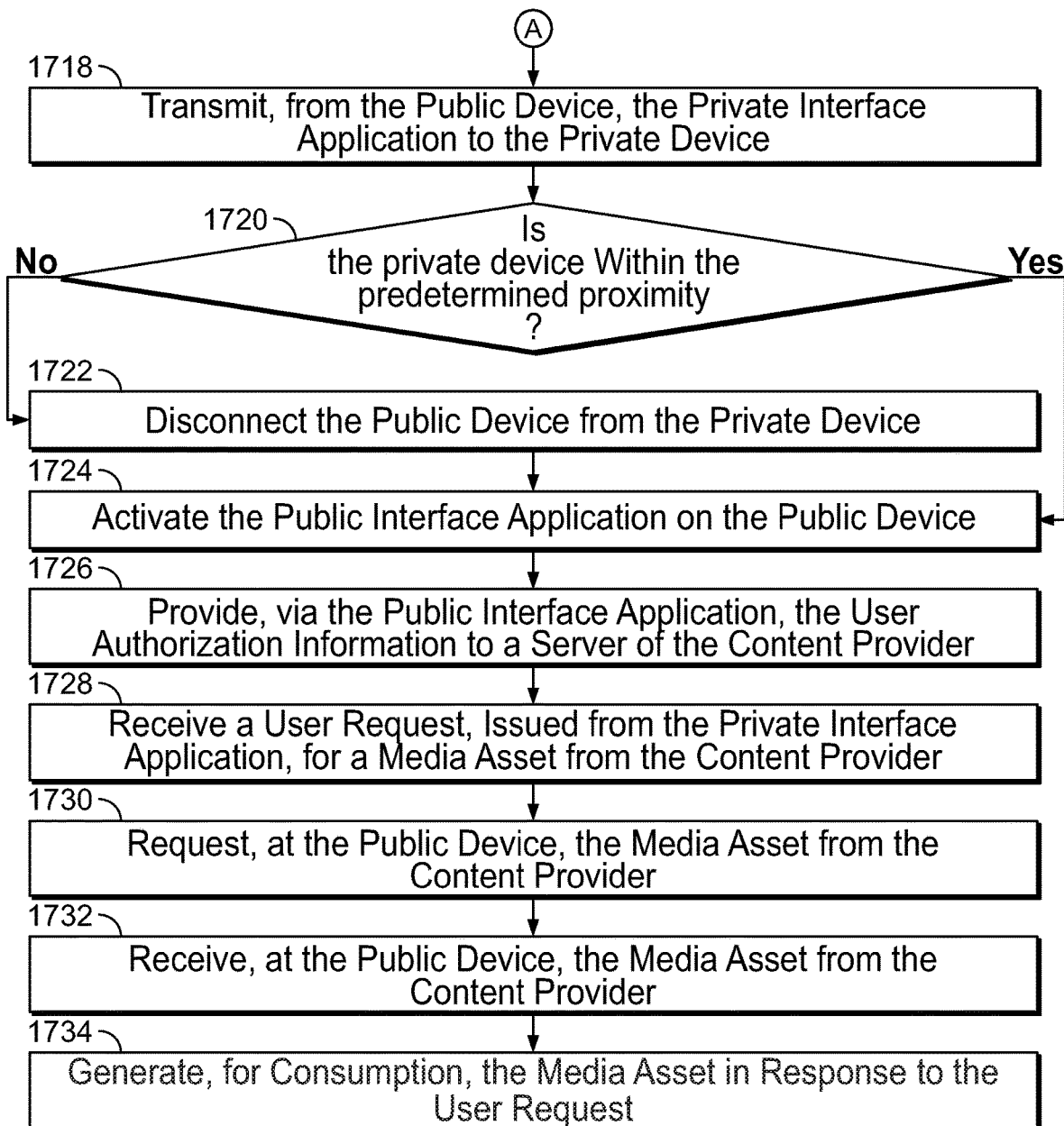

FIG. 17 is a flowchart of a detailed illustrative process for providing access to media content by connecting, to a public device, a private device that does not have an installed application associated with the media content, in accordance with some embodiments of the disclosure. It should be noted that process 1700 or any step thereof could be performed on, or provided by, any of the devices shown in FIGS. 11-12. For example, process 1700 may be executed by control circuitry 1104 (FIG. 11) as instructed by a media guidance application implemented on a user device (e.g., user equipment devices 1202, 1204, and/or 1206 (FIG. 12)). In addition, one or more steps of process 1700 may be incorporated into or combined with one or more steps of any other process or embodiment (e.g., as described in relation to FIGS. 1-10, 13-16, 18-24).

At 1702, control circuitry 1104 monitors, at the public device, for communications from private devices. For example, the public device may be user television equipment 1202, user computer equipment 1204, or wireless user communications device 1206. Accordingly, the public device may anticipate communications from the communications network 1214 through communications paths 1208, 1210 and 1212, respectively.

At 1704, control circuitry 1104 determines whether a communication from a private device indicating that a user wishes to access content using the public device was received. For example, the public device may be user television equipment 1202 and the private device may be user computer equipment 1204. A private device may send a communication indicating that the user wishes to access content using the public device from communications path 1210, over communications network 1214, to communications path 1208, in order to reach the public device. At 1706, in response to determining that a communication was received, control circuitry 1104 requests, from the private device, both user authorization information and an identifier for a content provider of the content. The user authorization information and the identifier may be retrieved by control circuitry 1104 from storage 1108. In response to determining that a communication was not received, the process returns to 1702. For example, control circuitry 1104 may continue to monitor for communications at the public device.

At 1708, control circuitry 1104 determines whether the content provider can be determined using the identifier. For example, control circuitry 1104 may refer to a content provider database that may be stored in storage 1108 of the public device. The content provider database may list content providers and their associated identifiers (e.g., name, logo, user interface screenshots), and may derive its information from the media guidance data source 1218. Accordingly, control circuitry 1104 may perform a lookup of the identifier in the content provider database. At 1710, in response to determining that the content provider cannot be determined, control circuitry 1104 requests, from the private device, an additional identifier for the content provider. The additional identifier will ideally be different from the first identifier provided by the private device. At 1712, in response to determining that the content provider can be determined, control circuitry 1104 transmits to the content provider, at a location based on the identifier, a request for a public interface application corresponding to the content. For example, control circuitry 1104 may determine an appropriate server of the identified content provider. The appropriateness of the server can be based on data retrieval times (e.g., an appropriate server may be nearby and may have low transmission latency).

At 1714, control circuitry 1104 receives (e.g., via I/O Path 1102 from media content source 1216 and/or media guidance data source 1218), at the public device, the public interface application, wherein the public interface application includes an interface for communicating with the content provider (e.g., over communications network 1214) and a graphical user interface for display to the user on the public device. At 1716, control circuitry 1104 receives (e.g., via I/O Path 1102 from media content source 1216 and/or media guidance data source 1218), at the public device, a private interface application, wherein the private interface application is configured to control the graphical user interface on the public device while the private device is within a predetermined proximity to the public device. At 1718, control circuitry 1104 transmits (e.g., over communications network 1214), from the public device, the private interface application to the private device. For example, the user may enter commands via I/O Path 1102 at the private interface application. In some embodiments, if the public device has touchscreen capabilities or buttons, the user may enter commands via I/O Path 1102 at the public interface application. The commands received at the private interface application may be processed by control circuitry 1104 at the private device. For example, if the commands need to be translated in order to be processed by the public interface application (e.g., which may be incompatible with the private interface application), control circuitry 1104 at the private device or an external device/server may perform the translation. The commands may then be sent over communications network 1214 to the public device and implemented/executed by control circuitry 1104 at the public device. The execution may involve the user input interface 1110, the display 1112 and/or the speakers 1114 of the public device.

At 1720, control circuitry 1104 determines whether the private device is within the predetermined proximity. At 1722, in response to determining that the private device is not within the predetermined proximity, control circuitry 1104 disconnects the public device from the private device. At 1724, in response to determining that the private device is within the predetermined proximity, control circuitry 1104 activates the public interface application on the public device. Processing circuitry 1106 of the public device may determine whether the private device is within the predetermined proximity. In some embodiments, processing circuitry 1106 of the private device may also determine whether the private device is within the predetermined proximity. The respective devices may then communicate their respective determinations. If both devices determine that the private device is not in the predetermined proximity, the private interface application may no longer be able to control the graphical user interface of the public interface application. If one of the two devices determines that the private device is no longer in the predetermined proximity, another determination of whether the private device is within the predetermined proximity may be performed by processing circuitry 1106 of the private device and the public device, respectively, in order to achieve a unanimous decision. In some embodiments, multiple devices may be attempting to connect with one another. For example, multiple private devices may be connected with the public device. Thus, rather than achieving a unanimous decision on whether one of the private devices is within the predetermined proximity, the public device may accept a majority decision (e.g., four of five devices determine that the private device in question is within the predetermined proximity) in order to determine whether the private interface application of the device should control the graphical user interface of the public interface application. For example, if a majority of the devices determine that the private device in question is not in the predetermined proximity, the public device may stop accepting commands to control the graphical user interface of the public device from the private interface application of the private device.

At 1726, control circuitry 1104 provides, via the public interface application, the user authorization information to a server of the content provider. The server of the content provider may be at the location determined based on the identifier.

At 1728, control circuitry 1104 receives a user request (e.g., via I/O Path 1102 from the private device), issued from the private interface application, for a media asset from the content provider. At 1730, control circuitry 1104 requests, at the public device, the media asset from the content provider (e.g., from media content source 1216). At 1732, control circuitry 1104 receives, at the public device, the media asset from the content provider (e.g., over communications network 1214). At 1734, control circuitry 1104 generates, for consumption (e.g., via display 1112 and/or speakers 1114), the media asset in response to the user request.

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 17.

Figure 18:
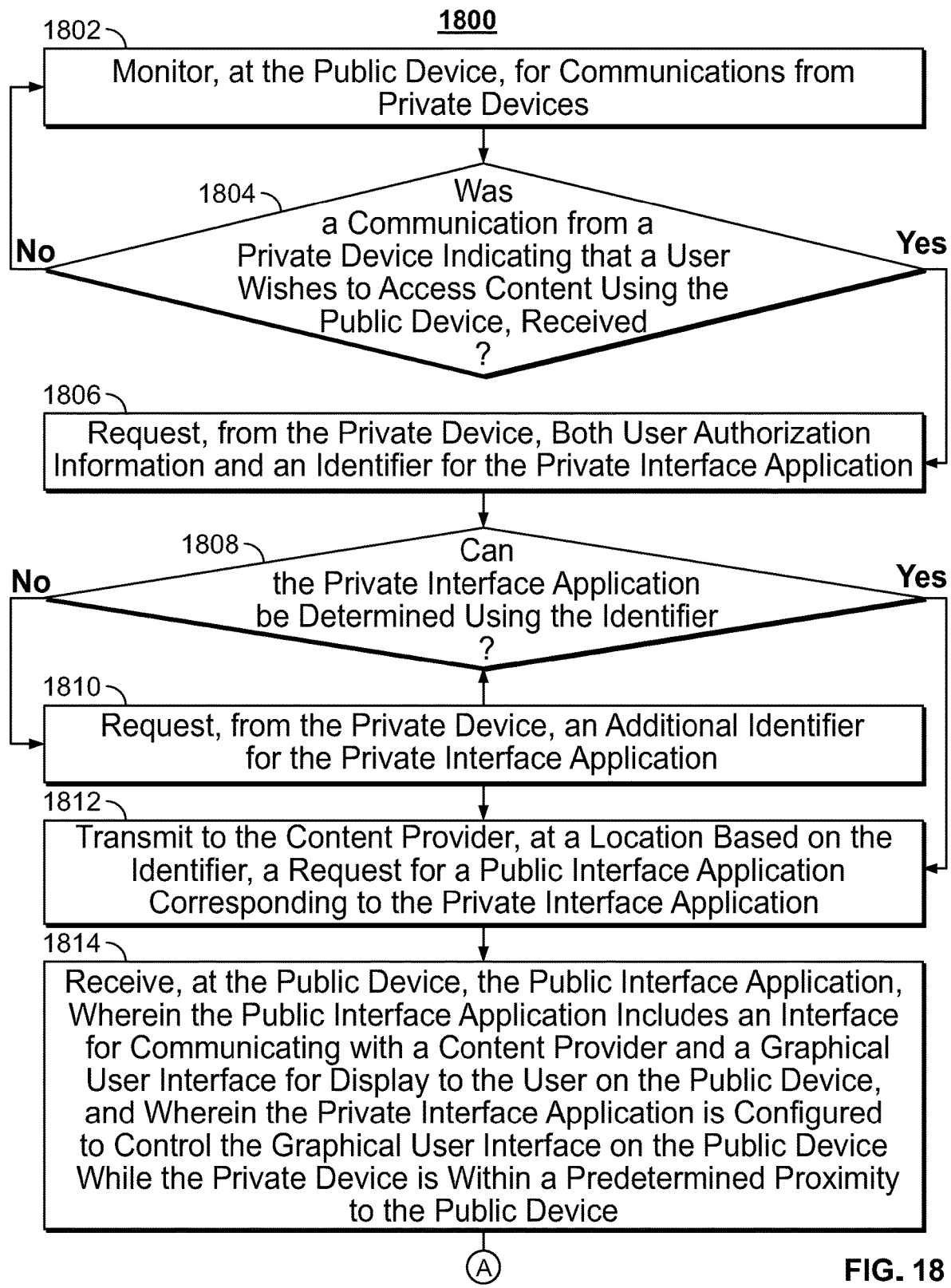
FIG. 18 is a flowchart of a detailed illustrative process for providing access to media content by connecting, to a public device, a private device that has an installed application associated with the media content, in accordance with some embodiments of the disclosure.
Figure 18:
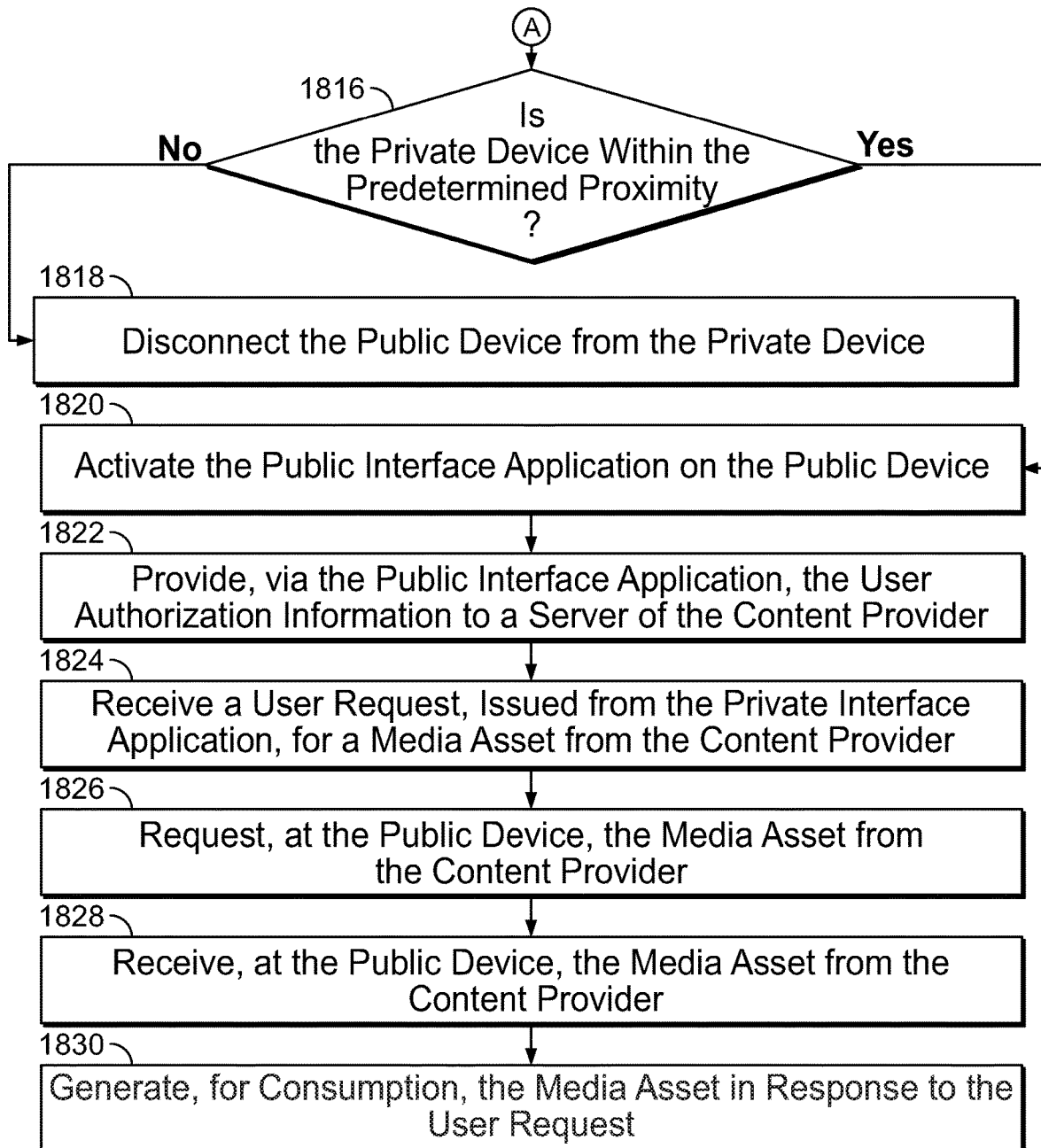

FIG. 18 is a flowchart of a detailed illustrative process for providing access to media content by connecting, to a public device, a private device that has an installed application associated with the media content, in accordance with some embodiments of the disclosure. It should be noted that process 1800 or any step thereof could be performed on, or provided by, any of the devices shown in FIGS. 11-12. For example, process 1800 may be executed by control circuitry 1104 (FIG. 11) as instructed by a media guidance application implemented on a user device (e.g., user equipment devices 1202, 1204, and/or 1206 (FIG. 12)). In addition, one or more steps of process 1800 may be incorporated into or combined with one or more steps of any other process or embodiment (e.g., as described in relation to FIGS. 1-10, 13-17, 19-24).

At 1802, control circuitry 1104 monitors, at the public device, for communications from private devices. For example, the public device may be user television equipment 1202, user computer equipment 1204, or wireless user communications device 1206. Accordingly, the public device may anticipate communications from the communications network 1214 through communications paths 1208, 1210 and 1212, respectively.

At 1804, control circuitry 1104 determines whether a communication from a private device indicating that a user wishes to access content using the public device was received. For example, the public device may be user television equipment 1202 and the private device may be user computer equipment 1204. A private device may send a communication indicating that the user wishes to access content using the public device from communications path 1210, over communications network 1214, to communications path 1208, in order to reach the public device. At 1806, in response to determining that a communication was received, control circuitry 1104 requests, from the private device, both user authorization information and an identifier for the private interface application. The user authorization information and the identifier may be retrieved by control circuitry 1104 from storage 1108. In response to determining that a communication was not received, the process returns to 1802. For example, control circuitry 1104 may continue to monitor for communications at the public device.

At 1808, control circuitry 1104 determines whether the private interface application can be determined using the identifier. For example, control circuitry 1104 may refer to a content provider database that may be stored in storage 1108 of the public device. The content provider database may list content providers and their associated identifiers (e.g., name, logo, user interface screenshots of associated applications), and may derive its information from the media guidance data source 1218. Accordingly, control circuitry 1104 may perform a lookup of the identifier in the content provider database. At 1810, in response to determining that the private interface application cannot be determined, control circuitry 1104 requests, from the private device, an additional identifier for the private interface application. The additional identifier will ideally be different from the first identifier provided by the private device. At 1812, in response to determining that the private interface application can be determined, control circuitry 1104 transmits to the content provider, at a location based on the identifier, a request for a public interface application corresponding to the content. The location (e.g., a server of the content provider) may additionally be determined based on the efficiency of communication with the location. Control circuitry 1104 may determine whether the location is too far away, which may result in added latency in the communication between the private device and the public device. Accordingly, a location of the content provider may be determined that reduces latency, ensures a consistent communication without dropped communication units (e.g., packets, frames, etc.), and features secure exchange of information (e.g., https over http).

At 1814, control circuitry 1104 receives (e.g., via I/O Path 1102 from media content source 1216 and media guidance data source 1218), at the public device, the public interface application, wherein the public interface application includes an interface for communicating with a content provider and a graphical user interface for display to the user on the public device, and wherein the private interface application is configured to control the graphical user interface on the public device while the private device is within a predetermined proximity to the public device. For example, the user may enter commands via I/O Path 1102 at the private interface application. In some embodiments, if the public device has touchscreen capabilities or buttons, the user may enter commands via I/O Path 1102 at the public interface application. The commands received at the private interface application may be processed by control circuitry 1104 at the private device. For example, if the commands need to be translated in order to be processed by the public interface application (e.g., which may be incompatible with the private interface application), control circuitry 1104 at the private device or an external device/server may perform the translation. The commands may then be sent over communications network 1214 to the public device and implemented/executed by control circuitry 1104 at the public device. The execution may involve the user input interface 1110, the display 1112 and/or the speakers 1114 of the public device.

At 1816, control circuitry 1104 determines whether the private device is within the predetermined proximity. At 1818, in response to determining that the private device is not within the predetermined proximity, control circuitry 1104 disconnects the public device from the private device. At 1820, in response to determining that the private device is within the predetermined proximity, control circuitry 1104 activates the public interface application on the public device. Processing circuitry 1106 of the public device may determine whether the private device is within the predetermined proximity. In some embodiments, processing circuitry 1106 of the private device may also determine whether the private device is within the predetermined proximity. The respective devices may then communicate their respective determinations. If both devices determine that the private device is not in the predetermined proximity, the private interface application may no longer be able to control the graphical user interface of the public interface application. If one of the two devices determines that the private device is no longer in the predetermined proximity, another determination of whether the private device is within the predetermined proximity may be performed by processing circuitry 1106 of the private device and the public device, respectively, in order to achieve a unanimous decision. In some embodiments, multiple devices may be attempting to connect with one another. For example, multiple private devices may be connected with the public device. Thus, rather than achieving a unanimous decision on whether one of the private devices is within the predetermined proximity, the public device may accept a majority decision (e.g., four of five devices determine that the private device in question is within the predetermined proximity) in order to determine whether the private interface application of the device should control the graphical user interface of the public interface application. For example, if a majority of the devices determine that the private device in question is not in the predetermined proximity, the public device may stop accepting commands to control the graphical user interface of the public device from the private interface application of the private device.

At 1822, control circuitry 1104 provides, via the public interface application, the user authorization information to a server of the content provider. The server of the content provider may be at the location determined based on the identifier.

At 1824, control circuitry 1104 receives a user request (e.g., via I/O Path 1102 of the private device), issued from the private interface application, for a media asset from the content provider. The user may also enter the user request at the user input interface 1110 of the public device. At 1826, control circuitry 1104 requests, at the public device, the media asset from the content provider. At 1828, control circuitry 1104 receives, at the public device, the media asset from the content provider (e.g., via media content source 1216 and/or media guidance data source 1218). At 1830, control circuitry 1104 generates for consumption (e.g., via display 1112 and/or speakers 1114) the media asset in response to the user request.

It is contemplated that the steps or descriptions of FIG. 18 may be used with any other embodiment of this disclosure. In addition, the steps and descriptions described in relation to FIG. 18 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 18.

Figure 19:
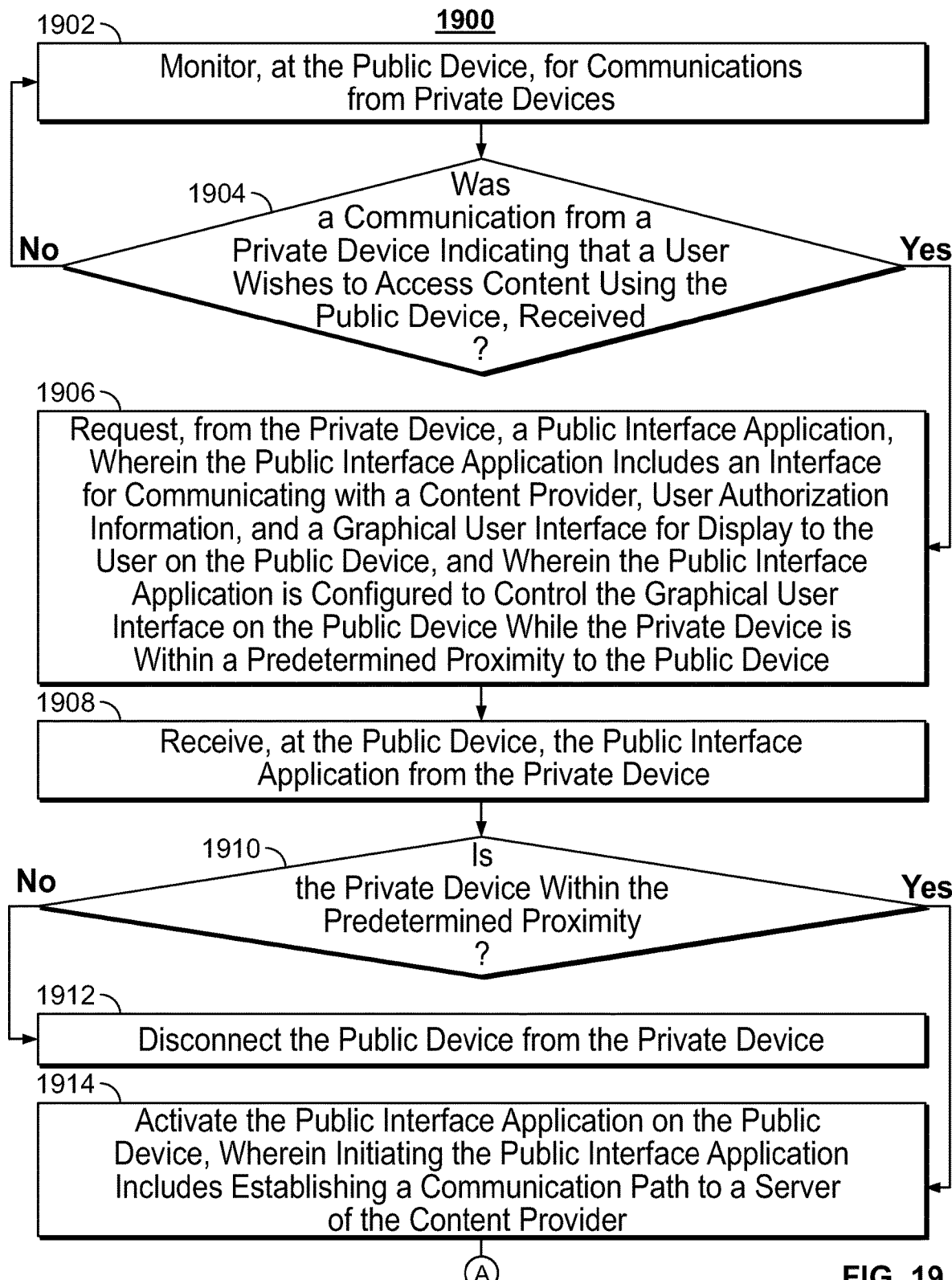
FIG. 19 is a flowchart of a detailed illustrative process for providing access to media content by connecting, to a private device, a public device that does not have an installed application associated with the media content, in accordance with some embodiments of the disclosure.
Figure 19:
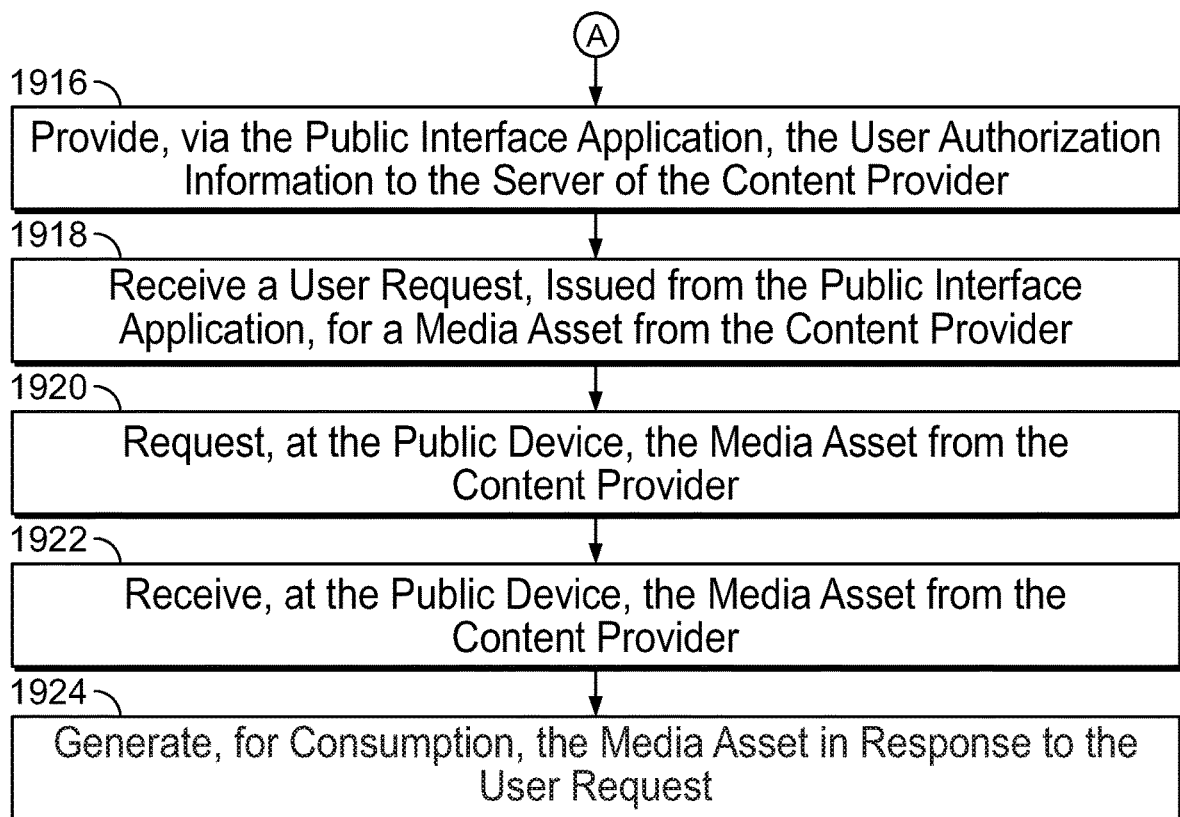

FIG. 19 is a flowchart of a detailed illustrative process for providing access to media content by connecting, to a private device, a public device that does not have an installed application associated with the media content, in accordance with some embodiments of the disclosure. It should be noted that process 1900 or any step thereof could be performed on, or provided by, any of the devices shown in FIGS. 11-12. For example, process 1900 may be executed by control circuitry 1104 (FIG. 11) as instructed by a media guidance application implemented on a user device (e.g., user equipment devices 1202, 1204, and/or 1206 (FIG. 12)). In addition, one or more steps of process 1900 may be incorporated into or combined with one or more steps of any other process or embodiment (e.g., as described in relation to FIGS. 1-10, 13-18, 20-24).

At 1902, control circuitry 1104 monitors, at the public device, for communications from private devices. For example, the public device may be user television equipment 1202, user computer equipment 1204, or wireless user communications device 1206. Accordingly, the public device may anticipate communications from the communications network 1214 through communications paths 1208, 1210 and 1212, respectively.

At 1904, control circuitry 1104 determines whether a communication from a private device indicating that a user wishes to access content using the public device was received. For example, the public device may be user computer equipment 1204 and the private device may be wireless user communications device 1206. A private device may send a communication indicating that the user wishes to access content using the public device from communications path 1212, over communications network 1214, to communications path 1210, in order to reach the public device. At 1906, in response to determining that a communication was received, control circuitry 1104 requests, from the private device, a public interface application, wherein the public interface application includes an interface for communicating with a content provider, user authorization information, and a graphical user interface for display to the user on the public device, and wherein the public interface application is configured to control the graphical user interface on the public device while the private device is within a predetermined proximity to the public device. The user authorization information and the identifier may be retrieved by control circuitry 1104 from storage 1108.

In an example, the user may enter commands via I/O Path 1102 at the private interface application. In some embodiments, if the public device has touchscreen capabilities or buttons, the user may enter commands via I/O Path 1102 at the public interface application. The commands received at the private interface application may be processed by control circuitry 1104 at the private device. For example, if the commands need to be translated in order to be processed by the public interface application (e.g., which may be incompatible with the private interface application), control circuitry 1104 at the private device or an external device/server may perform the translation. The commands may then be sent over communications network 1214 to the public device and implemented/executed by control circuitry 1104 at the public device. The execution may involve the user input interface 1110, the display 1112 and/or the speakers 1114 of the public device. In response to determining that a communication was not received, the process returns to 1902. For example, control circuitry 1104 may continue to monitor for communications at the public device. At 1908, control circuitry 1104 receives (e.g., via I/O Path 1102), at the public device, the public interface application from the private device.

At 1910, control circuitry 1104 determines whether the private device is within the predetermined proximity. At 1912, in response to determining that the private device is not within the predetermined proximity, control circuitry 1104 disconnects the public device from the private device. At 1914, in response to determining that the private device is within the predetermined proximity, control circuitry 1104 activates the public interface application on the public device, wherein initiating the public interface application includes establishing a communications path to a server of the content provider. The server of the content provider may be at the location determined based on the identifier. Processing circuitry 1106 of the public device may determine whether the private device is within the predetermined proximity. In some embodiments, processing circuitry 1106 of the private device may also determine whether the private device is within the predetermined proximity. The respective devices may then communicate their respective determinations. If both devices determine that the private device is not in the predetermined proximity, the private interface application may no longer be able to control the graphical user interface of the public interface application. If one of the two devices determines that the private device is no longer in the predetermined proximity, another determination of whether the private device is within the predetermined proximity may be performed by processing circuitry 1106 of the private device and the public device, respectively, in order to achieve a unanimous decision. In some embodiments, multiple devices may be attempting to connect with one another. For example, multiple private devices may be connected with the public device. Thus, rather than achieving a unanimous decision on whether one of the private devices is within the predetermined proximity, the public device may accept a majority decision (e.g., four of five devices determine that the private device in question is within the predetermined proximity) in order to determine whether the private interface application of the device should control the graphical user interface of the public interface application. For example, if a majority of the devices determine that the private device in question is not in the predetermined proximity, the public device may stop accepting commands to control the graphical user interface of the public device from the private interface application of the private device.

At 1916, control circuitry 1104 provides, via the public interface application, the user authorization information to a server of the content provider. At 1918, control circuitry 1104 receives a user request (e.g., via I/O Path 1102), issued from the private interface application, for a media asset from the content provider. At 1920, control circuitry 1104 requests, at the public device, the media asset from the content provider (e.g., over communications network 1214). At 1922, control circuitry 1104 receives, at the public device, the media asset from the content provider (e.g., media content source 1216 and/or media guidance data source 1218). At 1924, control circuitry 1104 generates for consumption (e.g., via display 1112 and/or speakers 1114) the media asset in response to the user request.

It is contemplated that the steps or descriptions of FIG. 19 may be used with any other embodiment of this disclosure. In addition, the steps and descriptions described in relation to FIG. 19 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 19.

Figure 20:
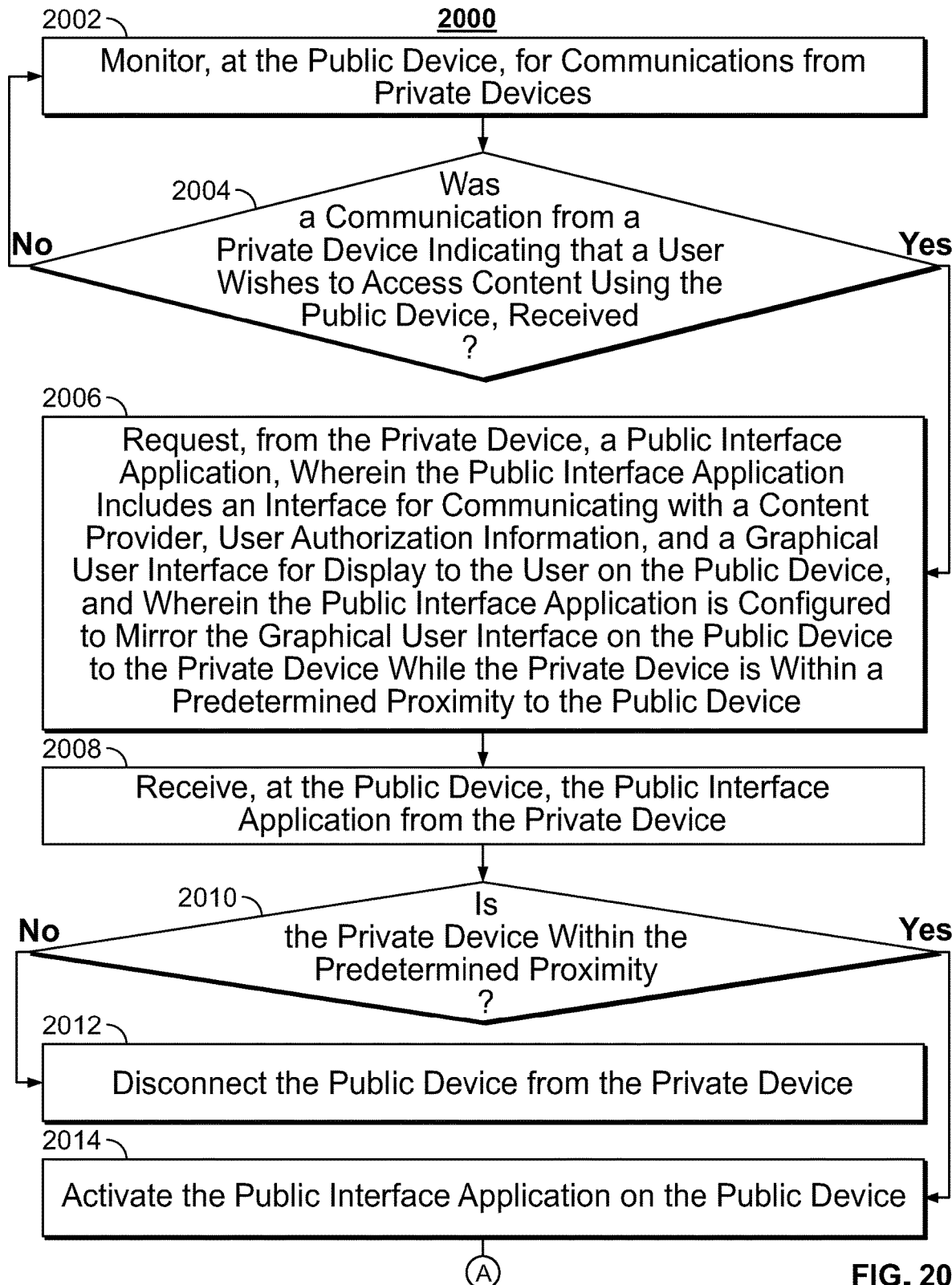
FIG. 20 is a flowchart of a detailed illustrative process for providing access to media content by connecting, to a public device, a private device that has installed a mirror-capable application associated with the media content, in accordance with some embodiments of the disclosure.
Figure 20:
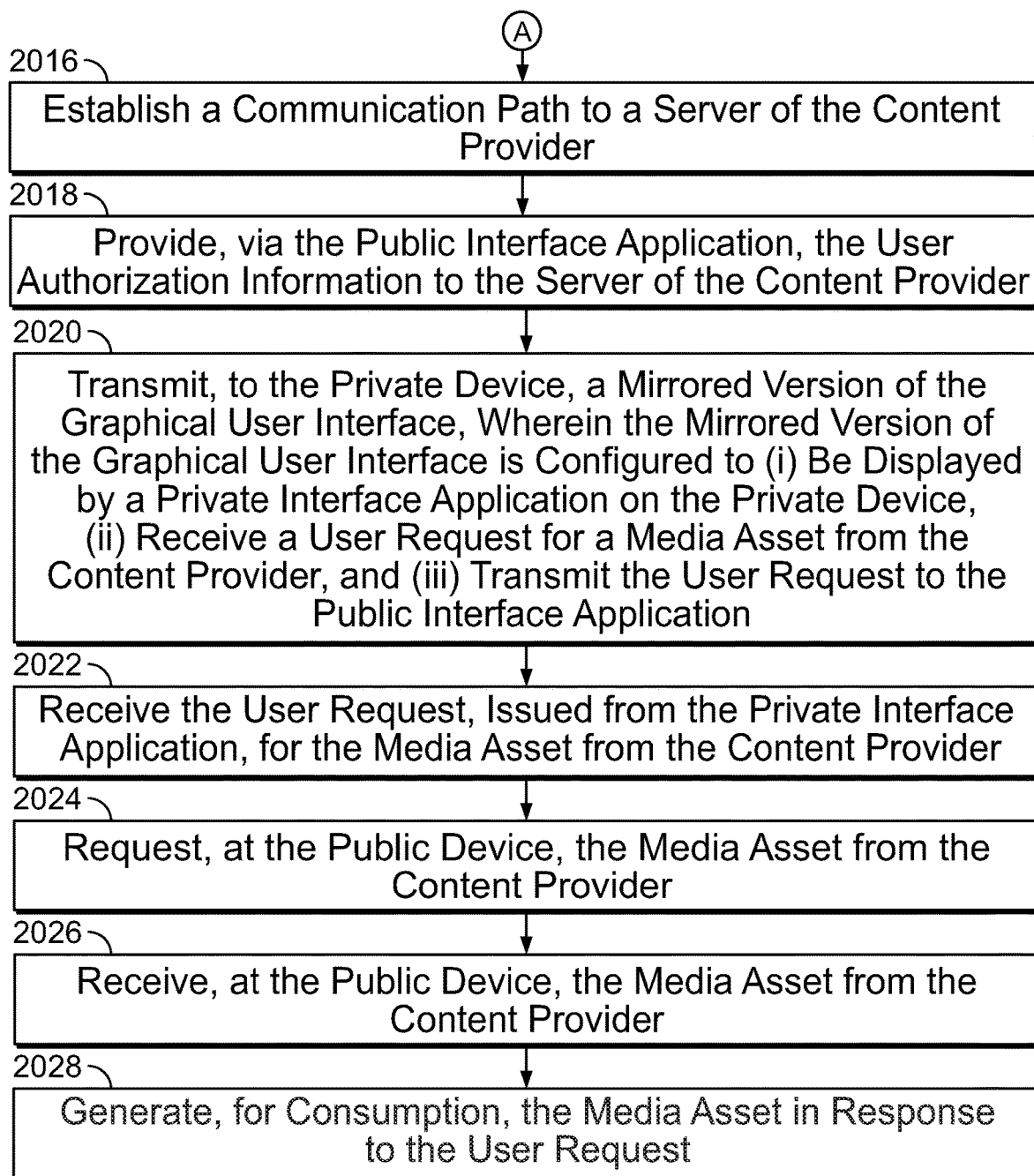

FIG. 20 is a flowchart of a detailed illustrative process for providing access to media content by connecting, to a public device, a private device that has installed a mirror-capable application associated with the media content, in accordance with some embodiments of the disclosure. It should be noted that process 2000 or any step thereof could be performed on, or provided by, any of the devices shown in FIGS. 11-12. For example, process 2000 may be executed by control circuitry 1104 (FIG. 11) as instructed by a media guidance application implemented on a user device (e.g., user equipment devices 1202, 1204, and/or 1206 (FIG. 12)). In addition, one or more steps of process 2000 may be incorporated into or combined with one or more steps of any other process or embodiment (e.g., as described in relation to FIGS. 1-10, 13-19, 21-24).

At 2002, control circuitry 1104 monitors, at the public device, for communications from private devices. For example, the public device may be user television equipment 1202, user computer equipment 1204, or wireless user communications device 1206. Accordingly, the public device may anticipate communications from the communications network 1214 through communications paths 1208, 1210 and 1212, respectively.

At 2004, control circuitry 1104 determines whether a communication from a private device indicating that a user wishes to access content using the public device was received. For example, the public device may be user computer equipment 1204 and the private device may be wireless user communications device 1206. A private device may send a communication indicating that the user wishes to access content using the public device from communications path 1212, over communications network 1214, to communications path 1210, in order to reach the public device. At 2006, in response to determining that a communication was received, control circuitry 1104 requests, from the private device, a public interface application, wherein the public interface application includes an interface for communicating with a content provider, user authorization information, and a graphical user interface for display to the user on the public device, and wherein the public interface application is configured to mirror the graphical user interface on the public device to the private device while the private device is within a predetermined proximity to the public device. Thus, the user input interface 1110, display 1112, and/or speakers 1114 of the private interface application on the private device and the public interface application on the public device depict the same graphical user interface. All commands received from the user via I/O Path 1102 are implemented on both graphical user interfaces. The user authorization information and the identifier may be retrieved by control circuitry 1104 from storage 1108.

In an example, the user may enter commands via I/O Path 1102 at the private interface application. In some embodiments, if the public device has touchscreen capabilities or buttons, the user may enter commands via I/O Path 1102 at the public interface application. The commands received at the private interface application may be processed by control circuitry 1104 at the private device. For example, if the commands need to be translated in order to be processed by the public interface application (e.g., which may be incompatible with the private interface application), control circuitry 1104 at the private device or an external device/server may perform the translation. The commands may then be sent over communications network 1214 to the public device and implemented/executed by control circuitry 1104 at the public device. The execution may involve the user input interface 1110, the display 1112 and/or the speakers 1114 of the public device. In response to determining that a communication was not received, the process returns to 2002. For example, control circuitry 1104 may continue to monitor for communications at the public device. At 2008, control circuitry 1104 receives, at the public device, the public interface application from the private device.

At 2010, control circuitry 1104 determines whether the private device is within the predetermined proximity. At 2012, in response to determining that the private device is not within the predetermined proximity, control circuitry 1104 disconnects the public device from the private device. At 2014, in response to determining that the private device is within the predetermined proximity, control circuitry 1104 activates the public interface application on the public device. Processing circuitry 1106 of the public device may determine whether the private device is within the predetermined proximity. In some embodiments, processing circuitry 1106 of the private device may also determine whether the private device is within the predetermined proximity. The respective devices may then communicate their respective determinations. If both devices determine that the private device is not in the predetermined proximity, the private interface application may no longer be able to control the graphical user interface of the public interface application. If one of the two devices determines that the private device is no longer in the predetermined proximity, another determination of whether the private device is within the predetermined proximity may be performed by processing circuitry 1106 of the private device and the public device, respectively, in order to achieve a unanimous decision. In some embodiments, multiple devices may be attempting to connect with one another. For example, multiple private devices may be connected with the public device. Thus, rather than achieving a unanimous decision on whether one of the private devices is within the predetermined proximity, the public device may accept a majority decision (e.g., four of five devices determine that the private device in question is within the predetermined proximity) in order to determine whether the private interface application of the device should control the graphical user interface of the public interface application. For example, if a majority of the devices determine that the private device in question is not in the predetermined proximity, the public device may stop accepting commands to control the graphical user interface of the public device from the private interface application of the private device.

At 2016, control circuitry 1104 establishes a communications path to a server of the content provider. At 2018, control circuitry 1104 provides, via the public interface application, the user authorization information to the server of the content provider. The server of the content provider may be at the location determined based on the identifier. At 2020, control circuitry 1104 transmits, to the private device, a mirrored version of the graphical user interface, wherein the mirrored version of the graphical user interface is configured to (i) be displayed by a private interface application on the private device, (ii) receive a user request for a media asset from the content provider, and (iii) transmit the user request to the public interface application. It should be noted that control circuitry 1104 similarly generates for display, the mirrored graphical user interface via display 1112 and/or speakers 1114 of the private device.

At 2022, control circuitry 1104 receives a user request (e.g., via I/O Path 1102), issued from the private interface application, for a media asset from the content provider. At 2024, control circuitry 1104 requests, at the public device, the media asset from the content provider (e.g., over communications network 1214). At 2026, control circuitry 1104 receives, at the public device, the media asset from the content provider (e.g., media content source 1216 and/or media guidance data source 1218). At 2028, control circuitry 1104 generates for consumption (e.g., via display 1112 and/or speakers 1114 of both the private device and the public device) the media asset in response to the user request.

It is contemplated that the steps or descriptions of FIG. 20 may be used with any other embodiment of this disclosure. In addition, the steps and descriptions described in relation to FIG. 20 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 20.

Figure 21:
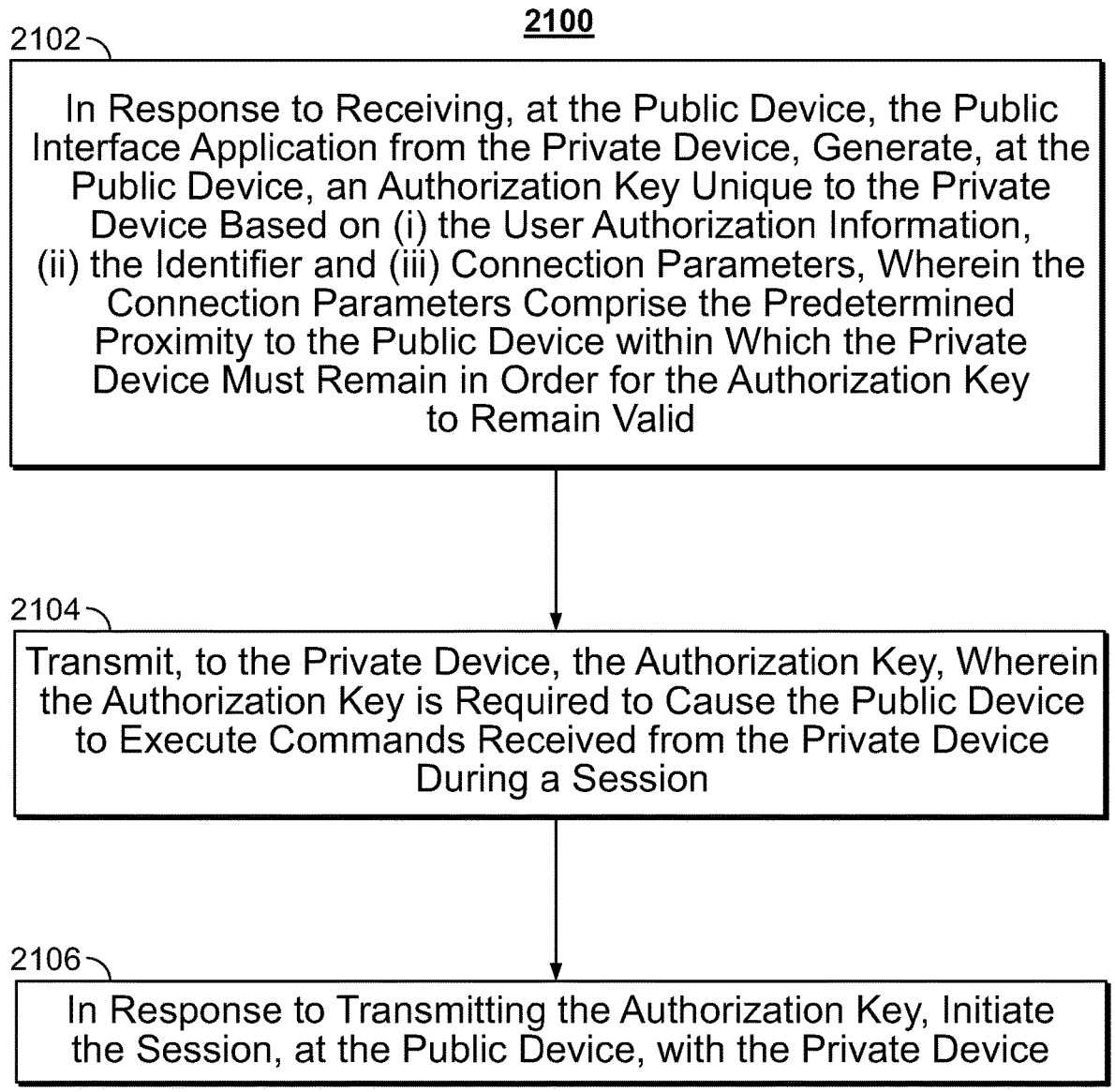
FIG. 21 is a flowchart of an illustrative process for generating an authorization key, in accordance with some embodiments of the disclosure.

FIG. 21 is a flowchart of an illustrative process for generating an authorization key, in accordance with some embodiments of the disclosure. It should be noted that process 2100 or any step thereof could be performed on, or provided by, any of the devices shown in FIGS. 11-12. For example, process 2100 may be executed by control circuitry 1104 (FIG. 11) as instructed by a media guidance application implemented on a user device (e.g., user equipment devices 1202, 1204, and/or 1206 (FIG. 12)). In addition, one or more steps of process 2100 may be incorporated into or combined with one or more steps of any other process or embodiment (e.g., as described in relation to FIGS. 1-10, 13-20, 22-24).

At 2102, in response to receiving, at the public device, the public interface application from the private device, control circuitry 1104 generates, at the public device, an authorization key unique to the private device based on (i) the user authorization information, (ii) the identifier and (iii) connection parameters, wherein the connection parameters comprise the predetermined proximity to the public device within which the private device must remain in order for the authorization key to remain valid.

At 2104, control circuitry 1104 transmits (e.g., over communication network 1214), to the private device, the authorization key, wherein the authorization key is required to cause the public device to execute commands received from the private device during a session. For example, during a transmission of a communication between the private device and the public device, control circuitry 1104 at the public device may generate an authorization key. The authorization key may be different for each message exchanged. For example, the authorization key may additionally comprise a timestamp. At 2106, in response to transmitting the authorization key, control circuitry 1104 initiates the session, at the public device, with the private device. In response to the initiation of a session between the public device and the private device, control circuitry 1104 of the private device may begin sending commands from the private interface application to the public interface application. The authorization key previously sent by the public device may accompany the command from the private device. In response to receiving the command and the authorization key, the public interface application may parse the authorization key to determine whether it matches the authorization key generated at the public device. In response to determining a match, control circuitry 1104 of the public device may execute the command sent by the private interface application. In response to determining that the authorization key does not match, control circuitry 1104 of the public device may end the session. Furthermore, control circuitry 1104 of the public device may generate a new authorization key and transmit over communications network 1214 to the private device in response to receiving a command from the private interface application that is accompanied by an authorization key that matches the authentication previously transmitted by the public device.

It is contemplated that the steps or descriptions of FIG. 21 may be used with any other embodiment of this disclosure. In addition, the steps and descriptions described in relation to FIG. 21 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 21.

Figure 22:
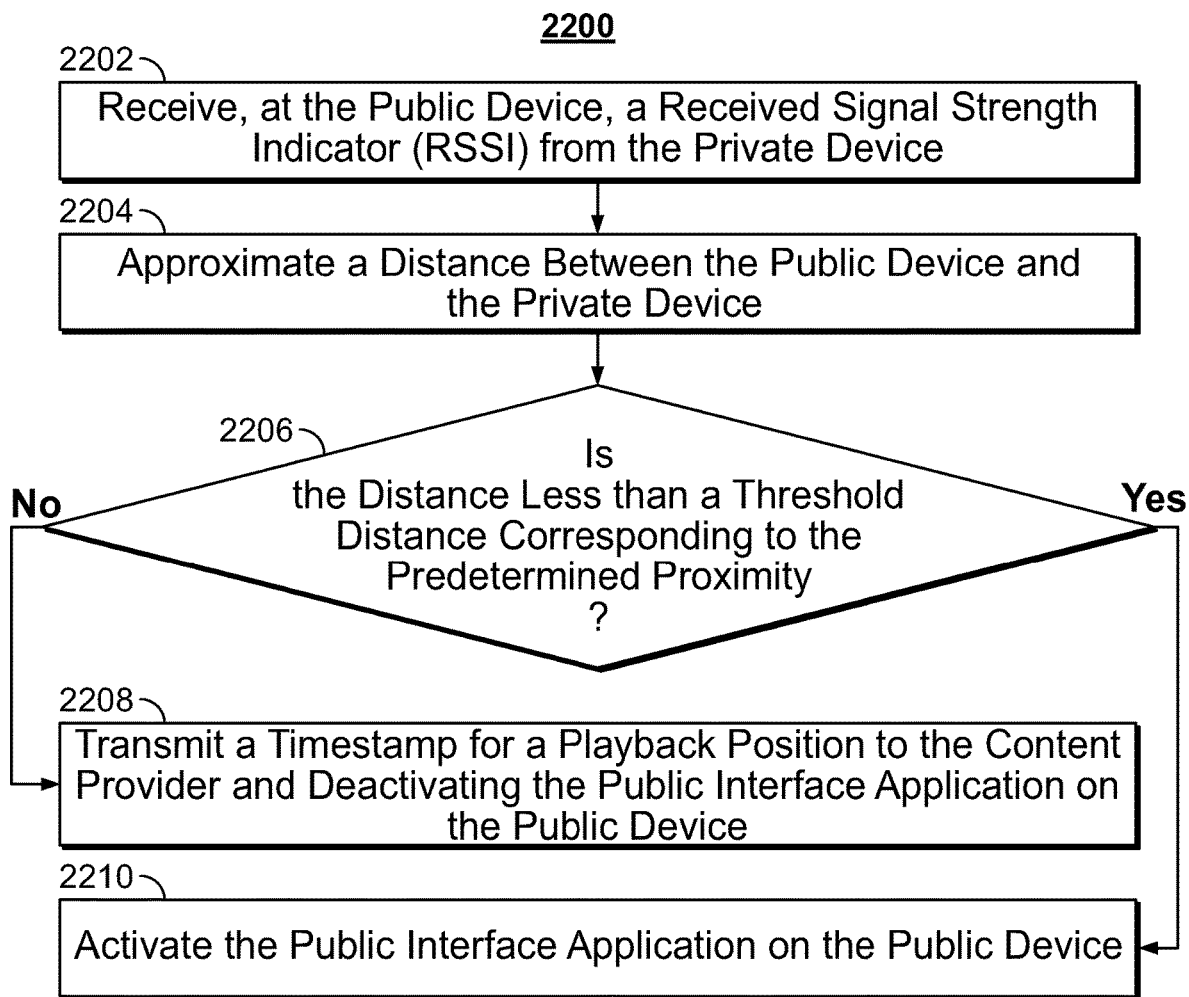
FIG. 22 is a flowchart of an illustrative process for determining whether the private device is within the predetermined proximity to the public device, in accordance with some embodiments of the disclosure.

FIG. 22 is a flowchart of an illustrative process for determining whether the private device is within the predetermined proximity to the public device, in accordance with some embodiments of the disclosure. It should be noted that process 2200 or any step thereof could be performed on, or provided by, any of the devices shown in FIGS. 11-12. For example, process 2200 may be executed by control circuitry 1104 (FIG. 11) as instructed by a media guidance application implemented on a user device (e.g., user equipment devices 1202, 1204, and/or 1206 (FIG. 12)). In addition, one or more steps of process 2200 may be incorporated into or combined with one or more steps of any other process or embodiment (e.g., as described in relation to FIGS. 1-10, 13-21, 23-24).

At 2202, control circuitry 1104 receives (e.g., via I/O Path 1102), at the public device, a received signal strength indicator (RSSI) from the private device (e.g., transmitted over communications network 1214). At 2204, control circuitry 1104 approximates a distance between the public device and the private device. For example, control circuitry 1104 may look up, at a RSSI-to-distance table stored in storage 1108 of the public device, an approximate distance between the public device and the private device based on the RSSI.

At 2206, control circuitry 1104 determines whether the distance is less than a threshold distance corresponding to the predetermined proximity. At 2208, in response to determining that the distance is not less than a threshold distance corresponding to the predetermined proximity, control circuitry 1104 transmits (e.g., over communications network 1214) a timestamp for a playback position to the content provider (e.g., media content source 1216 and/or media guidance data source 1218) and deactivates the public interface application on the public device. At 2210, in response to determining that the distance is less than or equal to a threshold distance corresponding to the predetermined proximity, control circuitry 1104 activates the public interface application on the public device.

It is contemplated that the steps or descriptions of FIG. 22 may be used with any other embodiment of this disclosure.

In addition, the steps and descriptions described in relation to FIG. 22 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 22.

Figure 23:
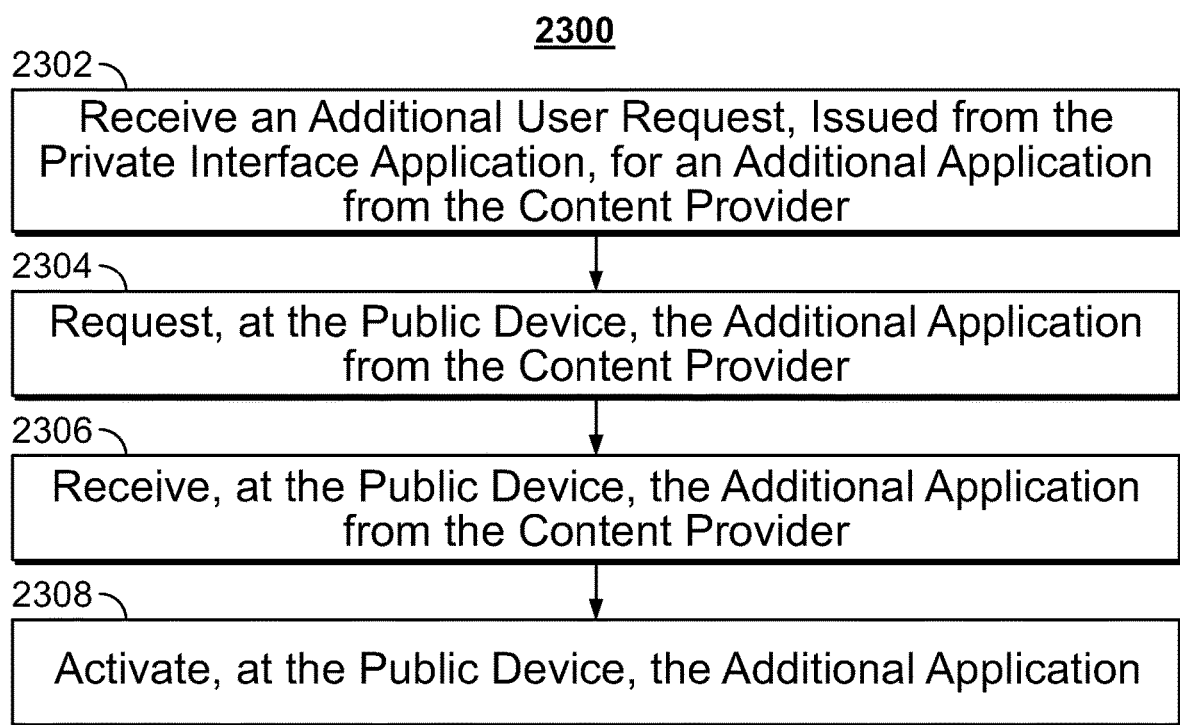
FIG. 23 is a flowchart of an illustrative process for retrieving additional applications from the content provider, in accordance with some embodiments of the disclosure.

FIG. 23 is a flowchart of an illustrative process for retrieving additional applications from the content provider, in accordance with some embodiments of the disclosure. It should be noted that process 2300 or any step thereof could be performed on, or provided by, any of the devices shown in FIGS. 11-12. For example, process 2300 may be executed by control circuitry 1104 (FIG. 11) as instructed by a media guidance application implemented on a user device (e.g., user equipment devices 1202, 1204, and/or 1206 (FIG. 12)). In addition, one or more steps of process 2300 may be incorporated into or combined with one or more steps of any other process or embodiment (e.g., as described in relation to FIGS. 1-10, 13-22 and 24).

At 2302, control circuitry 1104 receives (e.g., via I/O Path 1102 over communications network 1214) an additional user request, issued from the private interface application, for an additional application from the content provider. At 2304, control circuitry 1104 requests (e.g., over communications network 1214), at the public device, the additional application from the content provider (e.g., media content source 1216 and/or media guidance data source 1218). At 2306, control circuitry 1104 receives (e.g., via I/O Path 1102), at the public device, the additional application from the content provider. At 2308, control circuitry 1104 activates, at the public device, the additional application. It should be noted that in some embodiments, the public device may store the additional application, the public interface application, and/or the private interface application in storage 1108 of the public device.

It is contemplated that the steps or descriptions of FIG. 23 may be used with any other embodiment of this disclosure. In addition, the steps and descriptions described in relation to FIG. 23 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 23.

Figure 24:
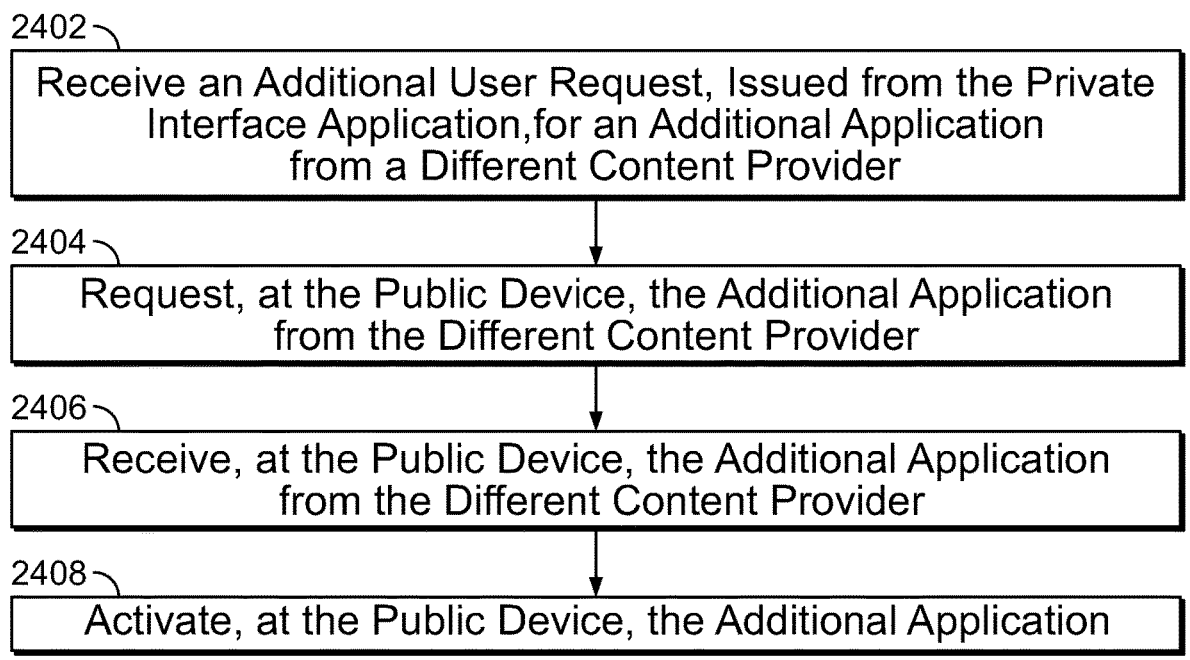
FIG. 24 is a flowchart of an illustrative process for retrieving additional applications from a different content provider, in accordance with some embodiments of the disclosure.

FIG. 24 is a flowchart of an illustrative process for retrieving additional applications from a different content provider, in accordance with some embodiments of the disclosure. It should be noted that process 2400 or any step thereof could be performed on, or provided by, any of the devices shown in FIGS. 11-12. For example, process 2400 may be executed by control circuitry 1104 (FIG. 11) as instructed by a media guidance application implemented on a user device (e.g., user equipment devices 1202, 1204, and/or 1206 (FIG. 12)). In addition, one or more steps of process 2400 may be incorporated into or combined with one or more steps of any other process or embodiment (e.g., as described in relation to FIGS. 1-10, and 13-23).

At 2402, control circuitry 1104 receives (e.g., via I/O Path 1102 over communications network 1214) an additional user request, issued from the private interface application, for an additional application from a different content provider (e.g., over a communications path different from communications paths, 1220 and 1222, which are associated with the content provider originally discussed). At 2406, control circuitry 1104 requests, at the public device, the additional application from the different content provider. At 2406, control circuitry 1104 receives, at the public device, the additional application from the different content provider. At 2408, control circuitry 1104 activates, at the public device, the additional application. In some embodiments, multiple applications are activated at the public device (e.g., public interface application and the additional application) and are run simultaneously.

It is contemplated that the steps or descriptions of FIG. 24 may be used with any other embodiment of this disclosure. In addition, the steps and descriptions described in relation to FIG. 24 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 24.

The processes discussed above are intended to be illustrative and not limiting. One skilled in the art would appreciate that the steps of the processes discussed herein may be omitted, modified, combined, and/or rearranged, and any additional steps may be performed, without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing access to media content by connecting, to a public device, a private device that does not have an installed application associated with the media content, the method comprising:

receiving a communication from a private device indicating that a user wishes to access content using a public device;

requesting, from the private device, both user authorization information and an identifier for a content provider of the content;

transmitting to the content provider, at a location based on the identifier, a request for both a public interface application and a private interface application corresponding to the content;

receiving, at the public device, the public interface application, wherein the public interface application includes an interface for communicating with the content provider and a graphical user interface for display to the user on the public device;

receiving, at the public device, the private interface application, wherein the private interface application is configured to control the graphical user interface on the public device while the private device is within a predetermined proximity to the public device;

transmitting, from the public device, the private interface application to the private device;

activating the public interface application on the public device;

providing, via the public interface application, the user authorization information to a server of the content provider;

receiving a user request, issued from the private interface application, for a media asset from the content provider;

requesting, at the public device, the media asset from the content provider;

receiving, at the public device, the media asset from the content provider; and generating, for consumption, the media asset in response to the user request.

2. The method of claim 1, further comprising:

in response to receiving, at the public device, both the user authorization information and the identifier for the content provider, generating, at the public device, an authorization key unique to the private device based on (i) the user authorization information, (ii) the identifier and (iii) connection parameters, wherein the connection parameters comprise the predetermined proximity to the public device within which the private device must remain in order for the authorization key to remain valid;

transmitting, to the private device, the authorization key, wherein the authorization key is required to cause the public device to execute commands received from the private device during a session; and in response to transmitting the authorization key, initiating the session, at the public device, with the private device.

3. The method of claim 1, wherein the communication from the private device indicating that the user wishes to access the content using the public device comprises receiving a 128-bit number used to identify the private device through low energy proximity sensing.

4. The method of claim 1, wherein the user authorization information is a universally unique identifier (UUID) or globally unique identifier (GUID) generated by the private interface application in response to verifying a login name and password entered into the private interface application, and wherein the user authorization information is valid for a predetermined time after verifying the login name and password.

5. The method of claim 1, wherein the identifier includes a Uniform Resource Locator (URL) for the server, or a file location on the private device, and wherein the server or file location stores content of the content provider.

6. The method of claim 1, further comprising:

receiving, at the public device, a received signal strength indicator (RSSI) from the private device;

approximating a distance between the public device and the private device; and comparing the distance to a threshold distance, corresponding to the predetermined proximity, to determine whether the private device is within the predetermined proximity to the public device.

7. The method of claim 1, wherein the public interface application is configured to automatically remove the user authorization information from memory on the public device upon deactivation of the public interface application on the public device, and wherein the private interface application is configured to retain the user authorization information in memory on the private device upon deactivation of the private interface application on the private device.

8. The method of claim 1, wherein the public interface application is configured as a thick client for performing data processing operations to facilitate communications with the content provider and display of the media asset, and wherein the private interface application is configured as a thin client for presenting processed data provided by the public interface application.

9. The method of claim 1, further comprising:

receiving an additional user request, issued from the private interface application, for an additional application from the content provider;

requesting, at the public device, the additional application from the content provider;

receiving, at the public device, the additional application from the content provider; and activating, at the public device, the additional application.

10. The method of claim 1, further comprising:

in response to activating the public interface application on the public device, retrieving network connection credentials from the private device; and connecting to a network based on the network connection credentials.

11. The method of claim 6, further comprising transmitting a timestamp for a playback position to the content provider and deactivating the public interface application on the public device, in response to determining that the distance is greater than the threshold distance.

12. A system for providing access to media content by connecting, to a public device, a private device that does not have an installed application associated with the media content, the system comprising:

control circuitry configured to:

receive a communication from a private device indicating that a user wishes to access content using a public device;

request, from the private device, both user authorization information and an identifier for a content provider of the content;

transmit to the content provider, at a location based on the identifier, a request for both a public interface application and a private interface application corresponding to the content;

receive, at the public device, the public interface application, wherein the public interface application includes an interface for communicating with the content provider and a graphical user interface for display to the user on the public device;

receive, at the public device, the private interface application, wherein the private interface application is configured to control the graphical user interface on the public device while the private device is within a predetermined proximity to the public device;

transmit, from the public device, the private interface application to the private device;

activate the public interface application on the public device;

provide, via the public interface application, the user authorization information to a server of the content provider;

receive a user request, issued from the private interface application, for a media asset from the content provider;

request, at the public device, the media asset from the content provider;

receive at the public device, the media asset from the content provider; and generate, for consumption, the media asset in response to the user request.

13. The system of claim 12, wherein the control circuitry is further configured to:

in response to receiving, at the public device, both the user authorization information and the identifier for the content provider, generate, at the public device, an authorization key unique to the private device based on (i) the user authorization information, (ii) the identifier and (iii) connection parameters, wherein the connection parameters comprise the predetermined proximity to the public device within which the private device must remain in order for the authorization key to remain valid;

transmit, to the private device, the authorization key, wherein the authorization key is required to cause the public device to execute commands received from the private device during a session; and in response to transmitting the authorization key, initiate the session, at the public device, with the private device.

14. The system of claim 12, wherein the communication from the private device indicating that the user wishes to access the content using the public device comprises a 128-bit number used to identify the private device through low energy proximity sensing.

15. The system of claim 12, wherein the user authorization information is a universally unique identifier (UUID) or globally unique identifier (GUID) generated by the private interface application in response to verifying a login name and password entered into the private interface application, and wherein the user authorization information is valid for a predetermined time after verifying the login name and password.

16. The system of claim 12, wherein the identifier includes a Uniform Resource Locator (URL) for the server, or a file location on the private device, and wherein the server or file location stores content of the content provider.

17. The system of claim 12, wherein the control circuitry is further configured to:

receive, at the public device, a received signal strength indicator (RSSI) from the private device;

approximate a distance between the public device and the private device; and compare the distance to a threshold distance, corresponding to the predetermined proximity, to determine whether the private device is within the predetermined proximity to the public device.

18. The system of claim 12, wherein the public interface application is configured to automatically remove the user authorization information from memory on the public device upon deactivation of the public interface application on the public device, and wherein the private interface application is configured to retain the user authorization information in memory on the private device upon deactivation of the private interface application on the private device.

19. The system of claim 12, wherein the public interface application is configured as a thick client for performing data processing operations to facilitate communications with the content provider and display of the media asset, and wherein the private interface application is configured as a thin client for presenting processed data provided by the public interface application.

20. The system of claim 12, wherein the control circuitry is further configured to:

receive an additional user request, issued from the private interface application, for an additional application from the content provider;

request, at the public device, the additional application from the content provider;

receive, at the public device, the additional application from the content provider; and activate, at the public device, the additional application.

21. The system of claim 12, wherein the control circuitry is further configured to:

in response to activating the public interface application on the public device, retrieve network connection credentials from the private device; and connect to a network based on the network connection credentials.

22. The system of claim 17, wherein the control circuitry is further configured to:

transmit a timestamp for a playback position to the content provider and deactivating the public interface application on the public device, in response to determining that the distance is greater than the threshold distance.

* * * * *